(12) United States Patent
Suntych

(10) Patent No.: US 12,446,138 B2
(45) Date of Patent: Oct. 14, 2025

(54) PULSED LIGHTING NETWORK FACILITY

(71) Applicant: Xiant Technologies, Inc., Greeley, CO (US)

(72) Inventor: Jon Daren Suntych, Greeley, CO (US)

(73) Assignee: Xiant Technologies, Inc., Greeley, CO (US)

( * ) Notice: Subject to any disclaimer, the term of this patent is extended or adjusted under 35 U.S.C. 154(b) by 527 days.

(21) Appl. No.: 17/757,113

(22) PCT Filed: Dec. 16, 2021

(86) PCT No.: PCT/US2021/063850
§ 371 (c)(1),
(2) Date: Jun. 9, 2022

(87) PCT Pub. No.: WO2022/133112
PCT Pub. Date: Jun. 23, 2022

(65) Prior Publication Data
US 2023/0262865 A1    Aug. 17, 2023

Related U.S. Application Data

(60) Provisional application No. 63/126,402, filed on Dec. 16, 2020.

(51) Int. Cl.
*H05B 47/16*    (2020.01)
*A01G 7/04*    (2006.01)
(Continued)

(52) U.S. Cl.
CPC ............. *H05B 47/16* (2020.01); *A01G 7/045* (2013.01); *H05B 47/19* (2020.01); *A01K 29/00* (2013.01)

(58) Field of Classification Search
CPC ........ H05B 47/16; H05B 47/19; A01G 7/045; A01K 29/00
See application file for complete search history.

(56) References Cited

U.S. PATENT DOCUMENTS

2011/0101883 A1* 5/2011 Grajcar .................. H05B 45/48
315/291
2014/0355998 A1   12/2014 Tanzilli et al.
(Continued)

FOREIGN PATENT DOCUMENTS

WO     2022133112 A1    6/2022

OTHER PUBLICATIONS

PCT Notification of Transmittal of the International Search Report and the Written Opinion of the International Searching Authority, or the Declaration for PCT Counterpart Application No. PCT/US21/63850, 10 pgs., (Mar. 2, 2022).
(Continued)

*Primary Examiner* — Anne M Hines
(74) *Attorney, Agent, or Firm* — Weatherly IP Solutions, LLC; James Weatherly

(57) ABSTRACT

Embodiments of the present disclosure provide systems, apparatuses and methods for a facility, such as a feedlot, barn, greenhouse, hospital, school or production facility, with synchronous communication and control of LED lights in lighting arrays for the emission of photon pulses to induce the stimulation of desired biological responses. Further provided herein are mobile real time location units to assist the LED lighting arrays to identify the location or status of an organism and to adjust their photon pulse emissions based on the needs of the organism.

28 Claims, 47 Drawing Sheets

(51) Int. Cl.
*H05B 47/19* (2020.01)
*A01K 29/00* (2006.01)

(56) References Cited

U.S. PATENT DOCUMENTS

| | | |
|---|---|---|
| 2015/0231408 A1 | 8/2015 | Williams et al. |
| 2018/0110207 A1 | 4/2018 | Suntych |
| 2020/0367444 A1 | 11/2020 | Suntych |

OTHER PUBLICATIONS

PCT Notification of Transmittal of the International Search Report and the Written Opinion of the International Searching Authority, or the Declaration for PCT Counterpart Application No. PCT/US21/63850, 17 pgs., (Apr. 29, 2022).
Extended European Search: Report for counterpart European Patent Application No. 21907835.9 mailed Oct. 10, 2024, 6 pages.

* cited by examiner

Examples of mobile real time location unit located in an array

PULSED LIGHTING NETWORK FACILITY

CROSS REFERENCE TO RELATED MATTER

The present application claims priority to U.S. Application No. 63/126,402, as filed on Dec. 16, 2020, the entire contents of which are incorporated herein by reference for all purposes.

BACKGROUND

Facilities such as schools, hospitals, offices, greenhouses, manufacturing facilities, production centers often use and need supplemental light. Typical types of supplemental lighting systems include incandescent lights, florescent lights, and various high-intensity discharge (HID) lamps, including high-pressure sodium (HPS) lights, metal halide lights, and mercury vapor lights.

SUMMARY

The following embodiments and aspects thereof are described and illustrated in conjunction with systems, tools and methods, which are meant to be exemplary and illustrative, not limiting in scope.

An embodiment of the present invention provides a facility having a system for synchronous control of the emission of photons from an array of LEDs, where the photon emission is directed toward an organism to induce a desired biological response.

An embodiment of the present invention provides a mobile real time location unit for use in a facility to monitor the activity of an organism in relation to the emission of photon from an array of LEDs that are designed to induce a desired response.

An embodiment of the facility of the present invention provides a system for synchronous control of the emission of photons from two or more LED lights, the system comprising: at least one master controller; a master clock within the at least one master controller, where the at least one master controller is capable of generating a signal transmitting the time of the master clock within the signal; two or more LED lights, where each LED light comprises: a controller; an internal clock; and at least one photon emitter, where the at least one photon emitter is capable of emission of photons; where the controller is in communication with the internal clock and the at least one photon emitter and where the time of the internal clock synchronizes the timing of the emission of photons from the at least one photon emitter; where each LED light is capable of receiving the signal from the master controller and where the controller of each LED light is capable of analyzing the time of the master clock of the signal from the master controller and comparing the time of the master clock with the time of the internal clock of the LED light.

An embodiment of the facility of the present invention provides a method of synchronizing the photon emission from two or more LED lights within an LED light array, the method comprising, providing at least one master controller, providing a master clock within the at least one master controller, where the at least one master controller is capable of generating a signal transmitting the time of the master clock within the signal, providing two or more LED lights, where each LED light comprises: a controller; an internal clock; and at least one photon emitter, where the at least one photon emitter is capable of emission of photons, where the controller is in communication with the internal clock and the at least one photon emitter and where the time of the internal clock synchronizes the timing of the emission of photons from the at least one photon emitter; generating a signal from the at least one master controller, where the signal contains the time of the master clock within the signal and the time the signal is sent: receiving the signal within each LED light; analyzing within the controller of the LED light the time of the master clock and the time the signal was sent from the master; and comparing the time of the master and the time the signal was sent from the master with the time of the internal clock of the LED light; and synchronizing the internal clock of the LED light with the master clock of the master.

An embodiment of the facility of the present invention provides a method of synchronizing the photon emission from two or more LED lights within an LED light array, the method comprising: providing at least one master controller; providing a master clock within the at least one master controller; where the at least one master controller is capable of generating a signal transmitting the time of the master clock within the signal; providing two or more LED lights, where each LED light comprises: at least one photon emitter, where the at least one photon emitter is capable of emission of photons; generating a signal from the at least one master controller, where the signal contains the time of the master clock within the signal; receiving the signal within each LED light; using said master clock to synchronize the photon emissions in each of the two or more LED lights to each other.

An embodiment of the facility of the present invention provides a method of synchronizing the photon emission from two or more LED lights within an LED light array, the method comprising: providing at least one LED light acting as a master controller; providing a master clock within the at least one master controller, where the at least one master controller is capable of generating a signal transmitting the time of the master clock within the signal; providing two or more LED lights, where each LED light comprises: at least one photon emitter, where the at least one photon emitter is capable of emission of photons; generating a signal from the at least one master controller, where the signal contains the time of the master clock within the signal; receiving the signal within each LED light; using said master clock to synchronize the photon emissions in each of the two or more LED lights to each other.

An embodiment of the facility of the present invention provides a method of synchronizing the photon emission from two or more LED lights within an LED light array within a mesh network protocol, the method comprising: providing at least one LED light acting as a master controller; providing a master clock within the at least one master controller, where the at least one master controller is capable of generating a signal transmitting the time of the master clock within the signal; providing two or more LED lights, where each LED light comprises: at least one photon emitter, where the at least one photon emitter is capable of emission of photons; generating a signal from the at least one master controller, where the signal contains the time of the master clock within the signal; receiving the signal within each LED light; using said master clock to synchronize the photon emissions in each of the two or more LED lights to each other LED light, where each other LED light in the LED light array is capable of rebroadcasting said master clock to other LED lights and adjusting its internal clock to best match said master clock and rebroadcasting it to other LED lights.

An embodiment of the facility of the present invention provides a method of synchronizing the photon emission from two or more LED lights within an LED light array within a mesh network protocol, the method comprising: providing two or more LED lights, where each LED light in the mesh network broadcasts and receives clock signals from other LED lights in the system, where each light performs a convergence algorithm to best align its internal clock to the other received clocks within the LED light array, where said LED light broadcasts its adjusted or converged clock to other LED lights within the LED light array, where over repeated cycles the clocks of all LED lights converge or align with each other, where each LED light comprises: at least one photon emitter, where the at least one photon emitter is capable of emission of photons; generating photon emissions that are synchronized to the LED light array's adjusted or converged clock.

An embodiment of the facility of the present invention provides computer readable medium comprising instructions, which when executed by one or more of the processors of a system comprising at least one master controller and two or more light emitting devices, LED, cause the system to: provide a time of a master clock within said at least one master controller; generate a signal to transmit the time of said master clock within said signal; receive the signal at the two or more LEDs, wherein each LED comprises a controller, an internal clock, and at least one photon emitter, wherein the controller of each LED is configured to synchronize a time of the internal clock of the LED with the timing of an emission of photons from said at least one photon emitter of the LED; generate a signal from said at least one master controller, wherein said signal contains the time of said master clock within said signal and a time the signal is sent: receive said signal within each LED; analyze within the controller of said LED the time of said master clock and the time the signal was sent from said master controller; and compare the time of said master clock and the time the signal was sent from said master controller with the time of the internal clock of the LED; and synchronize the internal clock of the LED with the master clock of said master controller.

Another embodiment of the facility of the present disclosure provides a method for increasing energy efficiency in a network array of photon emitters, the method comprising, providing an array photon emission housing units with a range of 20% to 80% of the units in an ON cycle and the corresponding percentage of photon emission housing units in an OFF cycle, shifting the emission housing units in an ON cycle to an OFF cycle and at the same time shifting 20% to 80% of the emission housing units in an OFF cycle to an ON cycle and repeating this cycle so that 20% to 80% of the emission housing units in an array are always in an ON cycles while a corresponding percentage are in an OFF cycle.

An embodiment of the facility of the present invention comprises a method for inducing a desired biological response in an organism, wherein the method comprises identifying the desired biological response of the organism; providing a signal from an LED light comprising at least two components, wherein the first component is a biological response stimulation component comprised of a single color spectrum within 50 nm of the peak absorption of a photon receptor of the organism corresponding to the desired biological response, and wherein the second component is a biological response reset component comprised of a single color spectrum within 50 nm of the peak absorption of a photon receptor of the organism corresponding to the desired biological response through the stimulation and reset of the organisms photon receptor; and wherein the signal is emitted from the LED light toward the organism and wherein the relationship between the first component and the second component induce the desired biological response of the organism.

An embodiment of the facility of the present invention comprises a method for inducing a desired biological response in an organism, wherein the method comprises identifying the desired biological response of the organism; providing a signal from an LED light comprising at least three components which comprises at least two initiation components and at least one reset component, wherein a first of the at least two initiation components is a biological response stimulation component comprised of a single color spectrum within 50 nm of the peak absorption of a photon receptor of the organism corresponding to the desired biological response and wherein the second of the at least two initiation components is a biological response stimulation component comprised of a single color spectrum within 50 nm of the peak absorption of a photon receptor of the organism corresponding to the desired biological response and wherein at least one aspect of the second of the at least two initiation components is different from the first of the at least two initiation components, and wherein the reset component is a biological response reset component comprised of a single color spectrum within 50 nm of the peak absorption of a photon receptor of the organism corresponding to the desired biological response through the reset of a photon receptor; and wherein the signal is emitted from the LED light toward the organism and wherein the relationship between the at least component and the second component induce the desired biological response of the organism.

An embodiment of the facility of the present invention comprises a method for confirming the stimulation of desired biological response in an organism, wherein the method comprises identifying the desired biological response of the organism; providing a signal from an LED light comprising at least two components, wherein the first component is a biological response stimulation component comprised of a single color spectrum within 50 nm of the peak absorption of a photon receptor of the organism corresponding to the desired biological response, and wherein the second component is a biological response reset component comprised of a single color spectrum within 50 nm of the peak absorption of a photon receptor of the organism corresponding to the desired biological response; and wherein the signal is emitted from the LED light toward the organism and wherein the relationship between the first component and the second component induce a biological response of the organism; monitoring the biological response of the organism and adjusting the relationship between the first component and the second component to obtain or improve the desired response.

An embodiment of the facility of the present invention comprises a method for confirming the stimulation of desired biological response in an organism, wherein the method comprises identifying the desired biological response of the organism; providing a signal from an LED light comprising at least two components, wherein the first component is a biological response stimulation component comprised of a single color spectrum within 50 nm of the peak absorption of a photon receptor of the organism corresponding to the desired biological response, and wherein the second component is a biological response reset component comprised of a single color spectrum within 50 nm of the peak absorption of a photon receptor of the organism corresponding to the desired biological response; and wherein the signal is emitted from the LED light toward the organism and wherein the relationship between the first component and the second component induce a biological response of the organism; and using a light meter to monitor the signal from the LED light to determine the color spectrum, pulse rate and intensity of the first component and the second component of the signal.

A method for controlling one or more biological functions of an organism, the method comprising: illuminating at least one organism with at least one LED light within a dark structure with zero external light, wherein the LED light emits a signal, wherein the signal is comprised of two or more components working in coordination, wherein the first component of the signal is a biological response initiation component which provides one or more photon pulses of one or more colors that initiates the stimulation of a biological response, where each pulse has one or more frequencies and one or more intensities where said first component initiates the biological response of the organism, where the one or more photon pulses of the first component are followed by one or more pulses of a second component where the second component is a biological response reset component, with one or more pulses composed of one or more colors and one or more frequencies and intensities, wherein the coordination of the first and second components within said signal results in a change in the regulation of a biological response in said organism.

A method of stimulating a biological response in an organism in a controlled environment that includes providing a lighting assembly having a network of lighting elements such as LED lights that provides light of one or more colors tailored for an individual organism. The lighting assembly is positioned adjacent an organism such that the light produced is received by the organism. The lighting assembly additionally has a control assembly that includes driving circuitry that modulates the lighting elements to controllably provide predetermined periods of light and dark to stimulate biological responses in an organism.

An embodiment of the facility of the present invention provides a method of inducing a desired response in organism, the method comprising: providing a system for pulsing photon signals toward an organism comprising: at least one LED light, where each of the at least one LED lights is configured to produce a photon signal directed toward the organism, where the photon signal comprises at least one response initiating photon component and one reset photon component, where the at least one response initiating photon component has one or more photon pulse ON durations with one or more intensities, has one or more photon pulse OFF durations, and a wavelength color; where the one or more ON durations of the one or more response initiating photon component is between 0.01 microseconds and 5000 milliseconds and where the one or more OFF durations of the one or more response initiating photon component is between 0.1 microseconds and 24 hours; and where the reset photon component has one or more ON durations with one or more intensities, has one or more OFF durations, and a wavelength color that is different from the wavelength color of the one or more response initiating component; where the one or more durations ON of the reset component is between 0.01 microseconds and 5000 milliseconds and where the one or more OFF durations of the reset component is between 0.1 microseconds and 24 hours; where the one or more response initiating photon component and the reset photon component are produced within the signal simultaneously; where the ON duration of the reset photon component is initiated after the completion of the one or more ON durations of the one or more response initiating photon component; and wherein the one or more response initiating photon component and the reset photon component are repeated within the signal after the competition go the OFF duration of the reset photon component; and emitting the signal toward the organism, where the combined effect of the signal induces a desired response within said organism.

An embodiment of the facility of the present invention provides a system for inducing a desired response in organism comprising: at least one LED, where each of the at least one LED lights is configured to produce a photon signal directed toward the organism, where the photon signal comprises at least one response initiating photon component and one reset photon component, where the at least one response initiating photon component has one or more photon pulse ON durations with one or more intensities, has one or more photon pulse OFF durations, and a wavelength color; where the one or more ON durations of the one or more response initiating photon component is between 0.01 microseconds and 5000 milliseconds and where the one or more OFF durations of the one or more response initiating photon component is between 0.1 microseconds and 24 hours; and where the reset photon component has one or more ON durations with one or more intensities, has one or more OFF durations, and a wavelength color that is different from the wavelength color of the one or more response initiating component; where the one or more durations ON of the reset component is between 0.01 microseconds and 5000 milliseconds and where the one or more OFF durations of the reset component is between 0.1 microseconds and 24 hours; where the one or more response initiating photon component and the reset photon component are produced within the signal simultaneously; where the ON duration of the reset photon component is initiated after the completion of the one or more ON durations of the one or more response initiating photon component; and wherein the one or more response initiating photon component and the reset photon component are repeated within the signal after the competition of the OFF duration of the reset photon component; and where the combined effect of the signal induces a desired response within said organism.

Another embodiment of the facility of the present invention comprises a method for inducing desired response in an organism, where the method comprises: providing at least one photon emission modulation controller and at least one LED light lighting unit; communicating a command from the at least one photon emission modulation controller to the at least one LED light lighting unit; providing a photon signal to the organism, where the photon signal comprises one or more independent components, where the one or more independent components comprise: a first independent component comprising a repetitive first modulated photon pulse group, where the first modulated photon pulse group has one or more waveforms, one or more photon pulse ON durations between 0.01 microseconds and five minutes with an intensity sufficient to put an organism in an alias position, has one or more photon pulse OFF durations between 0.1 microseconds and 24 hours, and a wavelength color; and where the signal entrains a change in the temporal perception of the organism in a controlled manner.

An embodiment of the facility of the present disclosure provides a method for emitting a signal to pulsed artificial lighting system to make the pulsed artificial lighting systems stop pulsing, the method comprising: providing a mobile unit associated with an organism, the mobile unit comprising: a communication unit capable of emitting a data signal and receiving a data signal; and a power storage unit; wherein said communication unit can be in communication with a central processing unit; and wherein said power storage unit provides power for said central processing unit and said communication unit; emitting a repetitive, passive or constant signal and may be containing data regarding said organism from said communication unit; providing an array of one or more LED lights wherein said one or more LED lights is capable of emitting pulsed photons and one or more data signals as well as receiving the data signal from the mobile communication unit; wherein the array of one or more LED lights receives the data signal from the mobile unit; and based upon the presence of/or information contained in the data signal from the mobile real time location, modifying the emission of said LED lights from the array of the one or more LED lights including but not limited to making the emissions of said LED lights to turn off or to turn remain on but have emissions that are not pulsed.

Another embodiment of the facility of the present disclosure provides a mobile real time location unit comprising: mobile housing unit comprising: a central processing unit; a communication unit capable of emitting a data signal and receiving a data signal; and a power storage unit; wherein said communication unit is in communication with the central processing unit, wherein said central processing unit is capable of providing data and commands to said communications unit; and wherein said power storage unit provides power for said central processing unit and said communication unit.

Another embodiment of the facility of the present disclosure provides a method for streaming real-time data for an organism, the method comprising: providing a mobile real time location unit associated with an organism, the mobile real time location comprising: a central processing unit; a communication unit capable of emitting a data signal and receiving a data signal; and a power storage unit; wherein said communication unit is in communication with the central processing unit; and wherein said power storage unit provides power for said central processing unit and said communication unit; emitting a repetitive, passive or constant signal containing data regarding said organism from said communication unit; providing an array of one or more LEDs wherein said one or more LEDs is capable of emitting photons and one or more data signals as well as receiving the data signal from the communication unit of the mobile real time location; wherein the array of one or more LEDs receives the data signal from the mobile real time location; and based upon the information contained in the data signal from the mobile real time location, modifying the emission of said LEDs from the array of the one or more LEDs.

BRIEF DESCRIPTION OF THE FIGURES

The accompanying drawings, which are incorporated herein and form a part of the specification, illustrate some, but not the only or exclusive, example embodiments and/or features. It is intended that the embodiments and figures disclosed herein are to be considered illustrative rather than limiting.

As shown in FIG. 35, when fs<2f, the sampled frequency signal of 1.1f appears to have a different frequency than the original input frequency.

DETAILED DESCRIPTION

Figure 1:
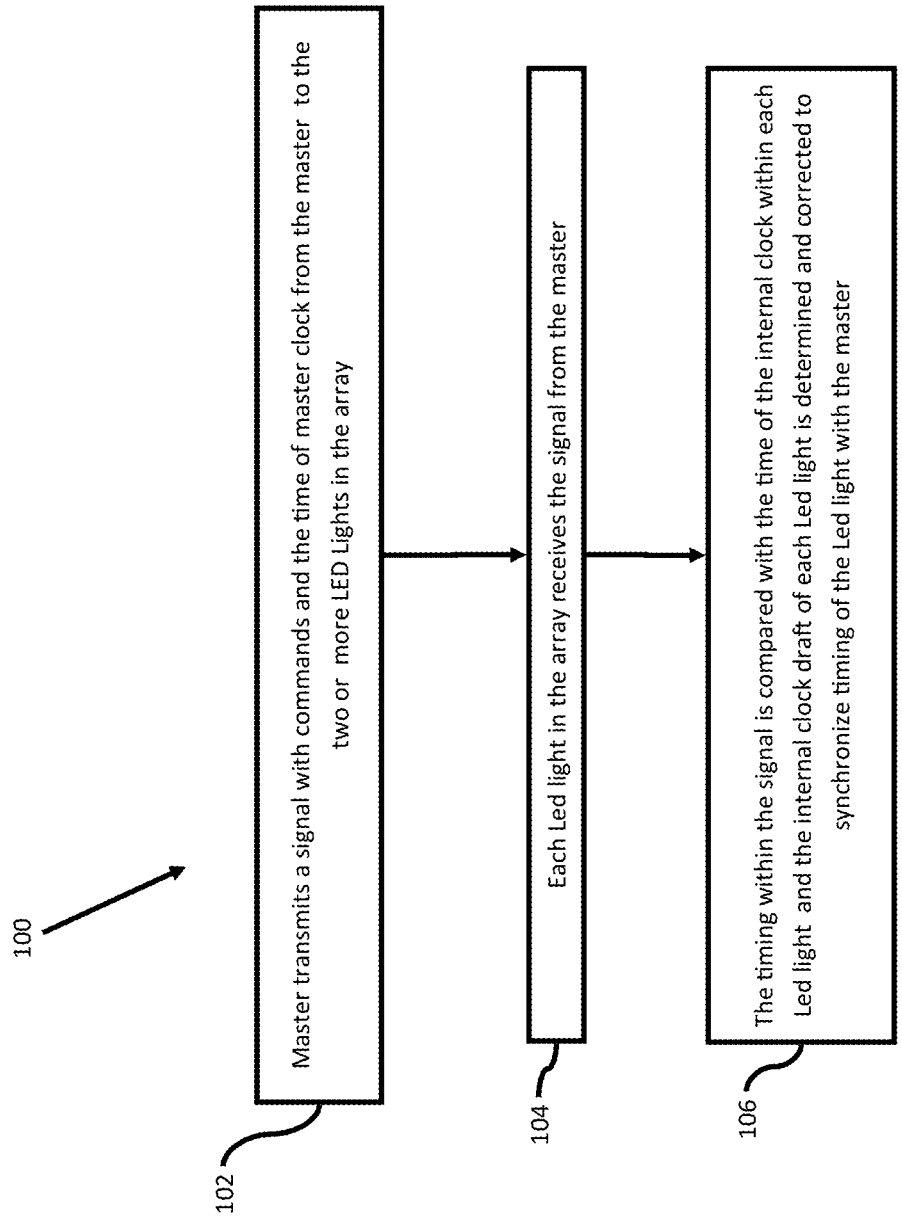
FIG. 1 is a flow diagram of a method of synchronous communication and control of photon emitters and sensor array.

Embodiments of the present disclosure provide systems, apparatuses and methods for a facility, such as a barn, greenhouse, hospital, school or production facility, with synchronous communication and control of LED lights in lighting arrays for the emission of photon pulses to induce the stimulation of desired biological responses. Further provided herein are mobile real time location units to assist the LED lighting arrays to identify the location or status of an organism and to adjust their photon pulse emissions based on the needs of the organism.

As used herein, a facility may include but is not limited to a building, barn, shed, greenhouse, warehouse, hospital, school, house, room, hot house, manufacturing facility, production facility, storage facility, shipping facility, packing facility and others.

U.S. Pat. Nos. 11,058,889, 10,709,114, 10,638,669, 10,609,909, 10,182,557, 9,907,296, 9,844,209, 9,560,837, and 9,526,215 and PCT Application Nos. PCT/US20/65890, PCT/US20/65634, and PCT/US20/66007 are incorporated herein by reference for all purposes.

Embodiments of the facility of the present disclosure provide systems, apparatuses and methods for synchronous communication and control of LED lights and sensors in an LED light array containing two or more LED lights. Through the use of a master clock within a gateway (main controller) and/or a master controller (sub-controller) that is in communication with LED lights in an array that is in a facility, such as in a greenhouse, hot house, poultry egg production facility, a hospital, dairy production or other lighting facilities, the gateway and/or master controller is capable of synchronizing the emission of light or photons from an LED light array by generating a master signal that contains commands and time from a master clock within the signal that is transmitted to each of the LED lights within an array. The signal may be transmitted by hard wire or wirelessly to the LED lights as well as sensors that support the LED light array. Each LED light and sensor receive the signal from the master or gateway and then compare the time of their internal clock with the time of the master clock signal, thus allowing the commands within the signal to be timed appropriately with the other photon emitters and sensors.

Embodiments of the present disclosure further provide systems, apparatuses, and methods for synchronization of LED light to maximize or control power efficiency. The systems, apparatuses and methods described herein reduce the power stress and heat production on a photon or light emission system, such as an array of LED light emitters in a facility such as a poultry production facility, a greenhouse, warehouse, school, feed lot, hot house, manufacturing facility, processing facility, shipping, livestock or kill facility, a dairy barn, hog production facility, turkey production facility, cattle feed lot, cattle trailer, or a human hospital. The system and methods synchronize the emission of photons from an array of LED lights as a reduced use percentage, such as 10%, 25%, 50% or 80%, by having a corresponding percentage of LED light emitting a pulse or ON at any one time, with all LED light in an array cycling through an emission rate that is faster than the perceived optical response of an organism, reducing the power of an LED light array from 10%, 20%, 25%, 50%, 75% or 90%.

Figure 47:
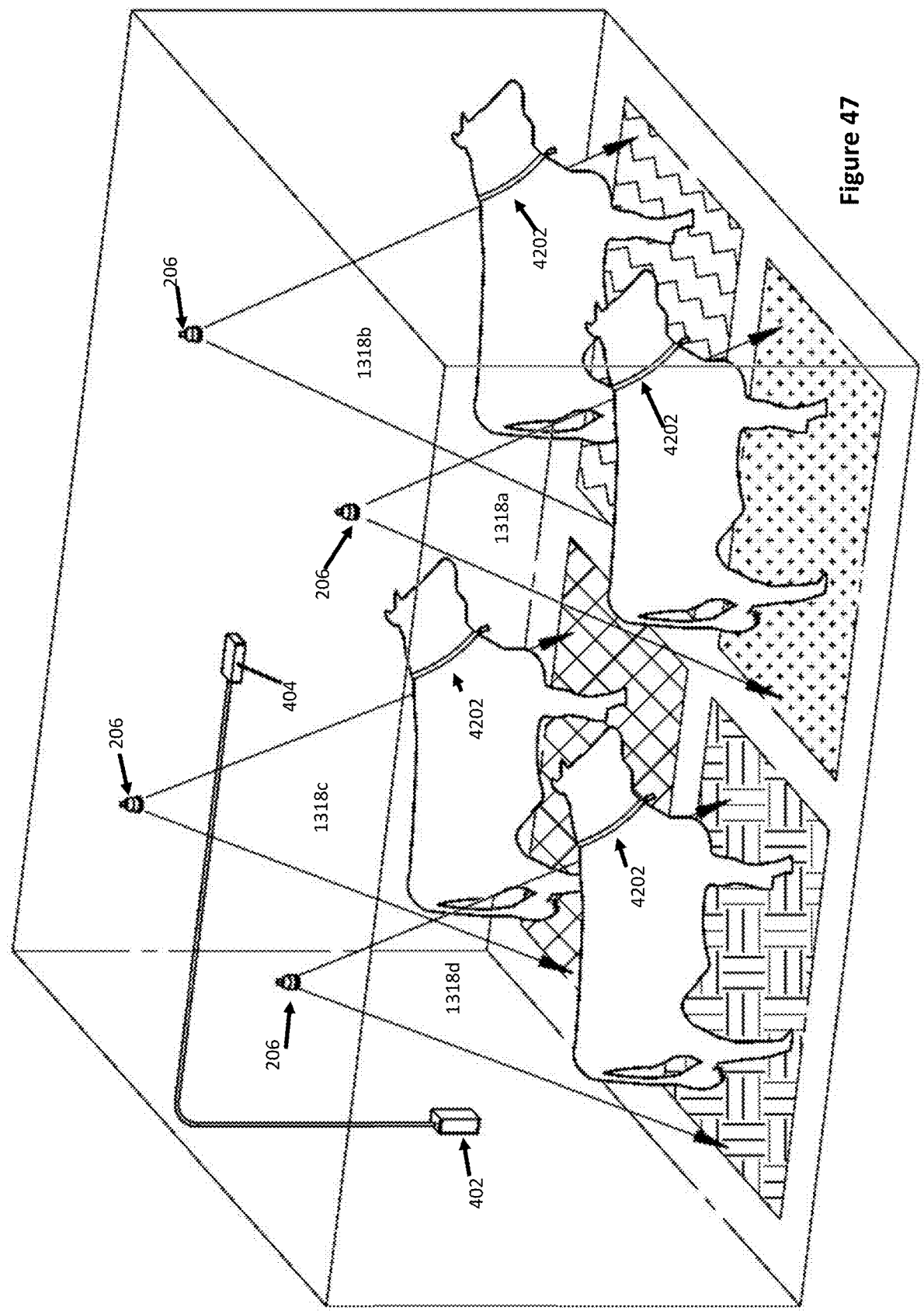
FIG. 47 is an example of a facility with a synchronized lighting system to induce a desired biological response in an organism, such as a cow, while utilizing mobile real time location units to monitor the organism in relation to the lighting system and the facility.

FIG. 47 provides a three dimensional example of facility with a synchronized lighting system to induce a desired biological response in an organism, such as a cow, while utilizing mobile real time location units to monitor the organism in relation to the lighting system and the facility. As shown in FIG. 47, a gateway 402 is operably linked to a master 404. The master 404 is in wireless communication with four LED lights 206. While in this example the master is in wireless communication with the LED lights 206, it will be understood and will be discussed in further detail herein, that a number of communication mechanisms may be used to communicate between the master and the LED lights, including hardwired. The LED lights, based on commands and communications from the master emit one or more recipes with a repetitive signal 1318a, 1318b, 1318c, and 318d in the direction of an organism, such as a cow. In this example, each cow is wherein a mobile real time location unit 4202 that is capable of sending information on the cow to each LED light 206 as well as receiving information form each LED light 206, allowing the system to monitory the location, age, health and other characteristics of the cow and allowing the system to emit one or more recipes toward the cow based on the needs of the cow.

FIG. 1 provides a flow chart for an example of the method of synchronous communication and control of LED light in an LED lighting array. In step 102 a master controller within a master transmits a signal with commands that include the time of a clock within the master. The signal is transmitted to the LED lights within the array by either hard wire or wireless transmission. In step 104, each LED light in the array receives the master signal which is processed within the LED light in a controller or microcontroller. In step 106, the timing from the clock within the master signal is compared with the time of the internal clock within each LED light and the internal clock drift of each internal LED light clock is determined and corrected to synchronize the LED light with the gateway and/or master controller.

Figure 2:
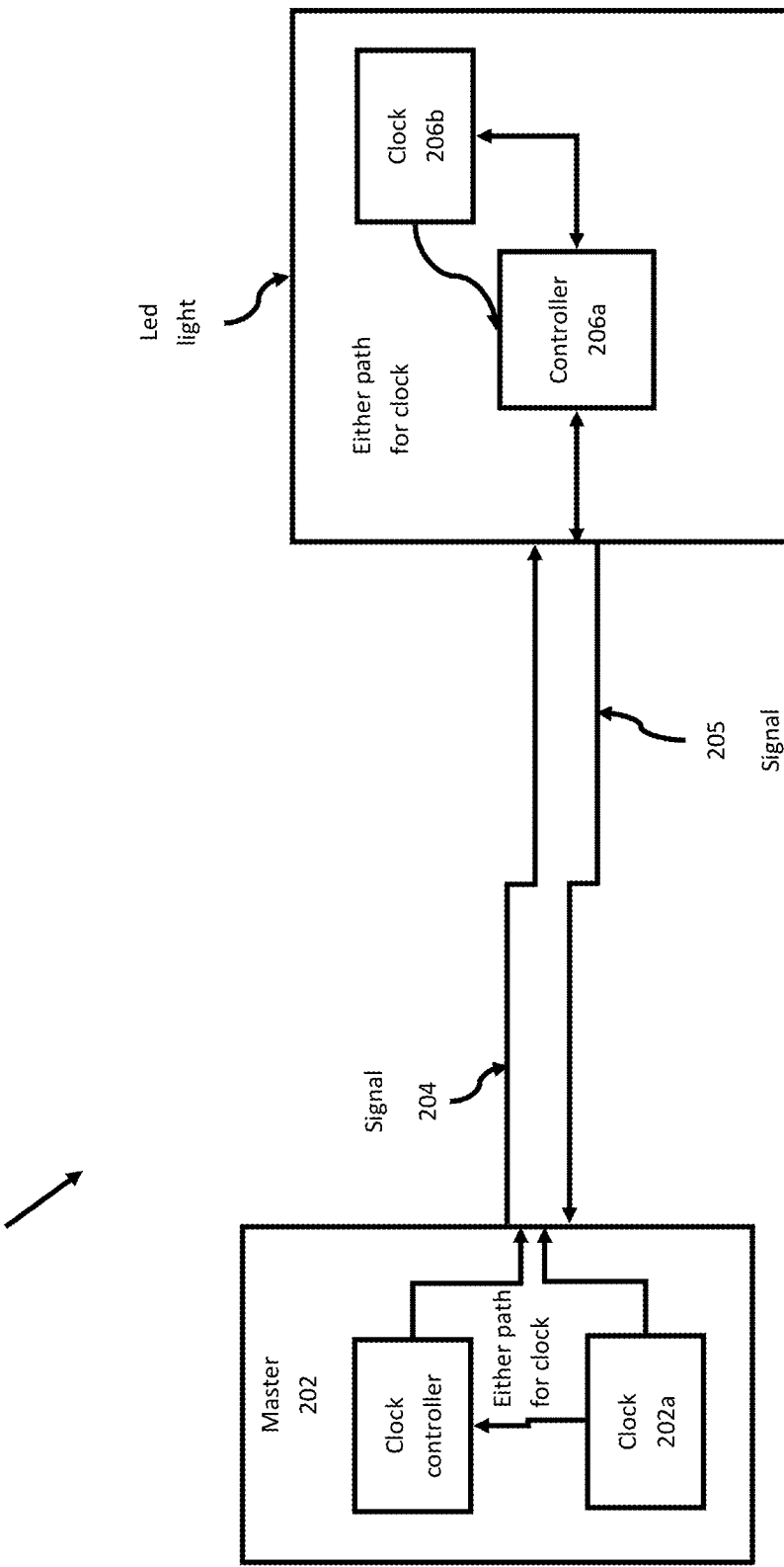
FIG. 2 is a diagram showing the communication between a master and an LED light.

FIG. 2 provides a diagram of an example of the communication between a master controller and an LED light to confirm the timing and synchronization of the LED light in relation to other LED lights that the LED light is in proximity too. As shown in FIG. 2, master 202a with a master clock 203 and an LED light 206 with an internal clock 206a are shown. A signal 204 produced is transmitted from the master 202 to the LED light 206 by the master controller. The signal 204 has a carrier frequency that is capable of containing multiple components such as commands relating to, for example: a photon emission recipe from the LED light and the time of the clock 202a within the master 202. The LED light 206 receives the signal 204 and a controller 206a within the LED light 206 compares the time of the LED light's internal clock 206b with the time of the internal clock 202a of the master 202 and the time the signal 204 was sent from the master 202. This allows the LED light to stay in synchronization with a limited clock drift up to the speed of electricity in copper. Conversely, the LED light 206 may send back to the master 202 a signal 205 with information such as a confirmation of the photon recipe, the temperature around the LED light, the time from the internal clock 206b, its offset clock adjustment of the LED light 206 and time the signal 205 is sent as well as other operating information such as noise rejection, status and health of the system or its parts and location, identification and history of itself or other LED lights and sensors in the system.

As used herein a gateway may be a networking device that provides omnidirectional control over a lighting network, a mesh network, a network of sensors, environmental controls, or a combination thereof and allows them to communicate in a synchronous manner.

As used herein, a master is a device with omnidirectional control over and communication with one or more other devices, such as a LED lights, sensor, or environmental controller.

A variety of "LED lights", light emitting device or lighting assembly having a network of lighting elements capable of a modulated emission of photons to send a repetitive pulse, waveform, or pulse train of photons, where each individual pulse comprises at least one-color spectrum, wavelength or multiple color spectrums or wavelengths and is capable varying intensities. A number of LED lights maybe used with the disclosure provided herein, as will be understood by one skilled in the art, including, but is not limited to the controlled light modulating of incandescent lights such as Tungsten-halogen and Xenon, Fluorescent (CFL's), high intensity discharge such as Metal Halide, High-Pressure Sodium, Low-Pressure Sodium, Mercury Vapor, sunlight, light emitting diodes.

The LED lights produce or emit a wavelength, wavelengths or color spectrum ranging from 0.1 to 1600 nm in width including, but not limited to, infrared, red, with near and far red (800-620 nm), orange (620-590 nm), yellow (590 to 520 nm) green, cyan (520 to 500), blue (500 to 435) violet and ultraviolet (450 to 380 nm) and white light. The LED lights produce a photon signal that may be emitted in a constant form (in conjunction with a pulsed form) or in a pulsed with "ON durations" that refer to the duration when an LED light is emitting photons or light. The ON duration for photon emission from the LED lights can be between 0.01 microseconds and 5000 milliseconds with durations of all integers in between. And the corresponding "OFF duration", which can be anywhere from 0.01 microseconds and 24 hours, with durations of all integers in between, referring to the duration where an LED light is not emitting photons or light.

A variety of signal types may be used to be broadcast from the LED lights, masters, and gateways to carry the required communication and clock time. The signal may be wired using a variety of cable, such as but not limited to, ethernet, waveguide, electrical cables for AC/DC and fiber-optic that are capable of communicating the signal or may be transmitted wirelessly, by way of example ultra-wide band, broadband, Zigbee, radio frequency (RF), passive, RFID and others that are also capable of supporting wireless communication. Additionally, the communication can be implemented on carrier frequencies across the AC or DC power lines. In this instance, the AC frequency can be utilized as the master clock frequency to the LED lights.

By way of example, a signal may be a wireless frequency in a poultry grow house in a range between 900 and 923 Mhz. Channel 0 will be 905, channel 1 will be 907 Mhz and channel 2 will be 909 Mhz. Frequency 905 Mhz is a wireless signal transmitted from the master to each LED light with a carrier frequency that can contain commands and other information relating to, for example: a photon emission recipe containing pulse duration for each component of the photon emission/signal from the LED light; OFF duration of each component; wavelength color of each component and intensity, and the time of the master clock and the time the signal was sent from the master clock. Conversely, the LED light may send back to the master controller or other LED lights a wireless signal on the same frequency 905 Mhz with the confirmation of the recipe, temperature around the LED light, the time from the internal clock, the clock adjustment of the LED light and time the signal is sent.

Figure 3:
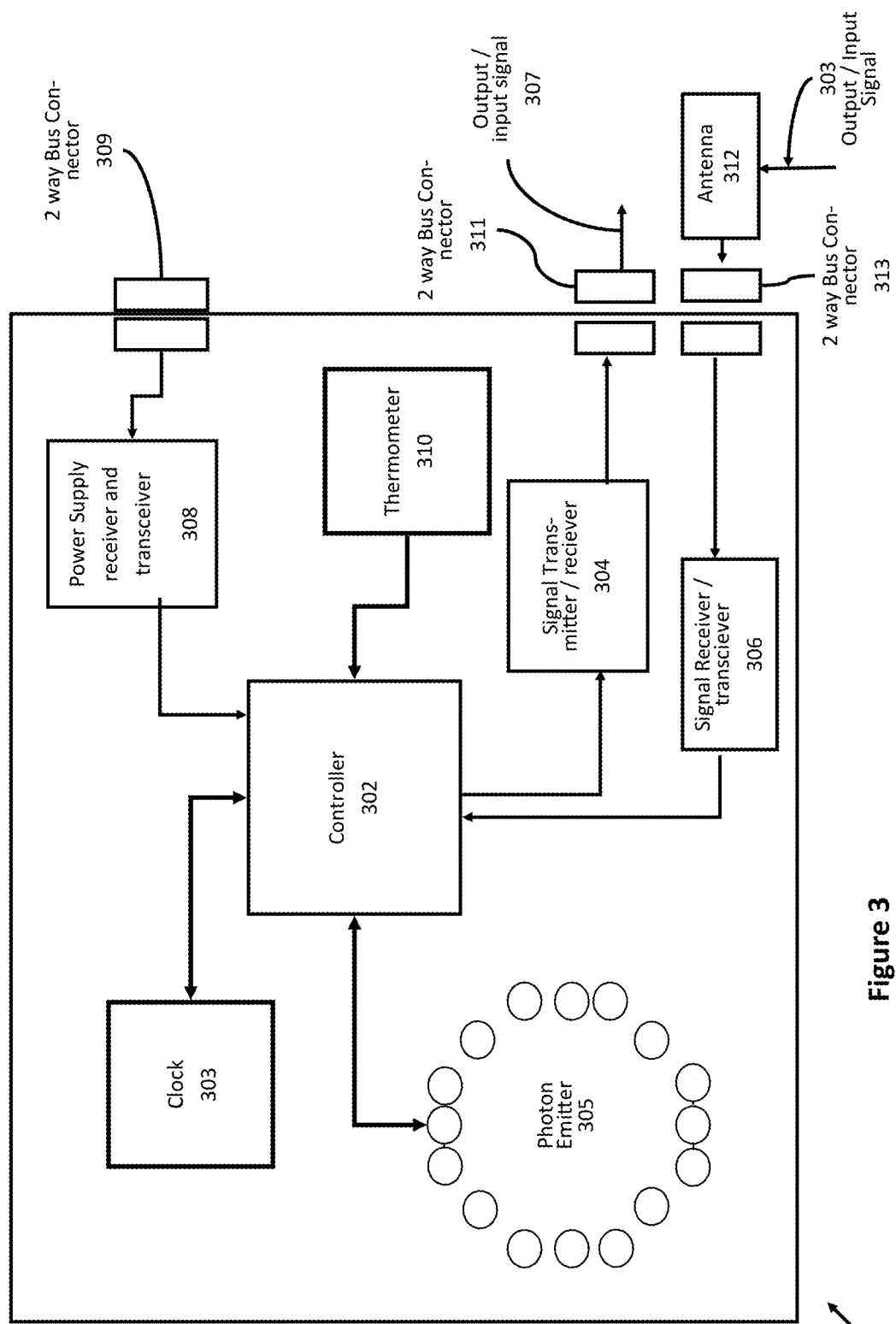
FIG. 3 is an example diagram of an LED light.

FIG. 3 provides a schematic of an LED light of the present disclosure 206. As shown in FIG. 3, the LED light 206 may comprise but is not limited to a controller 302, a clock generating crystal circuitry 303, wired signal transmitter/receiver 304, one or more photon emitters 305, a wireless signal receiver/transmitter 306, power supply and signal transmitter/receiver 308 and temperature sensor 310. Several bus communication infrastructures may be used with the disclosure provided herein, as will be understood by one skilled in the art, including, but is not limited to unidirectional, receiver, transceiver, omnidirectional and bidirectional. The synchronization of each LED light 206 in an LED light array is based on calculating and adjusting the difference from internal clock 303 and one or more of the other incoming master clock or incoming clocks of other LED lights 206. The master clock controller or other LED lights 206 send a signal 303 that is received by the LED light wireless signal receiver/transmitter 306, the wired signal transmitter/receiver 304 or wired power transmitter/receiver 308 containing the time of the master's internal clock and the timing the signal was sent or the timing of the adjusted clock from other LED lights 206. Each LED light 206 receives the signal through the signal receiver/transceiver 304, 306 or 308, where the information in the signal is transmitted to the controller 302. The controller 302 of the LED light 206 is in communication with the LED lights internal clock 303 and compares the time of the master clock with the time of the LED light's internal clock 303 and the time the signal was received. This allows the LED lights of an array to stay in synchronization with a limited drift up to 2.0 ns. While a drift of two nanoseconds is provided as an example, it will be understood by one skilled in the art that the synchronization of the master clock and the internal clock and the allowable timing drift can vary based on the communication type used and needs and application of the lighting system and may range from 100 ps, 500 ps, 750 ps, 1.0 ns, to 5 ns, 10 ns, 25 ns, 50 ns, 5 us, 10 us, 100 us, 500 us, 4 ms, 58 ms, 1000 ms, 2000 ms, 3000 ms, 4000 ms and all integers in between. The timing signal is broadcast by the master and the timing of each LED light is based on correlation of the timing signal from the master and the clock of the LED light. When timing is off, the LED light can produce feedback that indicates missing synchronization between the master and the LED light. LED light 206 may also send a wireless output signal 307 with various information about the LED light 206 such as the LED light's current time and the temperature of the LED light which may be sent to the master that the LED light is paired with, a gateway or other LED lights in the array. The LED light may also have a temperature sensor 310 and/or barometer in communication with the controller 302 that monitors the temperature and barometric pressure around the LED light or its environment.

The power supply 308 is in communication with and is operably coupled to the controller 302 and provides power to the LED light. A variety of power supplies may be used, depending on the scope and type of LED light, as will be understood by one skilled in the art, including AC, DC, batteries such as (12 volt and 9 volt). In the event of an AC or DC wired power supply, that power supply can also act as a receiver/transceiver for accepting and sending communication of clock timing and other signals.

Temperature and changes in barometric pressure can also have an impact signal communication between gateways, masters and LED lights leading to temperature clock drift and in the case of wireless communication signal frequency drift, which can cause issues in harmonics and missed communications between the LED light and the master, the master and Gateway and between LED lights. LED lights and masters can be recalibrated at repetitive internals as needed, such as every five minutes, one minute, 10 minutes, 30 minutes, one hour and every 24 hours, to account for changes in clock drift, temperature, pressure, and frequency drift to ensure that frequency drifts are not so large as to cause communications to fail. Monitoring and controlling the intestines of each LED light independently in a commercial install is critical to maintain signal frequency.

Changing the intensity of the pulsed photon emission of an LED light can achieve the desired response in the organism. For example, if you have a couple LED lights in an array that are hung under a vent for heating and air conditioning (HVAC) are closer to the organism than other lights in the array, then the LED lights under HVAC will need a lower photon emission intensity to even out the emission of the LED lights in the array.

The embodiment of system herein sends not only timing information in the communication system or signal but unique identification of each component within the communication signal and the deployed channel that the component should listen and send information on. The components of the system can communicate on discrete radio channels. The channels can be bidirectional communication, or a channel can be reserved for one direction such as in a transmit or receive only configuration. Each facility where the LED lights are deployed with wireless communication will have its own unique structures and design which can also create signal reflections and echoing characteristics. The method of synchronization as described herein is designed to consider echoes and reflections in a facility. By way example, the broadcast master's clock signal contains a timing of 1, 2, 3, 4, 5, 6, 7, 8, 9, 10 or 1 to 5, or 1 to 20 or as necessary for the timing of the system. If an LED light or sensors receives a signal from the master, gateway, or other LED lights where a number is out of order or repeats, such as the number 9 comes after 10, or number 9 repeats more than once then the LED light receiving the signal knows that the signal bounced off a wall, so the LED light received it twice or there is an error and to ignore the signal. If the signal timing goes 8 to 10 then you know a signal was missed. The unique identification and pairing of channels allow the components of the system to ignore communication signals that are not directed to it or does not belong to the system.

Several clocks or timing mechanisms may be used with the disclosure provided herein. By way of example, clock generating crystal circuitry such as a crystal oscillator or a quartz crystal oscillator may be used with the disclosure provided herein. A crystal oscillator is an electronic oscillator circuit that uses the mechanical resonance of a vibrating crystal of piezoelectric material to create an electrical signal with a constant frequency. This frequency is used to keep track of time and provides a stable clock signal for digital integrated circuit. In addition, resistor-capacitor circuits and microcontrollers may also be used for timing.

As used herein a wireless network is a computer network that uses wireless data connections between network nodes. Wireless networking is a method by which homes, telecommunications networks and business installations avoid the costly process of introducing cables into a building, or as a connection between various equipment locations. Wireless telecommunications networks are generally implemented and administered using radio communication. This implementation takes place at the physical level (layer) of the OSI model network structure. Examples of wireless networks include cell phone network, wireless local area networks (WLANs), wireless sensor networks, satellite communication networks, terrestrial microwave networks, ultra-wide band, RF, Bluetooth, ZigBee and mesh networks.

As used herein a mesh network (or simply meshnet) is a local network topology in which the infrastructure nodes (i.e., bridges, switches, and other infrastructure devices) connect directly, dynamically, and non-hierarchically to as many other nodes as possible and cooperate with one another to efficiently route data from/to clients. This lack of dependency on one node allows for every node to participate in the relay of information. Mesh networks dynamically self-organize and self-configure, which can reduce installation overhead. The ability to self-configure enables dynamic distribution of workloads, particularly in the event that a few nodes should fail. This in turn contributes to fault-tolerance and reduced maintenance costs As used herein, "duty cycle" is the length of time it takes for a device to go through a complete ON/OFF cycle or photon signal. Duty cycle is the percent of time that an entity spends in an active state as a fraction of the total time under consideration. The term duty cycle is often used pertaining to electrical devices, such as switching power supplies. In an electrical device, a 60% duty cycle means the power is on 60% of the time and off 40% of the time. An example duty cycle of the present disclosure may range from 0.01% to 90% including all integers in between.

As used herein "frequency" is the number of occurrences of a repeating event per unit time and any frequency that may be used in the system of the present disclosure. Frequency may also refer to a temporal frequency. The repeated period is the duration of one cycle in a repeating event, so the period is the reciprocal of the frequency.

As used herein, the term "waveform" refers to the shape of a graph of the varying quantity against time or distance.

Figure 10:
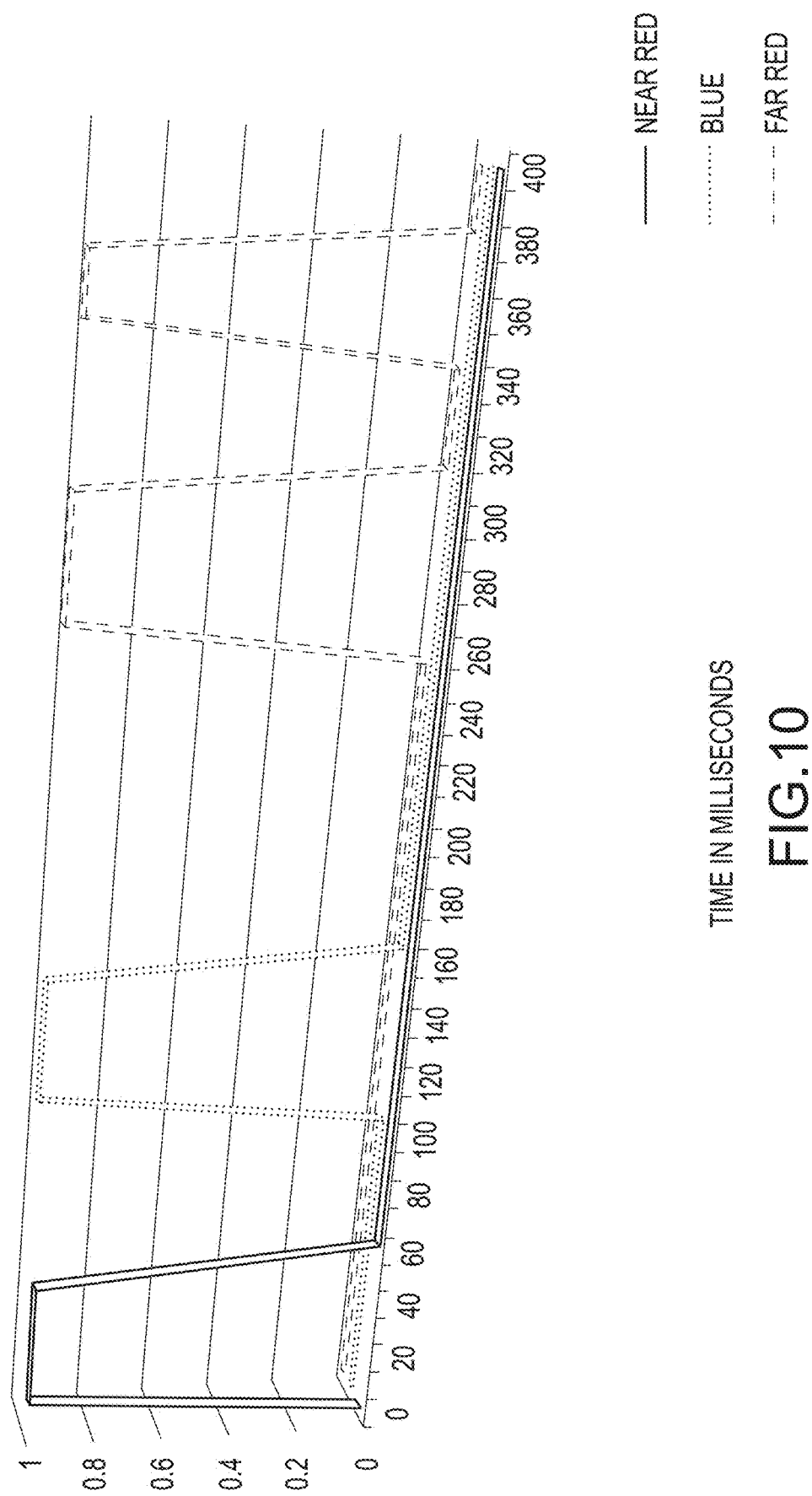
FIG. 10 is an example of a photon recipe with three components and the recipe step starting at 0 milliseconds.

As used herein, the term "pulse wave" or "pulse train" is a kind of non-sinusoidal waveform that is similar to a square wave, but does not have the symmetrical shape associated with a perfect square wave. An example is shown in FIG. 10 where a photon recipe is shown with three components with various pulse waves or trains, with a recipe step in milliseconds and going from 0 to 440 ms. It is a term common to synthesizer programming and is a typical waveform available on many synthesizers. The exact shape of the wave is determined by the duty cycle of the oscillator. In many synthesizers, the duty cycle can be modulated (sometimes called pulse-width modulation) for a more dynamic timbre. The pulse wave is also known as the rectangular wave, the periodic version of the rectangular function.

As used herein, the term "offset" means a ON duration of a pulse that is initiated at a different timing from the ON duration of another pulse. By way of example a first photon pulse may be initiated at the start of a repetitive cycle or duty cycle with a second or more other photon pulses.

As used herein, Radio-frequency identification (RFID) uses electromagnetic fields to automatically identify and track tags attached to objects. The tags contain electronically stored information. Passive tags collect energy from a nearby RFID reader's interrogating radio waves. Active tags have a local power source (such as a battery) and may operate hundreds of meters from the RFID reader. Unlike a barcode, the tag need not be within the line of sight of the reader, so it may be embedded in the tracked object. RFID is one method of automatic identification and data capture (AIDC).

As used herein, Ethernet, is a family of computer networking technologies commonly used in local area networks (LAN), metropolitan area networks (MAN) and wide area networks (WAN).[1] It was commercially introduced in 1980 and first standardized in 1983 as IEEE 802.3, and has since retained a good deal of backward compatibility and been refined to support higher bit rates and longer link distances. Over time, Ethernet has largely replaced competing wired LAN technologies such as Token Ring, FDDI and ARCNET.

As used herein, "bluetooth" is a wireless technology standard for exchanging data between fixed and mobile devices over short distances using short-wavelength UHF radio waves in the industrial, scientific and medical radio bands, from 2.400 to 2.485 GHz, and building personal area networks (PANs). It was originally conceived as a wireless alternative to RS-232 data cables.

As used herein, "Zigbee" is an IEEE 802.15.4-based specification for a suite of high-level communication protocols used to create personal area networks with small, low-power digital radios, such as for home automation, medical device data collection, and other low-power low-bandwidth needs, designed for small scale projects which need wireless connection. Hence, Zigbee is a low-power, low data rate, and close proximity (i.e., personal area) wireless ad hoc network.

Commissioning LED Light Array with a Master and/or Gateway

Figure 4:
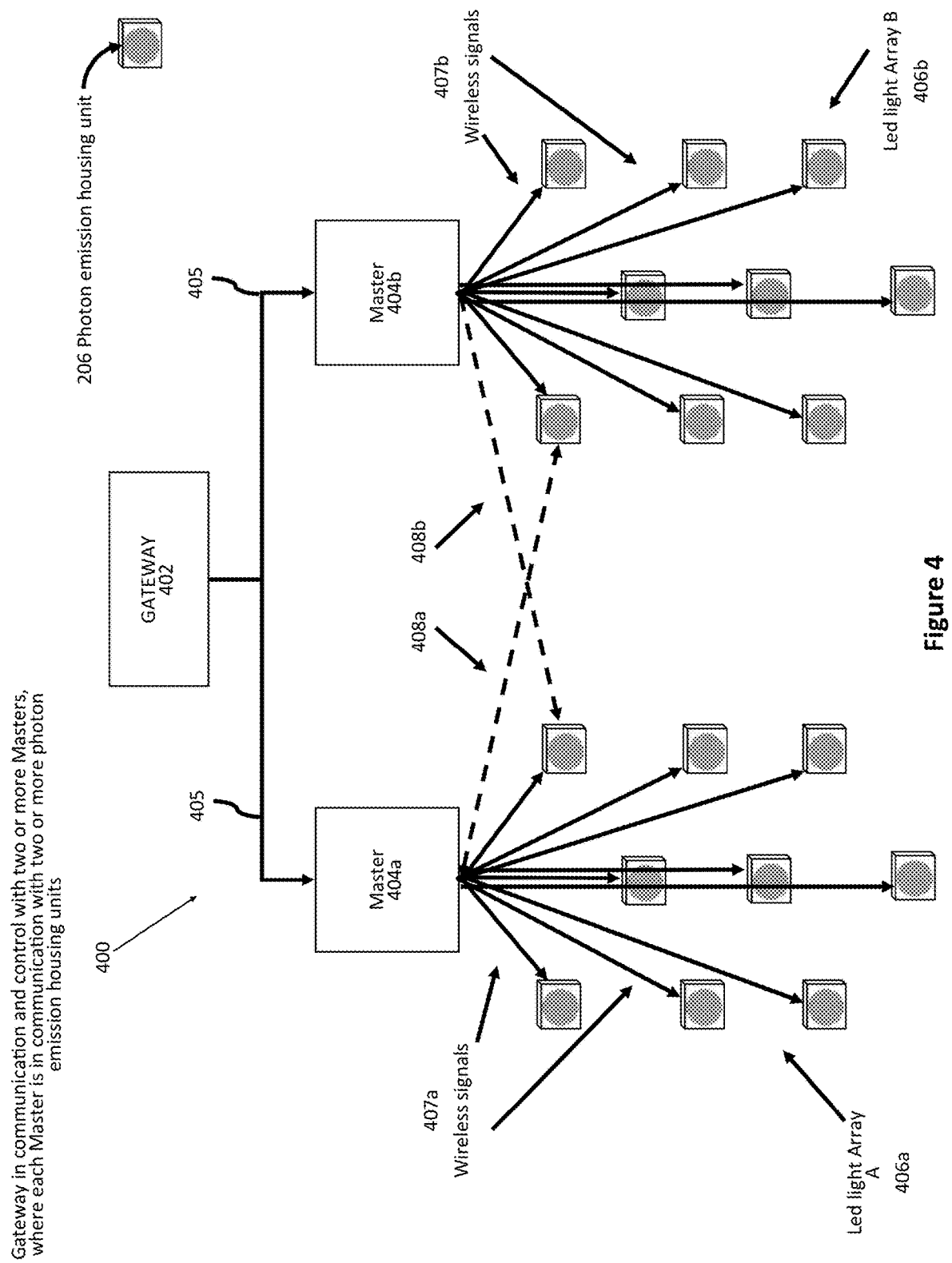
FIG. 4 is an example diagram showing the synchronization of LED light.

The system provided herein allows for the commissioning of a systems of LED lights in an array with a master and/or gateway by allowing the LED lights to choose the master and/or gateway to pair with that has the best communication connection or to allow the master and/or gateway to choose which LED lights to pair with that have the best communication connection. As shown in FIG. 4, a Gateway 402 is hardwired 405 to two (2) masters 404a and 404b. Each master 404a and 404b is then in communication by wireless signal with an array of nine (9) LED lights 406. The first master 404a sends a signal to each LED light 206, the LED light receives the signal from the master 404a and responds with a signal of its own indicating the signal has been received. Then the second master 404b sends a signal to the same LED light 206. The LED light will then analyze the signal from the second master 404b and will then choose which master is in best communications and commission itself as a pair to that master.

As shown in FIG. 4, in the commissioning process, LED light array A (406a) has received wireless signals 407a from the first master 404a and wireless signals 408b from the second master 404b. Based on the signal strength and quality of communication, the LED lights 206 of LED light Array A 406a rank the first master 404a as the preferred master and asks to pair with the first master 404a. The LED lights 206 of LED light Array B \406b rank the second master 404b as the preferred master and asks to pair with the master 404b. The master 404a and master 404b can also compare the communications between said LED light 206 and communicate through the gateway to make a choice on which master has the best communication with LED light 206 and choose which master commissions itself as a pair with LED light 206. Please note that the commissioning process can also be in the opposite direction with the LED light sending a signal to the master and based on the signal strength the master may request to pair with a specific LED light.

The system can also be set up to use the LED lights to indicate during the commissioning of the LED light system set up to indicate signal strength. Different colors from each LED light can be used to indicate the strength of the signal communication between the LED light in relation to a master (based on two-way communication between master and LED light). This allows for installers to visually place each LED light and to quickly move the LED lights or pairing to the location or master and/or gateway with the strongest signal, the intensity of the signal and the data contained within the signal, i.e., the stronger the intensity of the signal received by the emitter, the closer the unit is to the LED light. In an additional embodiment, each LED light may send signals to other LED lights in an array with information regarding the intensity of the signal or data within being received or the LED light may communicate directly with a master or gateway regarding the information in data signal (such as in the case of an emergency signal from a mobile real time location unit), thus allowing the LED lights to triangulate the exact location of the unit within the lighting array and to adjust their photon signals as appropriate. LED lights can be programed with one or more signals which facilitates a change in light emission recipes or can received signals from a gateway with such commands.

In an implementation of the current system utilizing wireless communication, a variety of devices have the capability of producing signal or harmonics that have the capability of interfering with the communication amongst LED lights, masters, and gateways. This issue can be mitigated by using specific channels with limited frequency range, thus providing a signal with a very narrow profile that is distinguishable by paired components.

Figure 5:
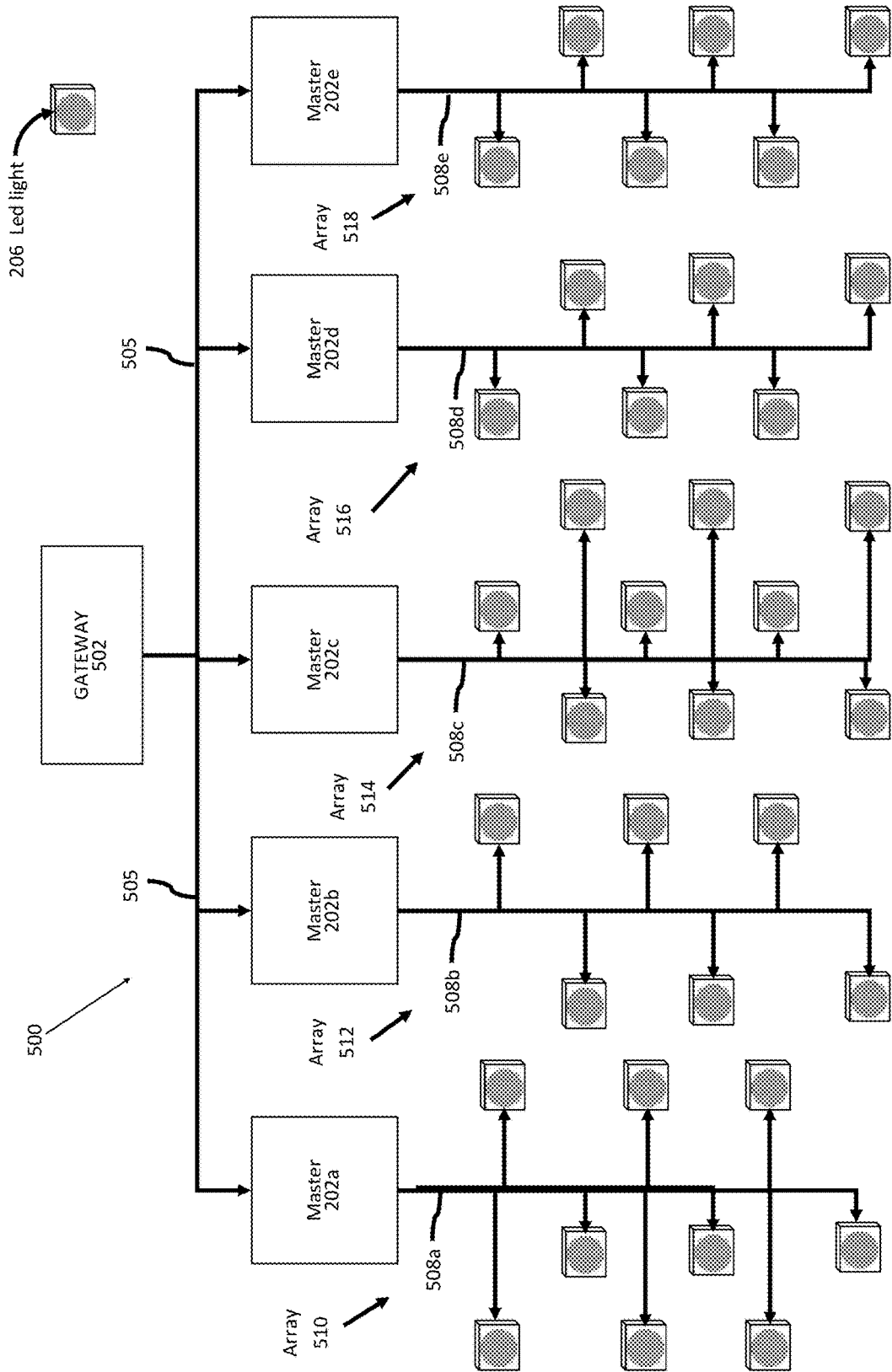
FIG. 5 is an example diagram showing the synchronization of LED light arrays that are hardwired with a series of masters and a gateway.

FIG. 5 shows an example of a gateway in communication with and control of five masters 202a, 202b, 202c, 202d, and 202e, where each master is in communication with two or more LED lights 206 and where each LED light contains at least one photon emitters in communication. In this example, a Gateway 502 is hardwired by Ethernet 505 and is in communication and provides commands and control of each Master 202a, 202b, 202c, 202d, and 202e. The gateway 502 also provides communications to third parties, such as through the internet or with a hardwired CPU, allowing two-way monitoring and control activities with third the Pulsed LED lighting array as needed. As will be understood by one skilled in the art, the number of masters 202a, 202b, 202c, 202d, and 202e in communication and under the control of one gateway 502 may range from 2, 3, 5, 9, 13, 17, 24, 29, 33, 42, 79, 104, 200, 400, 650, 1000, 15000 and all integers in between.

Each master 202a, 202b, 202c, 202d, and 202e in turn, is in communication and provides control of two or more LED lights 206 in an array 510a, 510b, 510c, 510d, and 510e. In FIG. 5, each master 202a, 202b, 202c, 202d, and 202e is in communication and control of arrays 510a, 510b, 510c, 510d, and 510e of between six and nine LED lights. As will be understood by one skilled in the art, the number of LED lights 206 in an array in communication with each master 604 may range from 2, 3, 5, 9, 13, 18, 22, 49, 63, 74, 121, 205, 360, 6400, 1100, 15001 and all integers in between.

In FIG. 5, each master 202a, 202b, 202c, 202d, and 202e is hardwired 508a, 508b, 508c, 508d, 508e to each individual LED light 206 within an array 510a, 510b, 510c, 510d, and 510e. The hardwire may be of any type of wiring that provides for a communication architecture to allow for multiple signals of information to be bi-directionally transmitted through the wire.

In FIG. 5, five masters 202a, 202b, 202c, 202d, and 202e are shown with each master paired with an LED light array 510a, 510b, 510c, 510d, and 510e. Each master has control and pairing with a specific array allowing each individual array to have its own photon emission pattern, with its own recipes and synchronization. By way of example, master 202a is paired with LED light array 510a which may be an array that is in a poultry facility and is designed to emit photons in a synchronized emission to induce young birds to eat and grow without inducing sexual maturity. Master 202b is paired with an LED light array 510b that may be synchronized to emit photons to induce sexual maturity in birds for egg production, while masters 202c and 202d may be in an area of a facility that is dedicated to dairy cattle with LED light arrays 510c and 510d synchronized to emit photon to encourage milk production while master 202e is paired with LED light array 508e that is an area of the facility that is temporarily used for administration of the facility and the LED light array 510e is emitting regular white light. Please note that in a wired solution, a master clock can be sent on a communication bus that is simply a repetitive signal that the LED light uses to cadence the photon emission recipe in the LED light. In this case the LED lamp does not need to have an internal clock of its own. Further the system provided herein also allows for the synchronization of timing between gateway and master as well as having the master controller change its timing to match an average of the of LED light clocks.

Figure 6:
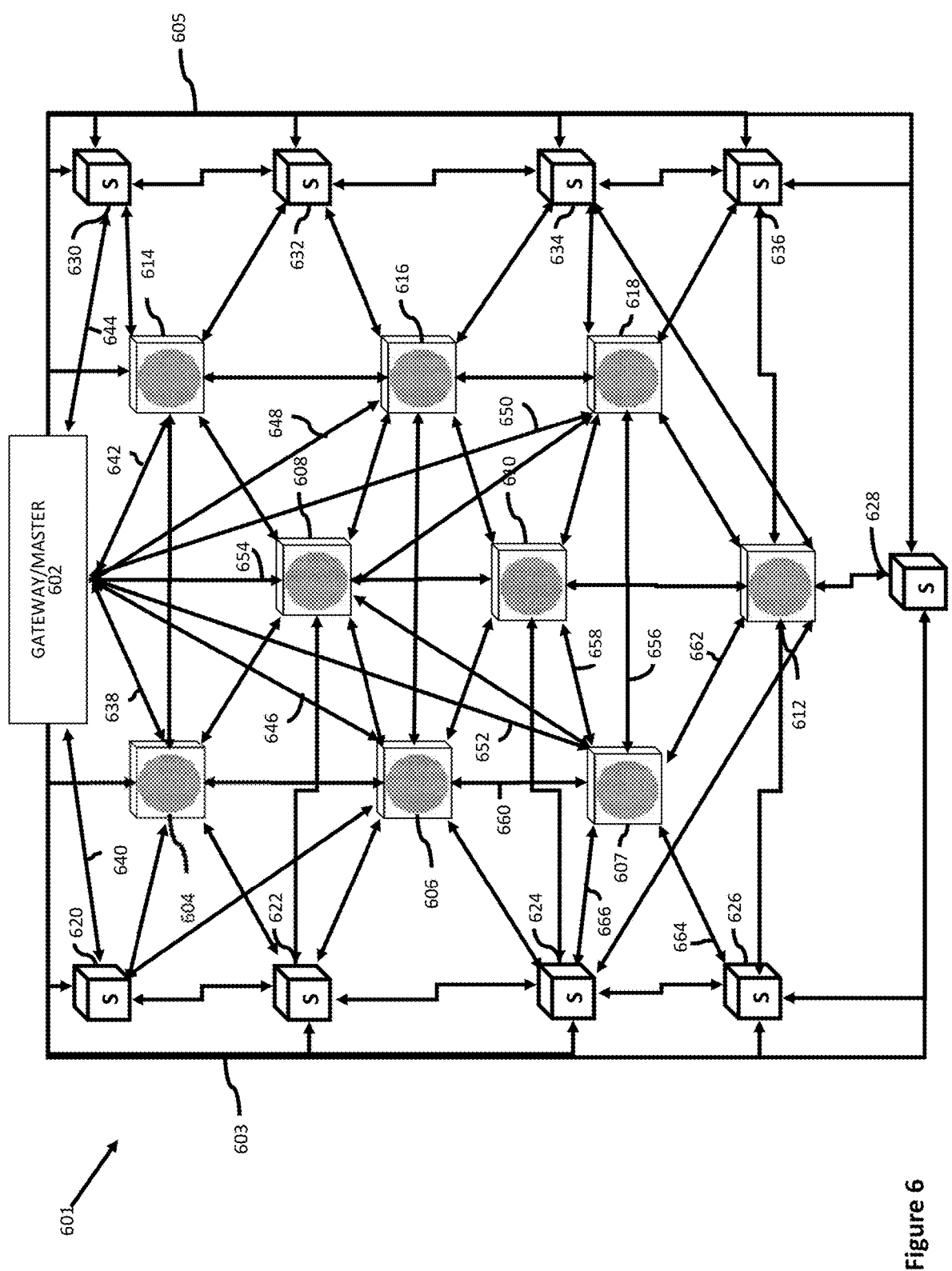
FIG. 6 is an example diagram showing the synchronization of LED light arrays that are in wireless communication with a gateway or master.

FIG. 6 provides an example of synchronization of a gateway/master with an array of LED lights where each LED light contains at least one photon emitter, 600. In this example, through the use of a master clock within the gateway which is compared with an internal clock within each LED light, each gateway/master is able to maintain synchronous timing and control of each LED light and sensor within the array.

As shown in FIG. 6, a gateway/master 602 is provided in wireless communication with an array of LED lights and sensors. In this example, no masters are provided and the gateway 602 provides control and communication to the outside world as well as the ability to update firmware, photon emission recipes, and intensity setting for the LED lights. The Gateway also can initiate 24-hour clock timing of how many hours per day the LED lights are on and off during the day. The Gateway initiates the synchronization master clock that is wirelessly broadcast to the LED lights for the synchronization of emission of photons or light from the LED lights within the array as well as for the synchronization light and communication with the sensors within the array. As will be understood by one skilled in the art a variety of gateway/masters may be used, such as solid-state circuit with digital output control or a central processing unit (CPU), provided the device is capable of control (input/output of the parameters and the appropriate instructions or the specialized functions for the modulation of photons) and communication to the photon emitters in the array and sensors as well as receiving communications from these devices.

As discussed above, the synchronization of each LED light in the array is achieved through the use of a master clock within the gateway. By way of example, at a known repetitive rate, the gateway 602 broadcast a signal to the LED light array. Each LED light in the array can then also respond back to the gateway 602 with individualized data 638, 640, 642, 644, 646, 648, 650, 652 and 654 to each LED light and sensor 604, 606, 607, 608, 614, 616, 618, 620, and 630 within the array. The signal contains information for each LED light and sensor such as emission recipe commands and firmware commands, but also contains the timing of the master clock and the time the signal was sent by the gateway. Each LED light receives the signal and reads the timing of the time of the master clock as well as the time the clock was sent. This allows each LED light as well as each sensor to compare the time of the master clock with its internal clock and determine if the internal clock is off from the timing of the master clock, and if so, by how much. This allows the LED light to recalibrate the time of its internal clock and to synchronize the photon emissions within the LED light to the gateway master clock.

In another embodiment of the facility of the current disclosure, each LED light that has received the master clock signal 604, 606, 607, 608, 614, 616, 618, 620, and 630 will then at a secondary known time, will send an output signal with its own internal clock to one or more LED lights in the array. This is shown in FIG. 6 with LED light 607 sending signals 656, 658, 660, 662, 664 and 666 with its internal clock, which is sent to LED lights 610, 618, 606, 612, and 626 and sensors 624 and 626. At the same time LED light 607 is also receiving internal clock signals from LED lights 606, 608 and 618, allowing the LED light 607 to refine its clock drift and its internal clock. For the master clock of the gateway, at a known repetitive rate (by way of example 800 ps, 1 us, 50 µs, as well as 5 µs, 10 µs, 12 µs, 25 µs, 100 µs, 500 µs and 1000 µs) sends its timing signal to the LED lights and sensors within in the array.

Also provided in FIG. 6 and shown in FIG. 5 is an array of least two photon emitters 604, 606, 606, 608, 610, 612, 614, 616 and 618 and/or sensors 620, 622, 624, 626, 630, 632, 634, and 636 in communication with the gateway 602. As with the gateway 602, each LED light and/or sensor has an internal clock. Each photon emitter and/or sensor is capable of receiving the master clock signal from said gateway and master controller as well as photon signals from other photon emitters or sensors in the array. This allows each emitter and sensor in the array to triangulate and know the location of the other sensors and emitters in the array as well as what those emitters and sensors are doing. Each photon emitter and each sensor are capable of generating its own master clock signal transmitting the time of the photon emitter's internal clock.

Each LED light and sensor in the array are also capable of generating an output signal with the time of the internal clock of that emitter or sensor. The output signal is transmitted to the master controller as well as to the other LED lights and sensors in the array. Each LED light and sensor will also receive signals from other LED lights and sensors within the array, allowing each LED light and sensor to be synchronized with other LED lights. Each LED light can receive adjusted clock signals from many other LED lights and sensors in the array and use clock adjustments along with others to create a more sophisticated and accurate clock adjustment. The meshing of this bidirectional communication by utilizing communication through multiple pathways between many LED lights and sensors in the array, the system has better communication pathways and can extend those pathways for long distances away from the gateway 602. By utilizing unique identification within the communication for each LED light and sensor in the array, firmware updates, photon modulation recipes, timing and other information can now be sent to all LED lights and sensors in the array. This allows buildings or facilities with several thousand LED lights and sensors to communicate efficiently and stably over large distances and through many floors or levels within the buildings or agricultural feed lots.

Figure 9:
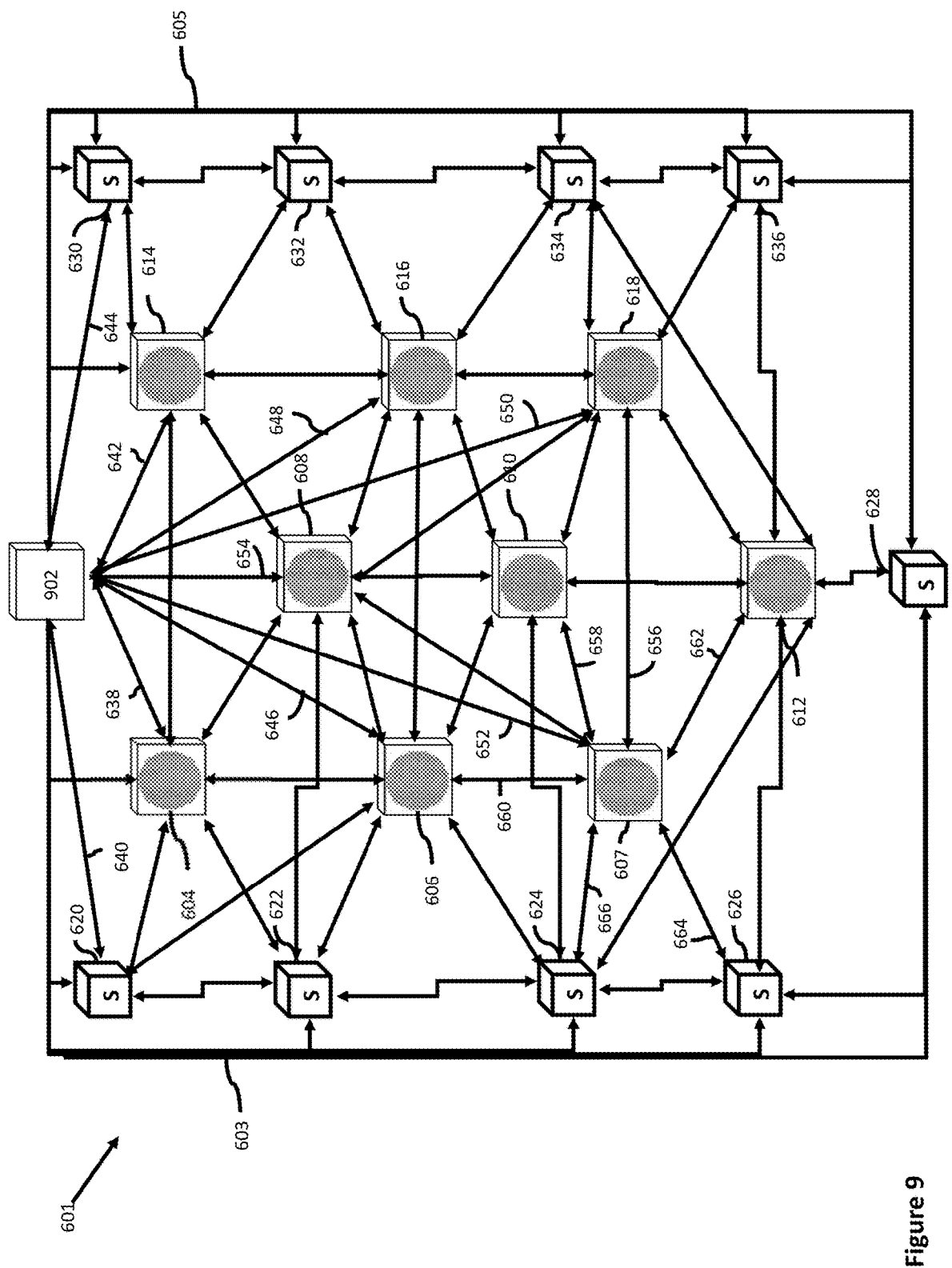
FIG. 9 is an example diagram showing the synchronization of LED light arrays that are in wireless communication where a single LED is acting as a gateway or master.

FIG. 9 provides an example of synchronization of an array of LED lights where an LED light 902 act as either a gateway or a master. In this example, through the use of a master clock within the LED light which is compared with an internal clock within each LED light, the LED light that is acting as a gateway/master is able maintain synchronous timing and control of each LED light and sensor within the array.

The present disclosure also provides for the synchronizing the pulsing or modulation of photon emission from two or more LED lights within an LED light array within a mesh network protocol. Each LED Light in the mesh network broadcasts and receives clock signals from other LED lights in the system, where each LED light performs a calculation of the average time of the LED lights in the array the LED is in communication with to best align its internal clock to the other received clocks within the LED light array. The LED light then broadcasts its adjusted clock to other LED lights within the array, where over repeated cycles the clocks of all LED lights converge or align with each other.

The present disclosure also provides for the synchronizing the pulsing or modulation of photon emission from two or more LED lights within an LED light array within a mesh network protocol. Wherein some LED Lights are parent lights in the mesh network that are responsible to maintaining clocks and broadcast their clocks timing to child LED lights in the system, creating a hierarchy of LED lights with parent LED lights maintain the timing of the array and child LED lights simply listening and responding to the parents.

A variety of sensors may be incorporated into the system described herein in order to provide various information about the system as well as the organisms associated with the system in the facility. A sensor can not only sense information but can also send control information to $3^{rd}$ party or external systems such as feed conveyors and watering systems. Examples of such sensors may include but are not limited to temperature sensors, smoke, moisture, motion, barometers, stem diameter, GPS, accelerometers, heart rate, blood pressure, ovulation, hormone tracking, such as estrogen, testosterone, and cortisol (which may be used to monitor stress), vibration, sound and vocalization to list of measurements, as well as $3^{rd}$ party sensors such as egg counters, feed sensors, and weight.

Data collected by the sensor can be relayed to a controller where the modulation of photon from LED lights in an array can be adjusted or changed. For example, based upon weight scales in a commercial egg laying facility, the weight of a sample of birds can be collected and sent to the LED lighting system where the modulation recipe can be adjusted as needed. In the case where the weight of the birds is too low, the intensity of the recipe can be increased to increase their desire to eat and thus add weight to the birds. In the case where the birds' weight is too high, the intensity of the led lighting system can be decreased thus decreasing the birds desire to eat and reduce the weight of the birds. Traditionally this control is performed by increasing or decreasing the temperature in the chicken barns. However, if you increase the temperature you can decrease the desire of the birds to eat and thus slow down their consumption rate. You can also decrease the temperature in the barns and increase the desire of the bird to eat thus increasing consumption of the birds. Adjusting the intensity of the lights is a more economically viable solution and can have more incremental control than adjusting the temperature in a barn.

The modulation of the emission of photons or light from an LED light and an LED light array to an organism, can stimulate or influence a variety of desired biological responses or functions, including but not limited to, fertility, ovulation, hunger, egg production, sexual maturity, milk production, hormone production, behavior and socialization, root, tissue or hyphal growth, vegetative growth, flower or fruiting body production, fruit, spore or seed production, stopping growth, elongation of a specific plant part, repairing an organism or destruction of the organism and interpolation of circadian inputs. Examples include but are not limited to; creating a signal with one, two or more components of electro-magnetic wave emission pulse trains (photons or light) of individual color spectrums in sufficient intensity to drive photochemical response in an organism to control a desired biological function, using the relationship between the timing of ON durations of at least two components within one or more recipes containing repetitive signal. Specifically, by providing a signal with one or multiple repetitive photons or light pulses at specific combination of rates relative to the timing of the ON duration of each component, including intensities, waveforms, photochemical responses by organisms can be stimulated and optimized and adjusted controlled or determined manner.

Examples of organisms may include, but is not limited to, humans, ungulates, including but not limited to cattle, horses, camels, pigs, deer, elk, alpacas, lamas, and moose, carnivores, including but not limited to bears, the weasel family, dogs, cats, wolves, lions, tigers, skunks, rodents, including but not limited to rats, mice, and beaver, chiropteras, including but not limited to bats, marsupials, including but not limited to kangaroos and opossums and cetacean, including, whales and dolphins, chickens, grouse, quail, pheasant, quail, parrots, water fowl, geese, swans, doves, organisms of prey, song organisms, turkey, owls, vultures, penguins, humming birds, ostrich, duck, mollusks, such as clams, oysters, octopuses, squid, snails; arthropods such as millipedes, centipedes, insects, spiders, scorpions, crabs, lobsters, shrimp; annelids, such as earthworms and leeches; sponges; and jellyfish, microorganisms, algae, bacteria, fungi, gymnosperms, angiosperms and pteridophytes, citrus, table grapes, wine grapes, bananas, papaya, *Cannabis* sp., coffee, goji berries, figs, avocados, guava, pineapple, raspberries, blueberries, olives, pistachios, pomegranate, artichokes and almonds; vegetables such as artichokes, asparagus, bean, beets, broccoli, Brussel sprouts, Chinese cabbage, head cabbage, mustard cabbage, cantaloupe, carrots, cauliflower, celery, chicory, collard greens, cucumbers, daikon, eggplant, endive, garlic, herbs, honey dew melons, kale, lettuce (head, leaf, romaine), mustard greens, okra, onions (dry & green), parsley, peas (sugar, snow, green, black-eyed, crowder, etc.), peppers (bell, chile), pimento, pumpkin, radish, rhubarb, spinach, squash, sweet corn, tomatoes, turnips, turnip greens, watercress, and watermelons; flowering type bedding plants, including, but not limited to, *Ageratum, Alyssum, Begonia, Celosia, Coleus*, dusty miller, *Fuchsia, Gazania, Geraniums, gerbera* daisy, *Impatiens, Marigold, Nicotiana,* pansy/*Viola, Petunia, Portulaca, Salvia, Snapdragon, Verbena, Vinca,* and *Zinnia*; potted flowering plants including, but not limited to, African violet, *Alstroemeria, Anthurium, Azalea, Begonia, Bromeliad, Chrysanthemum, Cineraria, Cyclamen,* Daffodil/Narcissus, Exacum, Gardenia, Gloxinia, Hibiscus, Hyacinth, Hydrangea, Kalanchoe, Lily, Orchid, Poinsettia, Primula, regal pelargonium, rose, tulip, *Zygocactus/Schlumbergera*; foliage plants including, but not limited to, *Aglaonema, Anthurium, Bromeliad, Opuntia,* cacti and succulents, Croton, *Dieffenbachia, Dracaena, Epipremnum,* ferns, ficus, Hedera (Ivy), *Maranta/Calathea,* palms, *Philodendron, Schefflera, Spathiphyllum,* and *Syngonium.* cut flowers including, but not limited to, *Alstroemeria, Anthurium,* Aster, bird of paradise/Strelitzia, calla lily, carnation, *Chrysanthemum,* Daffodil/Narcissus, daisy, Delphinium, Freesia, gerbera daisy, ginger, Gladiolus, Godetia, Gypsophila, heather, iris, Leptospermum, Liatris, lily, Limonium, Lisianthus, Orchid, Protea, Rose, Statice, Stephanotis, Stock, Sunflower, Tulip; cut cultivated greens including, but not limited to, plumosus, tree fern, boxwood, soniferous greens, Cordyline, Eucalyptus, hedera/Ivy, holly, leatherleaf ferns, Liriope/Lilyturf, Myrtle, Pittosporum, Podocarpus; deciduous shade trees including, but not limited to, ash, birch, honey locust, linden, maple, oak, poplar, sweet gum, and willow; deciduous flowering trees including, but not limited to, Amelanchier, callery pea, crabapple, crapemyrtle, dogwood, flowering cherry, flowering plum, golden rain, hawthorn, Magnolia, and redbud; broadleaf evergreens including, but not limited to, Azalea, cotoneaster, Euonymus, holly, Magnolia, Pieris, Privet, Rhododendron, and Viburnum; coniferous evergreens including, but not limited to, Arborvitae, cedar, cypress, fir, hemlock, juniper, pine, spruce, yew; deciduous shrubs and other ornamentals including, but not limited to, buddleia, hibiscus, lilac, Spirea, Viburnum, Weigela, ground cover, bougainvillea, clematis and other climbing vines, and landscape palms; fruit and nut plants including, but not limited to, citrus and subtropical fruit trees, deciduous fruit and nut trees, grapevines, strawberry plants, other small fruit plants, other fruit and nut trees; cut fresh, strawberries, wildflowers, transplants for commercial production, and aquatic plants; pteridophyte plants including, but not limited to ferns and fungi including but not limited to basidiomycetes, ascomycetes, and sacchromycetes. The system of the present disclosure provides a photon pulse for both C3 and C4 photosystems as well as "CAM" plants (Crassulacean acid metabolism), cyanobacteria or eukaryotic green algae or other organisms.

The modulation or pulsing of photons or light from an LED light to an organism, can stimulate or influence a variety of desired biological responses or functions, including but not limited to, fertility, ovulation, hunger, feed conversion, egg production, egg weight, egg shell quality, egg nutrients, egg weight distribution, sexual maturity, organism mass, milk production, hormone production, behavior and socialization, morphology, root, tissue or hyphal growth, vegetative growth, flower or fruiting body production, fruit, spore or seed production, stopping growth, elongation of a specific plant part, repairing an organism or destruction of the organism and interpolation of circadian inputs. Examples include but are not limited to; creating a signal with one, two or more components of electro-magnetic wave emission pulse trains (photons or light) of individual color spectrums in sufficient intensity to drive photochemical response in an organism to control a desired biological function, using the relationship between the timing of ON durations of at least two components each within one or more recipes containing a repetitive signal. Specifically, by providing a signal with one or multiple repetitive photons or light pulses at specific combination of rates relative to the timing of the ON duration of each component, including intensities, waveforms, photochemical responses by organisms can be stimulated and optimized and adjusted controlled or determined manner.

When using one or more LED lights in artificial lighting systems, precise control over modulation of photon emission from the individual LED lights is vital to modifying biological reactions in organisms. If an organism is physically located under and exposed to the photon emissions of more than one LED light those photon emissions from each LED light must be highly synchronized to each other in order to reduce confusion and maximize effects in the biological change. The modulation of said photon emissions comes in the form of control over the matrix of when to turn any and all wavelengths ON or OFF and at what intensity to emit the photons. For the purposes of the present disclosure, this matrix will be referred to as a "Recipe". As listed in Table 1 below, each channel number can be controlled individually or in groups. By stitching Table 1 together over time, a waveform of the ("Recipe") is produced.

TABLE 1

| Channel # | Wavelength (nm) | Step 1 Duration (1) ms & Intensity | Step 2 Duration (1) ms & Intensity | Step 3 Duration (1) ms & Intensity |
|---|---|---|---|---|
| 1 | 445 | ON: 75% | ON: 80% | ON: 90% |
| 2 | 455 | OFF: 0% | ON: 75% | OFF: 0% |
| 3 | 465 | OFF: 0% | OFF: 0% | OFF: 0% |
| 4 | 395 | OFF: 0% | OFF: 0% | ON: 100% |
| 5 | 625 | OFF: 0% | OFF: 0% | OFF: 0% |
| 6 | 660 | ON: 100% | ON: 100% | ON: 100% |
| 7 | 740 | ON: 100% | OFF: 0% | OFF: 0% |
| 8 | 660 | ON: 50% | ON: 50% | ON: 50% |
| 9 | 500 | OFF: 0% | OFF: 0% | OFF: 0% |
| 10 | 365 | OFF: 0% | OFF: 0% | OFF: 0% |
| 11 | 500 | ON: 100% | ON: 50% | ON: 25% |
| 12 | 525 | OFF: 0% | ON: 0% | OFF: 0% |
| 13 | 592 | OFF: 0% | OFF: 0% | OFF: 0% |
| 14 | White Light | ON: 100% | ON: 100% | OFF: 0% |

The Recipe and the process of iterating through the individual steps must be synchronized between multiple LED lights in a system. For example, the Recipe can reside in any component in the system. If the system has a gateway or master the recipe can be stored in either component and transferred thought the bus communication to the LED lights and timing of the steps or groups of steps can be controlled from any device such as the gateway, master or LED lamps themselves. The gateway and master can also directly send channel by channel and step by step direct control to the lamps. The LED light can also contain the Recipe and use timing information from other Led lights, gateway or the master to synchronize the iterations through the steps or groups of steps in a recipe. All of which is the ultimate purpose to affect the synchronization and control of photon emissions from individual photon sources within a LED light and that of multiple LED lights.

Maximization of Power Efficiency in a Photon Array

Figure 7:
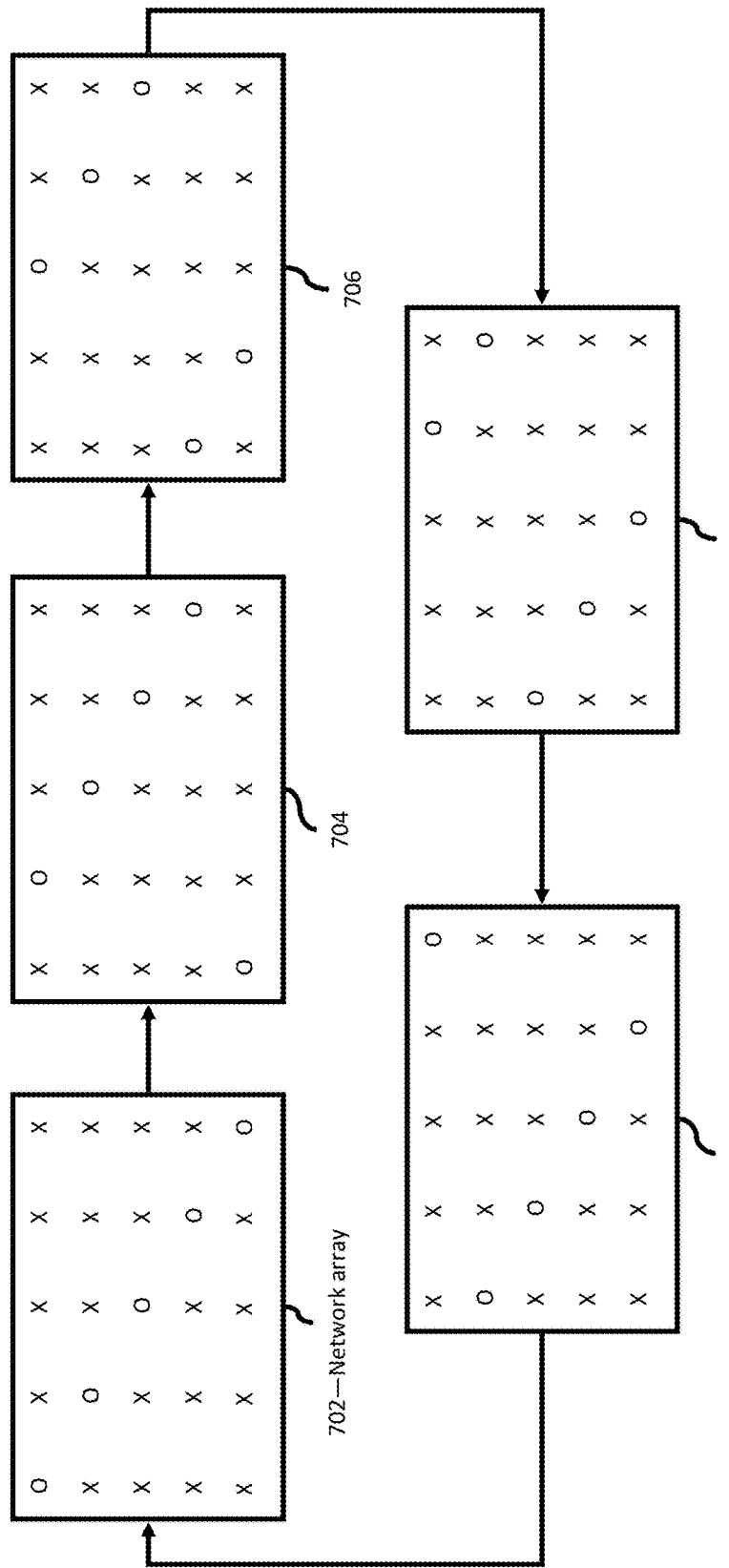
FIG. 7 is a diagram showing an example of synchronization of an array of 25 photon emission housing units to maximize power efficiency at 20%.

FIG. 7 provides an example of synchronization of an array of 25 LED lights to maximize power efficiency, using 20% power when compared to 100% power with all emitters ON. As shown in FIG. 7, a network array of 25 LED lights in a growing facility with 20% of the emitters ON and 80% OFF. Moving in a clockwise fashion, FIG. 7 provides a flow diagram of an array of 25 LED lights with five units in an ON cycle and 20 in an OFF cycle. Step 702 shows a network array of 25 LED lights with five units ON and pulsing photons. Step 704 shows a network array of 25 LED lights with the next 5 units ON and pulsing photons from those in the ON in 702. Step 706 shows a network array of 25 LED lights with the next five (5) units ON and pulsing photons from those in the ON in 704. Step 708 shows a network array of 25 LED lights with the next five (5) units ON and pulsing photons from those in the ON in 706. 710 shows a network array of 25 photon emission housing units with the next 5 units ON and pulsing photons from those in the ON in 708.

The timing and transition of LED lights from ON and OFF is, as discussed above, based on communications between a master and/or gateway with each LED light and the master clock of the mater/gateway and the internal clock within each LED light. The gateway/master will send a command to the emitters with a signal and based on the internal clock of each emitter and the command of the gateway, the emitters will go ON and OFF in order to have an even spread of emitters ON at a certain percentage (example being 20%) and a commensurate percentage OFF.

While FIG. 7 shows an array of 25 photon emitters, it will be understood by one skilled in the art that the array may encompass any number of emitters including 2, 3, 4, 6, 9, 10, 13, 20, 25, 50, 68, 74, 99, 100 1000, 2000, 5000, and 10000 and all integers in between, as will be understood. Further, while FIG. 7 shows an array using the method of the current disclosure to use 20% power when compared all of the emitters ON, it will be understood by one skilled light in the art that the method of the current disclosure can produce a range of power efficiencies from 1%, 5%, 10%, 20%. 50%, 75% and up to 99% depending on the size of the photon emitter array and the desired power usage for the array.

Figure 8:
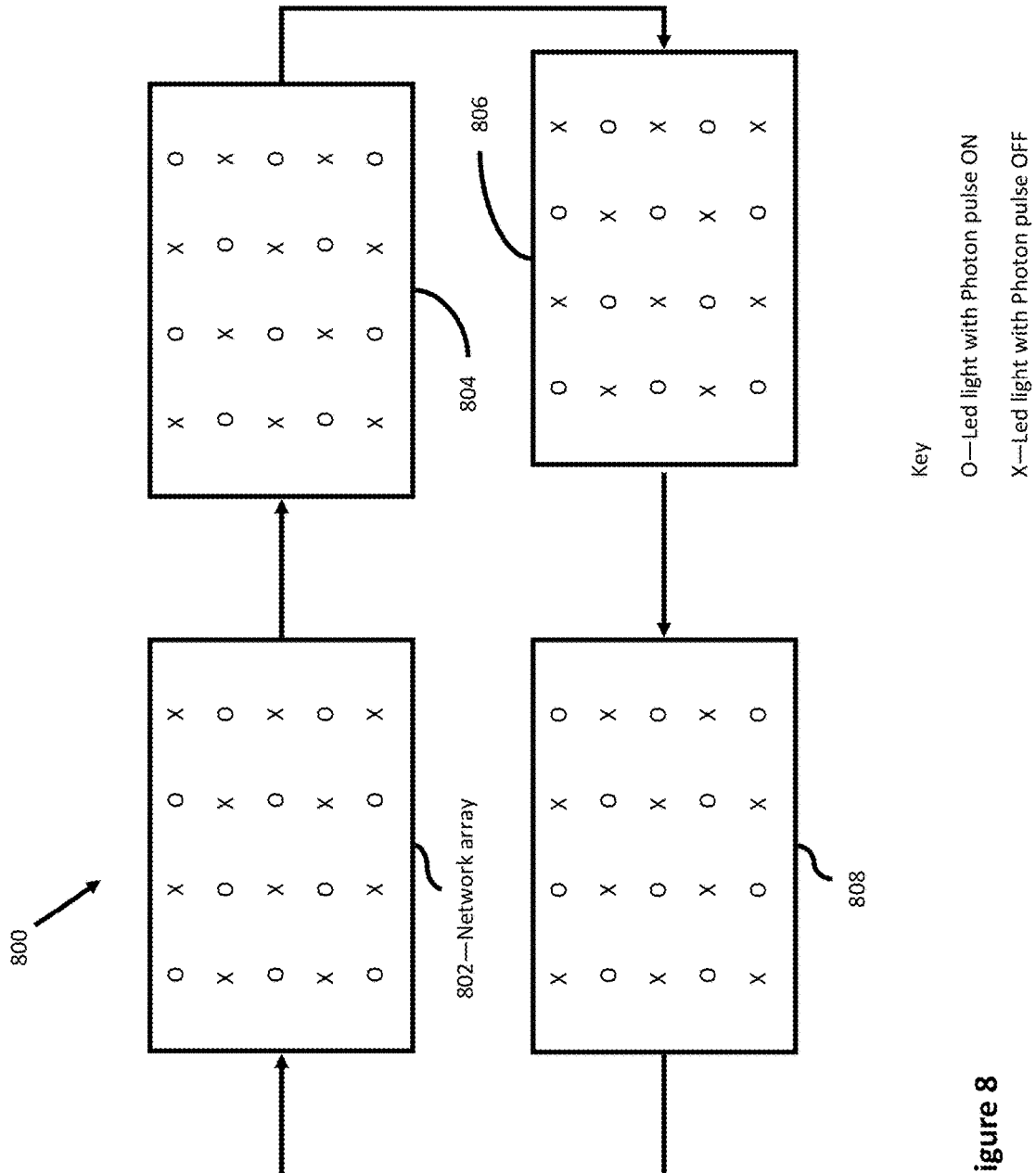
FIG. 8 is a diagram showing an example of synchronization of an array of 20 photon emission housing units to maximize power efficiency at 50%.

FIG. 8 provides a second example of synchronization of an array of 20 LED lights to maximize power efficiency, using 50% power with a shift of 10 LED lights ON while 10 LED lights are OFF. As shown in FIG. 8, a network array of 20 LED lights in a growing facility with 50% of the LED lights ON and 50% OFF. Moving in a clockwise fashion, FIG. 8 provides a flow diagram of an array of 20 LED lights with 10 units in an ON cycle and 10 in an OFF cycle to maximize power efficiency to reduce the power stress to the system, turning 10 units ON at once reduces power stress when compared to 10 at once. Step 802 shows a network array of 10 LED lights with 10 units ON and pulsing photons. Step 804 shows a network array of 20 LED lights with the opposite 10 units ON and pulsing photons from those in the ON in 802. Step 806 shows a network array of 20 LED lights with the opposite 10 units ON and pulsing photons from those in the ON in 804. Step 808 shows a network array of 20 LED lights with the opposite 10 units ON and pulsing photons from those in the ON in 806.

Embodiments of the facility of the present disclosure provide systems, methods and apparatuses for inducing a desired biological response in an organism such a growth, sexual maturity, hunger, calming as well as the production or reduction of specific hormones in an organism through the stimulation and reset of photoreceptors in an organism, the system for inducing a biological response is produced from the synchronization system described above.

The embodiments of the facility provided herein include the use of one or more recipes container one or more repetitive signals from one or a series of LED lights designed to emit the signal with multiple pulsed components, with at least one component that initiates or stimulates a biological response and at least one component that resets the biological response. Each component of the signal contains a photon pulse of at least one light color spectrum or wavelengths that is within 50 nm of the peak absorption of a photoreceptor of the organism corresponding to one or more desired biological responses. Each component further contains has a recipe that contains one or more repetitive photon pulse ON duration as well as an OFF duration and at least one intensity. The relationship between the photon pulse ON and OFF durations of the first component and the second component induces at least one desired biological response in the organism. The signal's first component initiates the biological response and the second component resets the biological response (while additional components may assist with additional biological responses or improving the quality of the biological response) allowing the organism to efficiently receive and process photons from the one or more LED lights in an efficient manner that allows the organism to continuously and efficiently produce the biological response. The biological response can be improved or changed by adjusting the ON and OFF durations of each component thereby changing the relationship or correlation between the initiation component and the reset component.

In an embodiment of the facility of the current disclosure, a biological response is induced in an organism through the stimulation of a biphasic response in an organism through the pulsing or modulation of photons directed and received by an organism's photoreceptor. Photoreceptors are biological chemicals or proteins that can absorb photons and make a physical change in response, such as a chromophore, cryptochromes, hormones, periods, billins, opsins, certain amino acids or a phytochrome through the stimulation and reset of chemicals in the photoreceptor. By way of example, a chiral change, such as the cis-trans isomer in a chromophore of an organism may be stimulated by a specific pulsed component with a pulsed photon train having a specific color spectrum, intensity and pulse rate, allowing for the stimulation of the cis isomer followed by a reset pulsed component with a pulsed photon train having another color spectrum or in some cases, the same color spectrum, an intensity and pulse rate, where this second component resets the isomer through the resetting of the trans isomer.

By way of another example, a conjugated bond in a phytochrome of a plant may be stimulated by a specific pulsed component with a specific color spectrum, intensity and pulse rate, allowing for the stimulation of reaction molecules on the outside of a complex conjugated bond ring followed by a reset pulsed component with another color spectrum or in some cases, the same color spectrum, an intensity and pulse rate, where this second component resets the reaction molecules of the outside of a complex conjugated bond ring.

Photoreceptors, such as chromophore, cryptochromes, hormones, periods, billins, opsins, certain amino acids or a phytochrome (plants), are receptors in an organism that receive photons or lighting in specific wavelengths or colors associated with specific biological responses and are adapted to receive photons of specific color spectrums. The color spectrums and the associated biological responses are specific to an organism. Through the emission of pulsed or modulated photons with a signal from an LED light with a light color spectrum or wavelength that is within 50 nm of the peak absorption of a photoreceptor of the organism, the biological response of the organism can be stimulated and regulated. Based on the response of the organism, the signal and the components within a signal can be adjusted to improve or maximize the desired response. This happens very slowly in nature with natural sunlight causing biological changes in days and seasons. This invention takes advantage of the same biological functions inherent in the organism but by controlling these reactions and forcing them to take place in non-natural faster pulsed timing creating increased control over the biological function.

Chromophores, such as opsins, flavins, and cryptochromes, are photoreceptors that facilitate the absorption of light or photons, particularly blues and green. Visible light that hits the chromophore can be absorbed by exciting an electron from its ground state into an excited state. In certain molecules, chromophores cause a conformational change of the molecule when hit by light.

Opsins are a light sensitive cis-molecule that is photoisomerized to all trans-isomer, thus producing a change in protein conformation and initiating a signaling cascade.

While flavins and flavoproteins contain a chromophore such as riboflavin, flavin mononucleotide, or flavin adenine dinucleotide can carry out redox reactions when excited by light. Cryptochromes are a special subclass of flavoproteins that act as blue light receptors in plants, animals, and even humans.

Phytochromes are shown to be present in all terrestrial plants as well as most green algal. Phytochrome are red/far-red light sensors. In angiosperms, the phytochrome family consists of two types, a light-stable type I and a light-stable type II. In dicots, the phytochrome family consists of five members designated from phyA, phyB, phyC, phyD and phyE. The phytochrome family in grasses contains three different phytochromes designated as phyA, phyB, and phyC.

Phytochromes chromoproteins where the apoprotein is attached to a billin chromophore, forming a holoprotein. Phytochromes, when receiving a red photon signal change the conformation from the inactive to the active form. The inactive form resides in the cytosol, while the active form of all phytochromes translocates into the nucleus. In the cytosol, the active forms of phytochromes have been shown to regulate the translation of mRNA. However, in the nucleus, phytochromes interact with multiple partners to modulate the transcription of downstream target genes to mediate light responses. One of the pivotal interacting partners for phytochromes are phytochrome interacting factors. Phytochrome interacting factors are encoded by a subset of the basic helix-loop-helix (bHLH) transcription factor superfamily. PIFs function as negative regulators of light responses by repressing photomorphogenesis and maintaining the skotomorphogenic state of the etiolated seedlings in darkness. Upon exposure to light, phytochromes promote the turnover of PIFs through rapid phosphorylation, ubiquitination.

Cryptochrome is a photoreceptor that has been shown to control circadian rhythm in both mammals and insects through the interaction of the cryptochrome and clock genes as well as genes associated with magnetic orientation.

Figure 17:
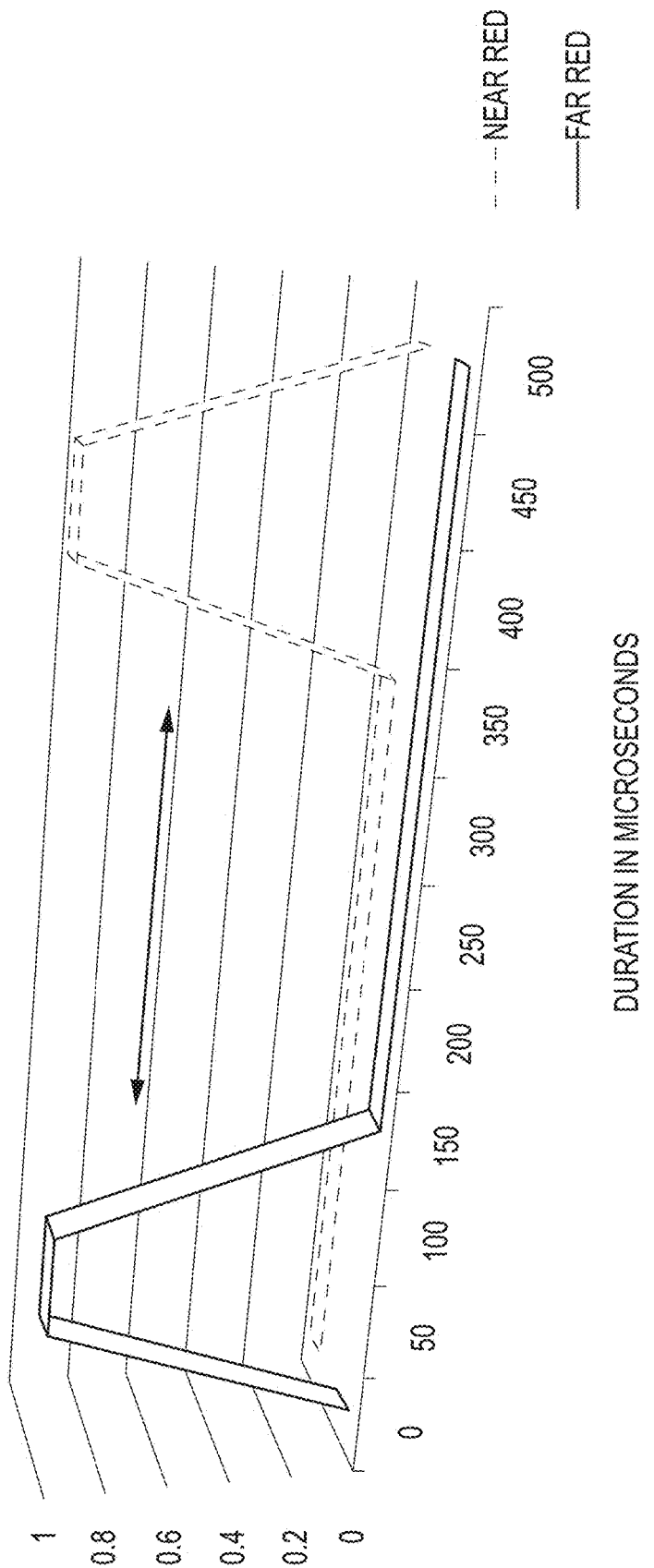
FIG. 17 is an example of adjusting the relationship between the components of a photon signal to improve or maximize the biological response of an organism.

Confirming that the organism is producing the proper biological response is also an aspect of the current disclosure and if the organism is not producing the desired response, then adjusting the photon signal and the relationship of the component to improve or maximize the organism's biological response (shown in FIG. 17). For example, a signal is emitted toward a bird with the desired response improved egg quality using a recipe such as a near red initiation component and a far-red component with both components having a 50 us ON duration and a delay of 200 us the OFF of the near red and the initiation of the far red. The birds are in a dark structure and after illumination by the LED light with near red and far red components, the bird is producing eggs with poor egg quality, such as a thin or thick shell, the lighting recipe can be adjusted to change the relationship between the two signal components, such as reducing the time frame between the near red component going OFF and the far red component going ON.

Embodiments of the present disclosure provide systems, apparatuses and methods for controlling the biological functions of organisms through the use of repetitive photon pulses within one or more photon signals directed toward an organism in order to change or adjust the temporal perception of the organism. As will be discussed in further detail, by controlling the duty cycle, intensity, wavelength band, waveform and frequency of photon signals to an organism, one can put the organism in an alias position such that one or more biological functions can be controlled.

A variety of "LED lights", light emitting devices or lighting assembly capable of producing a modulated emission of photons or a constant form (in conjunction with a modulated form) pulsed with "ON durations" that refer to the duration when an LED light is emitting photons or light. And the corresponding "OFF duration", referring to the duration where and LED light is not emitting photons or light.to send one or more repetitive pulses, waveform or pulse train of photons, where each individual pulse comprises at least one color spectrum, wavelength or multiple color spectrums or wavelengths and is capable varying intensities. A number of LED lights maybe used with the disclosure provided herein, as will be understood by one skilled in the art, including but not limited to, modulation of incandescent lights such as Tungsten-halogen and Xenon, Fluorescent (CFL's), high intensity discharge such as Metal Halide, High-Pressure Sodium, Low-Pressure Sodium, Mercury Vapor, sunlight, light emitting diodes.

The LED lights produce or emit a wavelength, wavelengths or color spectrum ranging from 0.1 to 1600 nm in width including, but not limited to, infrared, red, with near and far red (800-620 nm), orange (620-590 nm), yellow (590 to 520 nm) green, cyan (520 to 500), blue (500 to 435) violet and ultra violet (450 to 380 nm) and white light. Photoreceptors of organisms are capable of absorbing specific wavelengths which stimulate chemical reactions within the organism to stimulate a specific biological response as well as reset the isomer or bond to reset the biological response.

As used herein, the term "ON duration" or "ON durations", refer to the duration when an LED light is emitting photons or light, where the durations of emission can be between 0.01 microseconds, 0.1 microseconds, 1.0 microseconds, 4 microseconds, 15 microseconds, 0.1 milliseconds, 1.0 milliseconds, 25 milliseconds, 220 milliseconds and 5000 milliseconds and all integers in between.

As used herein, the term "OFF duration" or "OFF durations" refers to the duration where an LED light is not emitting photons or light.

As will be discussed in further detail, the modulation or pulsing of photons or light from an LED light to an organism, can stimulate or influence a variety of desired biological responses or functions, including but not limited to, calmness, aggression, socialization, sleep patterns, wakefulness, fertility, ovulation, hunger, feed conversion, egg production, egg weight, egg shell quality, egg nutrients, egg weight distribution, sexual maturity, organism mass, milk production, reduction of hypokalemia, reduction of dystocia, reduction of hypocalcemia, reduction of inflammation, hormone production, behavior and socialization, morphology, root, tissue or hyphal growth, vegetative growth, flower or fruiting body production, fruit, spore or seed production, stopping growth, elongation of a specific plant part, repairing an organism or destruction of the organism and interpolation of circadian inputs. Examples include, but are not limited to; creating a signal with one, two or more components of electro-magnetic wave emission pulse trains (photons or light) of individual color spectrums in sufficient intensity to drive photochemical response in an organism to control a desired biological function, using the relationship between the timing of ON durations of at least two components within a repetitive signal. Specifically, by providing a signal with one or multiple repetitive photons or light pulses at specific combination of rates relative to the timing of the ON duration of each component, including intensities, waveforms, photochemical responses by organisms can be stimulated and optimized and adjusted controlled or determined manner.

While the pulsing of photons to photoreceptors are designed to stimulate a biological response along with a reset of the photoreceptor, the monitoring of the biological response also is an aspect of the present disclosure that is helpful in improving the biological response. By monitoring organisms for infertility, lack of ovulation, lack of hunger, poor food conversion, poor body weight, poor egg production, poor egg quality, thin egg shells, thick egg shells, lack of sexual maturity, poor milk production, dystocia, dehydration, piling or refusal to move from a particular location, reduced or increased hormone production, agitation or aggressive, death, lack of growth, poor flower, seed or fruit production and lack of interpolation of circadian inputs, all may be indicators that the relationship between the components of a signal may need to be adjusted to improve the desired biological response.

As used herein a wireless network is a computer network that uses wireless data connections between network nodes. Wireless networking is a method by which homes, telecommunications networks and business installations avoid the costly process of introducing cables into a building, or as a connection between various equipment locations.[2] Wireless telecommunications networks are generally implemented and administered using radio communication. This implementation takes place at the physical level (layer) of the OSI model network structure. Examples of wireless networks include cell phone network, wireless local area networks (WLANs), ad hoc wireless networks, wireless sensor networks, Bluetooth, ZigBee, mesh network, satellite communication networks, and terrestrial microwave networks.

As used herein a mesh network (or simply meshnet) is a local network topology in which the infrastructure nodes (i.e. LED lights, bridges, switches, and other infrastructure devices) connect directly, dynamically and non-hierarchically to as many other nodes as possible and cooperate with one another to efficiently route data from/to clients. This lack of dependency on one node allows for every node to participate in the relay of information. Mesh networks dynamically self-organize and self-configure, which can reduce installation overhead. The ability to self-configure enables dynamic distribution of workloads, particularly in the event that a few nodes should fail. This in turn contributes to fault-tolerance and reduced maintenance costs As used herein a gateway may be a networking device that provides connection with the outside world ("host") as well as omnidirectional control and communication with a wired or wireless lighting network, a mesh lighting network, a network of sensors, environmental controls or a combination thereof and allows them to communicate in a synchronous or asynchronous manner.

As used herein, a master is a device with omnidirectional control and communication with one or more other devices, such as LED lights, sensors or environmental controller in a lighting system.

As used herein, "duty cycle" is the length of time it takes for a device to go through a complete ON/OFF cycle or photon signal. Duty cycle is the percent of time that an entity spends in an active state as a fraction of the total time under consideration. The term duty cycle is often used pertaining to electrical devices, such as switching power supplies. In an electrical device, a 60% duty cycle means the power is on 60% of the time and off 40% of the time. An example duty cycle of the present disclosure may range from 0.01% to 90% including all integers in between.

As used herein "frequency" is the number of occurrences of a repeating event per unit time and any frequency may be used in the system of the present disclosure. Frequency may also refer to a temporal frequency. The repeated period is the duration of one cycle in a repeating event, so the period is the reciprocal of the frequency.

As used herein, the term "waveform" refers to the shape of a graph of the varying quantity against time or distance.

As used herein, the term "pulse wave" or "pulse train" is a kind of waveform that is similar to a square wave, but does not have the symmetrical shape associated with a perfect square wave. It is a term common to synthesizer programming and is a typical waveform available on many synthesizers. The exact shape of the wave is determined by the duty cycle of the oscillator. In many synthesizers, the duty cycle can be modulated (sometimes called pulse-width modulation) for a more dynamic timbre. The pulse wave is also known as the rectangular wave, the periodic version of the rectangular function. The wave can be one of many shapes such as trapezoid, square, sawtooth or sinusoidal.

As used herein, the term "offset" means an ON or OFF duration of a pulse that is initiated at a different timing from the ON or OFF duration of another pulse. By way of, example a first photon pulse may be initiated at the start of a repetitive cycle or duty cycle with a second photon pulse.

As used herein, Radio-frequency identification (RFID) uses electromagnetic fields to automatically identify and track tags attached to objects. The tags contain electronically stored information. Passive tags collect energy from a nearby RFID reader's interrogating radio waves. Active tags have a local power source (such as a battery) and may operate hundreds of meters from the RFID reader. Unlike a barcode, the tag need not be within the line of sight of the reader, so it may be embedded in the tracked object. RFID is one method of automatic identification and data capture (AIDC).

As used herein, Ethernet, is a family of computer networking technologies commonly used in local area networks (LAN), metropolitan area networks (MAN) and wide area networks (WAN).[1] It was commercially introduced in 1980 and first standardized in 1983 as IEEE 802.3, and has since retained a good deal of backward compatibility and been refined to support higher bit rates and longer link distances. Over time, Ethernet has largely replaced competing wired LAN technologies such as Token Ring, FDDI and ARCNET.

As used herein, "Bluetooth" is a wireless technology standard for exchanging data between fixed and mobile devices over short distances using short-wavelength UHF radio waves in the industrial, scientific and medical radio bands, from 2.400 to 2.485 GHz, and building personal area networks (PANs). It was originally conceived as a wireless alternative to RS-232 data cables.

As used herein, "Zigbee" is an IEEE 802.15.4-based specification for a suite of high-level communication protocols used to create personal area networks with small, low-power digital radios, such as for home automation, medical device data collection, and other low-power low-bandwidth needs, designed for small scale projects which need wireless connection. Hence, Zigbee is a low-power, low data rate, and close proximity (i.e., personal area) wireless ad hoc network.

As used therein, photons are massless, elementary particles with no electric charge. Photons are emitted from a variety of sources such as molecular and nuclear processes, the quantum of light and all other forms of electromagnetic radiation. Photon energy can be absorbed by phytochromes in living mammals and convert it into an electrochemical signal which manipulates a metabolite or other chemical reaction.

As used herein, cis-trans isomers are stereoisomers, that is, pairs of molecules which have the same formula but whose functional groups are rotated into a different orientation in three-dimensional space. This phenomenon can be seen in the vision opsin chromophore in humans. The absorption of a photon of light results in the photoisomerisation of the chromophore from the 11-cis to an all-trans conformation. The photoisomerization induces a conformational change in the opsin protein, causing the activation of the phototransduction cascade. The result is the conversion of rhodopsin into prelumirhodopsin with an all-trans chromophore. The opsin remains insensitive to light in the trans form. The change is followed by several rapid shifts in the structure of the opsin and also changes in the relation of the chromophore to the opsin. It is regenerated by the replacement of the all-trans retinal by a newly synthesized 11-cis-retinal provided from the retinal epithelial cells. This reversible and rapid chemical cycle is responsible for the identification and reception to color in humans. Similar biochemical processes exist in mammals. Phytochromes and pheophytins behave very similarly to opsins in that they can be rapidly regulated to switch between the cis and trans configurations by dosing with differing wavelengths of light.

For chromophores, chromophores are made up of a number of conjugated bonds and when a photon having a specific color hits a chromophore molecule, the photon is absorbed by the molecule and photon excites electrons in the molecule and transfers energy from the photon to the molecule resulting in an excited state in the molecule. The excitation of the molecule results in the reset or delocalization of the conjugated bonds. In chlorophyl, the use of a far-red component is sufficient to reset the conjugated bonds of an excited molecule of a chromophore allowing for the molecule to reset to allow for it to receive photons and return to an excited state.

Regulation of Hormones

The hypothalamus functions as the coordinating center of the endocrine system in organisms such as vertebrates. Inputs from the somatic and autonomic nervous system, peripheral endocrine feedback, and environmental cues such as light and temperature are processed in the hypothalamus. The hypothalamus then affects the function of multiple endocrinologic systems via hypothalamic-pineal interaction (via the suprachiasmatic nucleus) and the hypothalamic-pituitary axis. The hypothalamus is responsible for control of the circadian rhythm, temperature regulation, and metabolism. Hypothalamic hormones also affect pituitary hormone production. Pituitary hormones control adrenal, thyroid, and gonadal function in addition to water balance, growth, modification of behavior, reproduction cycling, hair growth, calming or metabolism rates. and milk production.

The hypothalamus is located in the middle of the head. It is posterior to the eyes and sits just below the third ventricle and above the optic chiasm and pituitary gland. Afferent inputs to the hypothalamus originate from the brainstem, thalamus, basal ganglia, cerebral cortex, olfactory areas, and the optic nerve. Efferent pathways go to the brainstem reticular centers, autonomic nervous system, thalamus, pineal gland, median eminence, and the hypothalamo-neurohypophysial tract which connects the paraventricular and supraoptic nuclei to nerve terminal in the posterior pituitary.

In mammals, the eye functions as the primary source of photoreceptors and subsequently light input. This primarily occurs through the rods/cones in the retina that utilize opsin-based proteins (chromophores). Rhodopsin in the best known of these photoreceptors in mammals. A novel photopigment, melanopsin, has also been identified in retinal ganglion cells named ipRGCs (intrinsically photosensitive retinal ganglion cells), but do not have classic photoreceptive tasks. Opsins are known to be widely expressed in other mammalian tissues but the utility and function of these is not as well documented. OPN3 is one example of an extraocular opsin. OPN3 is expressed in the brain, testis, liver, placenta, heart, lung, muscle, kidney, pancreas, scrotum and skin.

Visual photoreceptors take light input from the eye and turn this into an electrical impulse that is then sent through the optic nerve. Many of these cells continue to the visual center of the brain in the occipital lobe but some of the neurons traverse to the Suprachiasmatic nucleus (SCN) within the hypothalamus. The SCN serves as the main controller of the circadian rhythm in humans through the expression of "clock genes". These "clock genes" transcribe various proteins that result in control of multiple behavioral and physiological rhythms including locomotion, sleep-wake cycles, thermoregulation, cardiovascular function, and many endocrine processes.

Additional hypocretin-producing neurons in the lateral hypothalamus respond to the nutritional status of the organism and light cues from the SCN to stimulate alertness, appetite, and feeding behaviors. Disturbances of these cycles can result in abnormalities of metabolism that lead to obesity and metabolic syndrome (diabetes type II, hyperlipidemia, and hypertension).

A multi-synaptic pathway utilizing the sympathetic nervous system from the SCN to the pineal gland controls release of melatonin from the pineal gland. Melatonin is derived from serotonin which itself is derived from the amino acid tryptophan. Melatonin is directly involved in the regulation of the circadian rhythm but also has a key role in the reproductive physiology of mammals. Specific effects include changes in sperm count, changes in progesterone, estradiol, luteinizing hormone, and thyroid levels. Melatonin can also inhibit sex drive and alter menstruation. Photoperiod directly correlates to melatonin release and the resulting timing of breeding season in mammals. Melatonin also affects the sleep-wake cycle, can decrease motor activity, lower body temperature, and induce fatigue.

Regulation and release of other hormones from the hypothalamus and pituitary can also be affected by complex pathways that involve the SCN. The hypothalamus releases hormones that travel down the pituitary stalk to the pituitary gland. These hormones then cause release or inhibition of pituitary hormones. Pituitary hormones then express their effect widely throughout the body. Examples of hypothalamic and pituitary hormones are shown in Table 2 below:

TABLE 2

| Hypothalamic Hormones | Pituitary Hormones |
| --- | --- |
| Corticotropin-releasing hormone | Adrenocorticotropic hormone (ACTH) |
| Corticotropin-releasing hormone | Melanocyte-stimulating hormone |
| Corticotropin-releasing hormone | Endorphins |
| Growth hormone releasing hormone | Growth hormone |
| Gonadotropin-releasing hormone | Luteinizing hormone (LH) and follicle-stimulating hormone (FSH) |
| Thyrotropin-releasing hormone | Thyroid-stimulating hormone (TSH) |
| Prolactin-releasing factors (serotonin, acetylcholine, opiates, & estrogens) | Prolactin |
| Somatostatin | Inhibits release of growth hormone |
| Prolactin-inhibiting factors (dopamine) | Inhibits release of prolactin |

Table 3 below describes the effects of the hormones listed in Table 2:

TABLE 3

| Hormone | Effect |
| --- | --- |
| ACTH | Stimulates cortisol which increases blood sugar, suppresses the immune system, and affects metabolism of fat, protein, and carbohydrates |
| Melanocyte-stimulating hormone | Stimulates production and release of melanin in skin and hair, suppresses appetite, contributes to sexual arousal |
| Endorphins | Inhibits transmission of pain signals, produces feeling of euphoria |
| Growth hormone | Promotes cell growth and reproduction, cell regeneration, raises glucose and fatty acids, stimulates production of IGF-1 |
| LH & FSH | Triggers ovulation, stimulates production of testosterone, regulation of menstrual cycle, production of sperm |
| TSH | Stimulates release of thyroid hormone from the thyroid gland which affects basal metabolic rate, impacts body temp and vascular dilatation, affects growth and brain development, sexual function, sleepy, thought patterns |
| Prolactin | Milk production in females, also plays a role in metabolism, immune system regulation, and pancreatic development |
| Somatostatin | Inhibits release of growth hormone |

Melatonin (N-acetyl-5-methoxytryptamine) is a major regulatory component of the circadian rhythm produced in the pineal gland by the amino acid, tryptophan, via a series of hydroxylation and methylation reactions. In response to reduced light, by night-time, a melatonin secretion signal is sent by the optic nerve to the pineal gland which boosts melatonin production. Upon production, melatonin is secreted into the bloodstream and carried throughout the body.

Follicle-stimulating hormone (FSH) is a gonadotropin, a glycoprotein polypeptide pituitary hormone. The hormone is synthesized and secreted by the gonadotropic cells of the anterior pituitary gland, and has been found to regulate the development, growth, pubertal maturation, and reproductive processes of the body.

Luteinizing hormone is a pituitary hormone produced by gonadotropic cells in the anterior pituitary gland. In females, a rise in the hormone has been found to trigger ovulation as well as the development of the corpus luteum. In males, the hormone has been found to stimulate production of testosterone.

Corticotropin-releasing hormone (CRH) is a 41-amino acid peptide derived from a 196-amino acid preprohormone. CRH is secreted by the hypothalamus in response to stress. Increased CRH production has been observed to be associated with Alzheimer's disease and major depression, and autosomal recessive hypothalamic corticotropin deficiency has multiple and potentially fatal metabolic consequences including hypoglycemia. In addition to being produced in the hypothalamus, CRH is also synthesized in peripheral tissues, such as T lymphocytes, and is highly expressed in the placenta. In the placenta, CRH is a marker that determines the length of gestation and the timing of parturition and delivery. A rapid increase in circulating levels of CRH occurs at the onset of parturition, suggesting that, in addition to its metabolic functions, CRH may act as a trigger for parturition.

The posterior pituitary also functions by releasing hormones synthesized in the hypothalamus. These hypothalamic neurons produce hormones that are mobilized down the axon of the cell and terminate in the posterior pituitary. The main neurohypophysial hormones and their effect are shown in Table 4:

TABLE 4

| | |
|---|---|
| Vasopression | Anti-diuretic action on the kidney, mediates vasoconstriction of the peripheral vessels |
| Oxytocin | Mediates contraction of the smooth muscle of the uterus and mammary glands |

Given the photoreceptive pathways discussed above, extraocular photoreceptors, as well as the many complex interactions that involve the hypothalamus (pituitary, brain stem, autonomic nervous system, and peripheral endocrine feedback), a number of hormones, including those in Tables 2, 3 and 4 as well as those listed below, may be regulated by the methods and systems described herein through the use of pulsed photon inputs.

In addition to the hormones provided above, number of additional hormones may be regulated in mammals using the methods and systems provided herein, including but not limited to:
A. Amino acid derived hormones such as epinephrine, triidothuyronine and thyroxine.
B. Eicosanoid hormones such as but not limited to leukotrienes.
C. Peptide hormones such as but not limited to amylin, insulin, insulin-like growth factor, and parathyroid hormone.
D. Steroid hormones such as testosterone, estradiol and progesterone.

Figure 11:
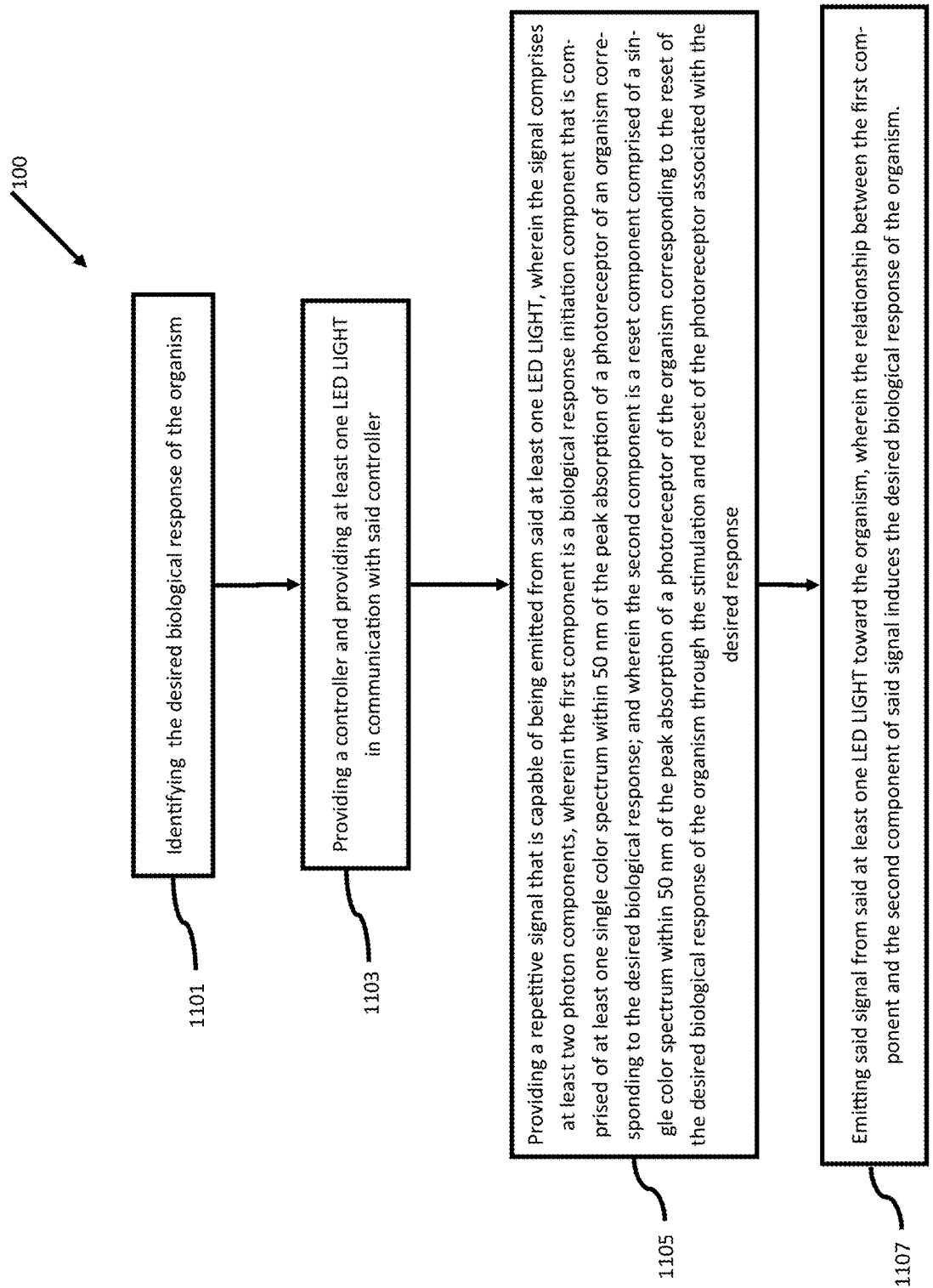
FIG. 11 is a flow chart showing an example method for inducing and resetting a desired biological response in an organism.

FIG. 11 shows a flow diagram for an example of a method for inducing a desired biological response in an organism 100. As shown in FIG. 11, in step 1101, the desired biological response of the organism is identified. In step 1103, a controller and at least one LED light is provided. The controller provides controls and instructions to the LED light as to the recipe of the photon signal to be emitted toward an organism, as well as instructions in regards to the wavelengths within each component of a signal, ON and OFF durations for each component, and signal intensity. In step 1105 a photon signal from the LED light is emitted toward an organism. The signal is comprised of at least two components, a first component that is a biological response stimulation or initiation component comprised of at least one single color spectrum within 50 nm of the peak absorption of a photon receptor of the organism corresponding to the desired biological response. The second component of the signal is a biological response reset component comprised of a single-color spectrum within 50 nm of the peak absorption of a photon receptor of the organism corresponding to the desired biological response through the stimulation and reset of the organism's photon receptor. In step 1107, the signal is emitted from the LED light toward the organism. The relationship between the first component and the second component of induce the desired biological response of the organism.

The biological response is induced in an organism through the use of the first component to initiate or stimulate a molecule associated with a photoreceptor in an organism through the pulsing or modulation of photons directed and received by an organism's photoreceptor such as a chromophore or a phytochrome. The initiation component excites the molecule by transferring the energy of the photon to the molecule. The reset component reset the molecule to again be excited by more photons from another initiation component. By way of example, the cis-trans isomer in a chromophore of an organism may be stimulated or excited by a specific pulsed component with a pulsed photon train having a specific color spectrum, intensity and pulse rate, allowing for the stimulation of the cis isomer followed by a reset pulsed component with a pulsed photon train having another color spectrum with different Offset or timing or in some cases, the same color spectrum, an intensity and pulse rate, where this second component resets the isomer through the resetting of the trans isomer.

The effectiveness of the photon signal to produce the desired response in an organism can be confirmed in two ways: the first is to look to see if the organism is actually producing the desired response. If it is not, then the relationship between the components of the photon signal can be adjusted to improve or maximize the organism's biological response (shown in FIG. 17). As shown in FIG. 17, if a signal is emitted toward a bird with the desired response improved egg quality using a recipe such as a near red initiation component and a far-red component with both components having a 50 us ON duration and a delay of 200 us the OFF duration of the near red and the initiation of the far red. The birds are in a dark structure and after illumination by the LED light with near red and far red components, the bird is producing eggs with poor egg quality, such as a thin or thick shell, the lighting recipe can be adjusted to change the relationship between the two signal components, such as reducing the time frame between the near red component going OFF and the far red component going ON.

Another way to confirm the effectiveness of the photon signal directed toward an organism is producing the signal that is needed to produce the desired response is to use a light meter. The light meter can be placed under the LED light used to measure the wavelengths emitted by the LED light, the timing of the pulses of each component and the intensity of the components to confirm the desired photon signal is being emitted or to identify how the photon emission signal needs to be adjusted.

Figure 12:
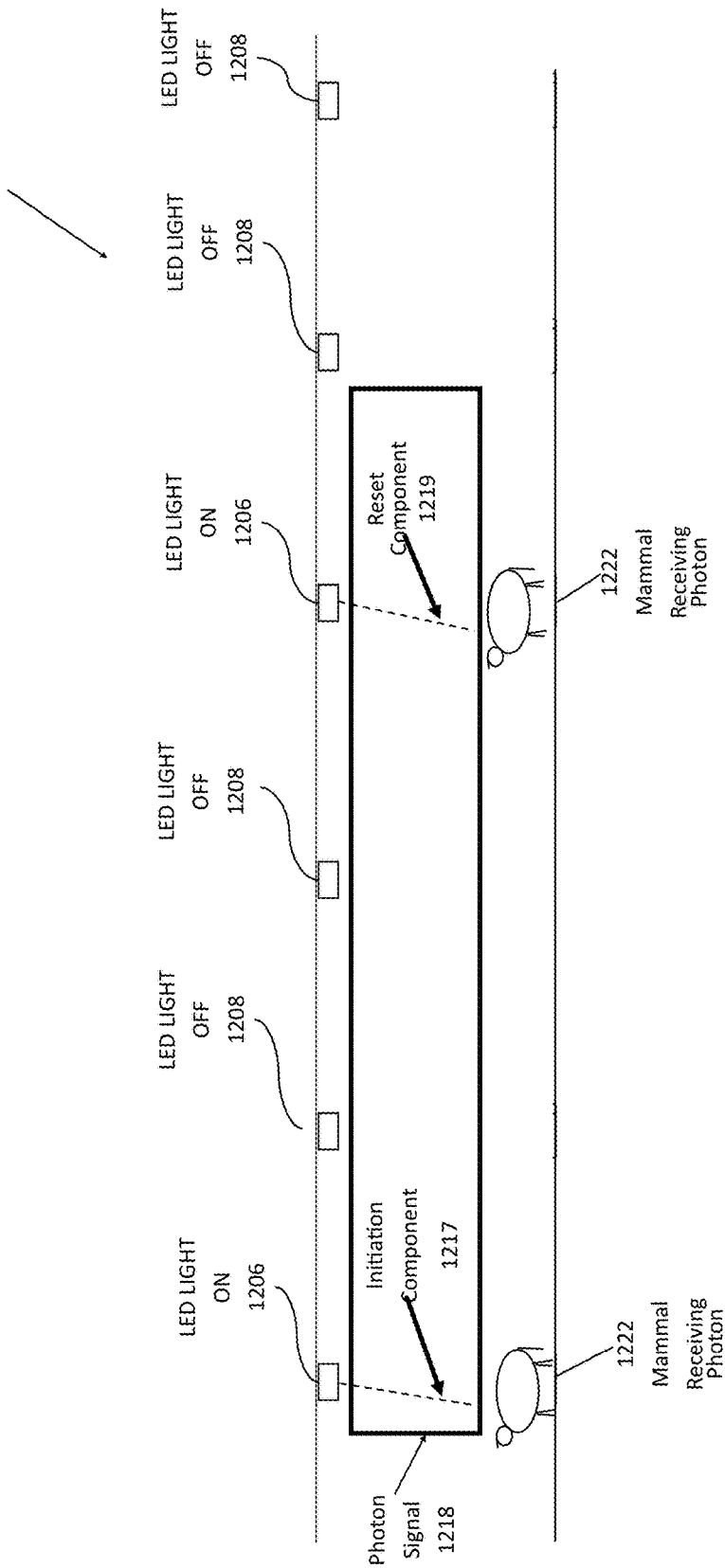
FIG. 12 is a diagram showing an example method for inducing and resetting a biological response in a mammal.

FIG. 12 provides a block diagram showing an example of a method for producing a desired response in a mammal through the use of a signal with at least one initiation component and a reset component 1200. As shown in FIG. 12, an LED light having at least two photon emitting components 1206 and 1208 is shown over a period of time. The LED s in the light are in communication with a photon emission modulation controller or control assembly (now shown) for the purpose of modulating or pulsing the emission of photons or light to an organism, such as a mammal, bird, reptile, fish, crustacean, plant, algae, or fungus for inducing and resetting a desired biological response by stimulating/exiting photoreceptor molecules and then resetting the molecule to allow for further excitation. Photoreceptors such as opsins or chromophores are stimulated by photons of a specific color in order to induce and regulate the desired biological response, such as hormone or enzyme production. The relationship between components within a signal of modulated photons or light to a mammal, bird, fish or other organisms, initiate a biological response by exciting the photoreceptor molecule and then reset the molecule to allow for further excitation, by pulsing an initiation component followed by a reset component, the signal allows for peak stimulation/modulation of an organism's biological response (such as opsin receptors in mammals, fish and birds) and biological responses, including hormone production such as the pulsing of one or more specific spectrums of light within a signal to induce a specific electrochemical signal for the production of a specific hormone followed by a reset signal, such as far red, allowing for an increase in the production of specific hormones from 0.1%, 1.0%, 5%, 7.5%, 10%, 12.2%, 20%, 33.3%, 50%, 81.7%, 100%, 143.9%, 150%, 181.4%, 200%, 250%, 444.2%, 500% and 5000% or greater and all integers in between, over the baseline hormone level of a mammal, fish or bird, or a decrease in the production of specific hormones from 0.1%, 1.2%, 7.7%, 10%, 15.6%, 20%, 47.2%, 50%, 74.5%, 100%, 150%, 200%, 250%, 500% and 5000% or less and all integers in between, under the baseline hormone level of a mammal, fish or bird, along with regulation or control of an organism's mood by reducing stress or calming the organism. Further the modulation of photons in a specific wavelength within 50 nm of the peak absorption of the photoreceptor allows for the optimization of photon absorption.

Figure 14:
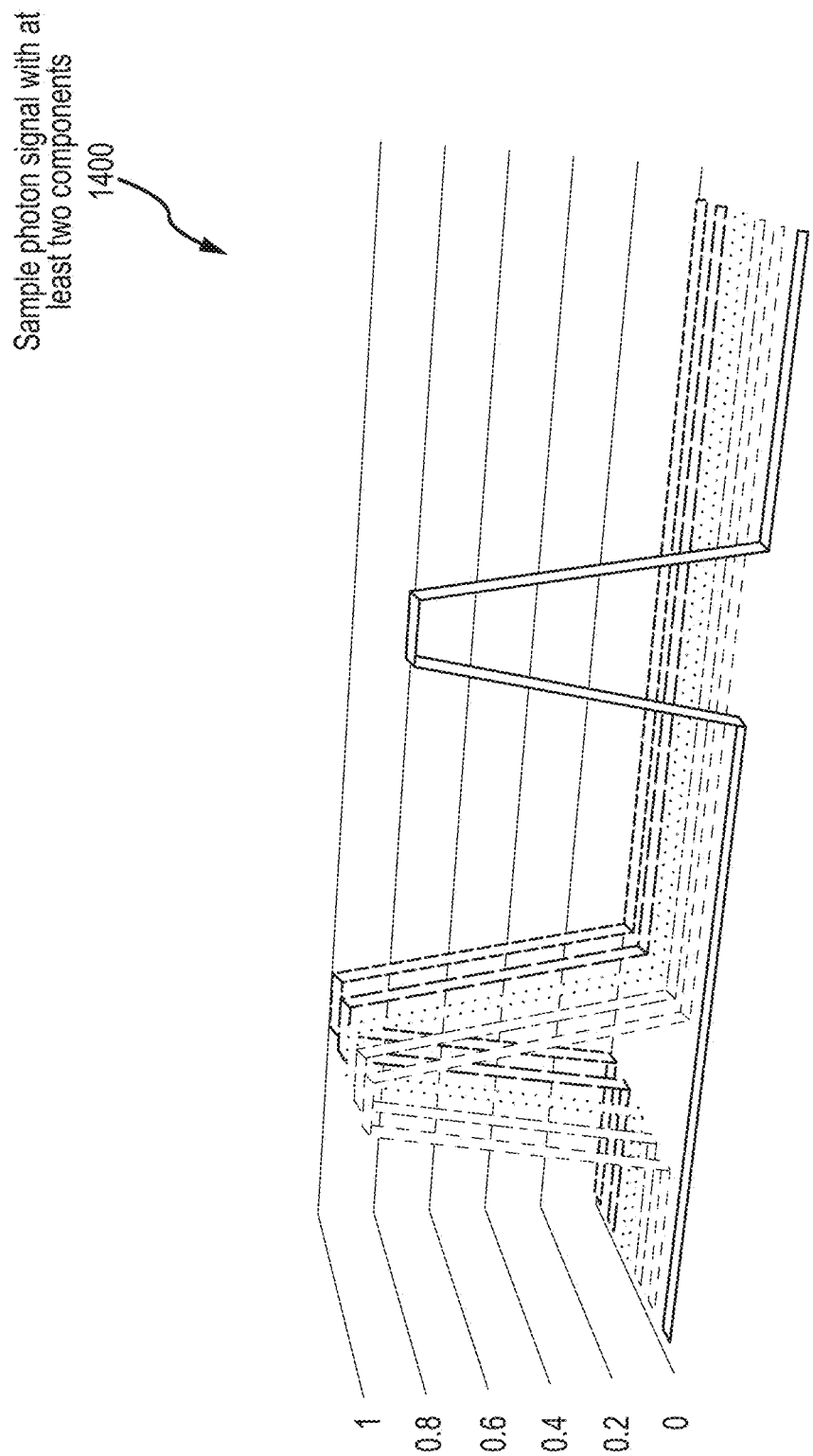
FIG. 14 is a sample photon signal with at least two components, where the first component is made up of multiple color spectrums and intensities.
Figure 15:
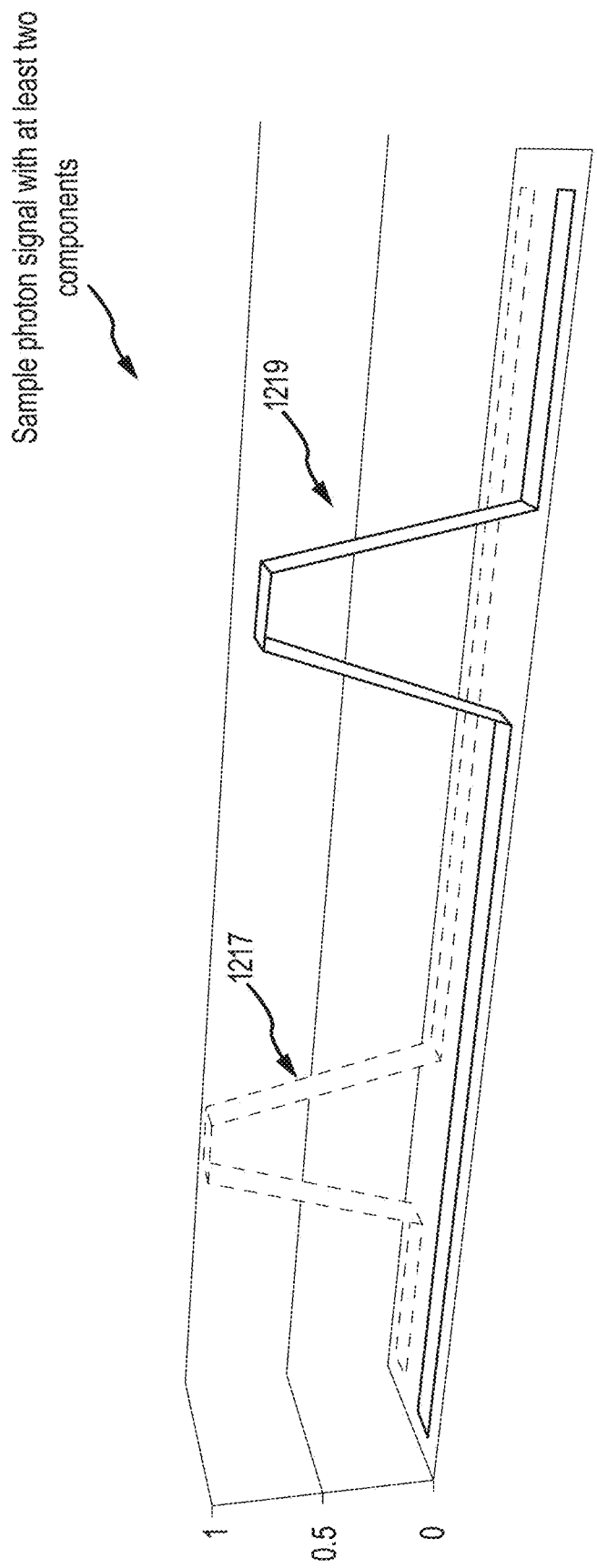
FIG. 15 is a sample photon signal with at least two components.

In an embodiment of the facility of the present disclosure, each initiation component and reset component within a signal may have the same photon pulse intensity, or one or more intensities. Each intensity may range from 0.1% to 500% when compared to a 100% intensity. By way of example, as shown in FIG. 14, one component of a signal may be composed of one, two or more photons each with a different wavelength.

Each individual wavelength of a component (Initiation or Reset) may have its own photon pulse intensity, below are examples of this embodiment:

Example A a. Initiation component:
   i. A wavelength of 660 nm at an intensity 48%;
b. A reset component that comprises:
   i. A wavelength of 740 nm with an intensity of 60%.

Example B a. Initiation component:
   i. A wavelength of 660 nm at an intensity 100%;
   ii. A wavelength of 545 nm at an intensity 22%;
b. A reset component that comprises:
   iii. A wavelength of 740 nm with an intensity of 150%.

Example C c. Initiation component:
   iv. A wavelength at 445 nm with an intensity of 78%;
   v. A wavelength of 465 nm with an intensity of 150%;
   vi. A wavelength of 395 nm with an intensity of 25%; and
   vii. Two components with a wavelength of 660 nm at an intensity 48%;
d. A reset component that comprises:
   viii. A wavelength of 740 nm with an intensity of 150%.

Example D a. First Initiation component:
   ix. A wavelength at 445 nm with an intensity of 78%;
   x. A wavelength of 465 nm with an intensity of 150%;
e. Second initiation component where the timing of the second is different from the first:
   xi. A wavelength of 660 nm with an intensity of 25%; and
   xii. Two components with a wavelength of 660 nm at an intensity 48%;
b. A reset component that comprises:
   xiii. A wavelength of 740 nm with an intensity of 60%.

Example E c. First Initiation component:
   xiv. A wavelength at 445 nm with an intensity of 78%;
   xv. A wavelength of 465 nm with an intensity of 150%;
f. Second initiation component where the timing of the second is different from the first:
   xvi. A wavelength at 445 nm with an intensity of 150%;
   xvii. A wavelength of 465 nm with an intensity of 25%;
d. A reset component that comprises:
   xviii. A wavelength of 740 nm with an intensity of 45%.

Example F e. First Initiation component:
   xix. A wavelength at 445 nm with an intensity of 78%;
   xx. A wavelength of 465 nm with an intensity of 150%;
g. Second initiation component where the timing of the second is different from the first:
   xxi. A wavelength of 630 nm with an intensity of 25%; and
   xxii. Two components with a wavelength of 660 nm at an intensity 48%;
f. A first reset component that comprises:
   xxiii. A wavelength of 740 nm with an intensity of 60%.
h. A second reset component that comprises:
   xxiv. A wavelength of 395 nm with an intensity of 95%.

Each photon signal will be repeated in a repetitive cycle once the ON and OFF durations of the second component is completed.

The intensities of the components within a signal may also be the same but adjusted based upon the desired response of the organism and/or the life cycle of an organism. By way of example, a young cow may be illuminated in a photon signal designed to encourage hunger and interpolation of circadian rhythms with a target intensity of 200 mW/m$^2$. After the young cow has reached a certain age or desired weight, the recipe of the signal may be amended to encourage milk production with a target intensity of 100 mW/m$^2$.

The modulation of the photon pulses increases energy and heat efficiency of current lighting systems by reducing the overall power draw by the system of the present disclosure as much as 99% or more of the photon source when compared to conventional facilities used in the plant, beef, dairy, pork, egg, healthcare, and poultry production lighting systems, such as a 60 watt or 1000 watt lights, thereby reducing the amount of power and cooling and cost used to facilitate production changes in artificially lighted agricultural facilities or healthcare facilities or home use facilities. In an example of the energy saving potential of the system of the present disclosure, the system pulses 49.2 watts of photons for two microseconds per 200 microseconds creating an effective power consumption of 0.49 watt-hrs/hr on the power payment meter or 0.82% of the power in a 60-watt standard incandescent bulb. In addition, because the LED light is not continuously emitting photons, the amount of heat produced from the LED light will be significantly reduced, thereby significantly reducing the cost of cooling a facility to compensate for the increased heat from lighting. The system of the present disclosure may be customized based upon organism specific requirements for photon intensity, pulse ON duration, pulse OFF (or duty cycle), the light spectrum of the pulse including but not limited to white, near-red, yellow, green, and blue, orange, far-red, infrared, and ultra-violet to encourage optimal hormone production as well as the control of the organism's stress and mood.

A master logic controller or gateway (MLC) (now shown), such as solid-state circuit with digital output control or a central processing unit (CPU) is in communication with a photon emission modulation controller by means of a communication signal (not shown). The MLC provides the system of the present disclosure with input/output of the parameters and the appropriate instructions or the specialized functions for the modulation of photons within a signal from an LED light 106 and 108.

Please note that in another embodiment not shown in FIG. 12, a gateway may be in direct communication with the LED lights 1206 and 1208 without the need of an MLC or a photon emission modulation controller, allowing the gateway to provide direct instructions and control of the LED lights for the modulation of photons toward an organism.

In a further embodiment, the MLC may be hard wired or wireless to an external source such as a host, allowing external access to the MLC by a host. This allows remote access by a user to monitor the input and output of the MLC, provide instructions or control to the systems while also allowing for remote programming and monitoring of the MLC.

In a further embodiment, a power measurement or power consumption sensor may be integrated or embedded into the LED lights or MLC in the form of circuitry allowing for the measurement and reporting of the power consumption of the system based on the voltage and the current draw of the system of the present disclosure. The power consumption of the system can then be communicated either wirelessly or by hardwire from the MLC to a host. Data, including power consumption may also be sent to an outside receiver such as a database that is not connected to the system. Based upon power usage the system can modify the photon emission of the LED lights to change the power usage of the system. In a further embodiment, the power supply of the LED lights can include power factor correction circuitry to increase the current efficiency of the power utilized by the pulsing of current through light emitting diodes.

The photon emission modulation controller receives commands and instructions from the MLC (the "Recipe") including but not limited to the duration ON and intensity, duration OFF duty cycle, intensity, wavelength band or color spectrum and frequency of each component of the repetitive photon signal from an LED light. It should be understood that the Recipe can reside in the Gateway, Master or LED light. The photon emission modulation controller may be any device that modulates the quanta and provides the control and command for the duration ON and intensity, duration OFF, wavelength band and frequency of each repetitive photon pulse from an LED light 1206 and 1208. A variety of devices may be used as the photon emission modulation controller 1204 as will be understood by one skilled in the art, including but not limited to a solid-state relay (SSR), such as the solid-state relays, FETs, BJTs from Minecraft Inc., optical choppers, power converters and other devices that induce modulation of a photon pulse. A variety of LED lights 106 and 108 may be used, including but not limited to, modulated incandescent (Tungsten-halogen and Xenon), Fluorescent (CFL's), high intensity discharge (Metal Halide, High-Pressure Sodium, Low-Pressure Sodium, Mercury Vapor), sunlight, light emitting diodes (LED lights) and lasers. It should be understood that this description is applicable to any such system with other types of photon emission modulation controllers, including other methods, systems or apparatuses to cycle a light or photon source ON and OFF, cycling one or more colors or spectrums of light at different times, durations and intensities, such as near-red, green, blue and far-red, allowing multiple pulses of one spectrum while also pulsing another spectrum at the same time with at least one aspect of the second pulse that is different chosen from the ON duration, intensity, OFF duration and color spectrums, as will be understood by one skilled in the art, once they understand the principles of the embodiments.

Based on the instructions from the MLC, the photon emission modulation controller sends a photon emission control signal to at least one photon emitting component of the LED light 1206. When the photon emission control signal is sent to the LED light 1206, based on the instructions within the signal, the LED light emits a photon signal 1218 with at least two components, (shown in FIG. 12) at least one initiation or stimulation component 1217 with one or more wavelengths and one reset pulse component 1219 with at least one wavelength (such as a far red wavelength pulse), where each response inducing component photon pulse of the signal has a different wavelength color, and/or an ON duration that is initiated and completed prior to the initiation and completion of the ON duration of the reset pulse, which is transmitted to an organism, such as mammal, plant or bird.

As shown in FIG. 12, the recipe containing a repetitive photon signal comprises an initial component to excite the molecule of the corresponding photoreceptor with a near red and a component to reset the molecule with a far-red component. In this example, both components are initiated at the same time with the near red pulse component ON for a duration and then OFF followed after a period of time by an ON duration of the far-red pulse followed by an OFF duration of the far-red pulse. The entire signal comprising both components is then repeated until the desired response is completed. The quality of the biological response produced by the signal can be adjusted by adjusting the relationship between The example of FIG. 12 provides a photon signal comprising far red 1219 and near red 1217 components, however, other components may include wavelength colors such as ultraviolet, violet, near-red, green, yellow, orange, blue and near-red, far-red, as will be understood by one skilled in the art, once they understand the principles of the embodiments. It should also be understood that this ON and OFF cycling can be in the form of a digital pulse, pulse train, or varying waveform.

Figure 16:
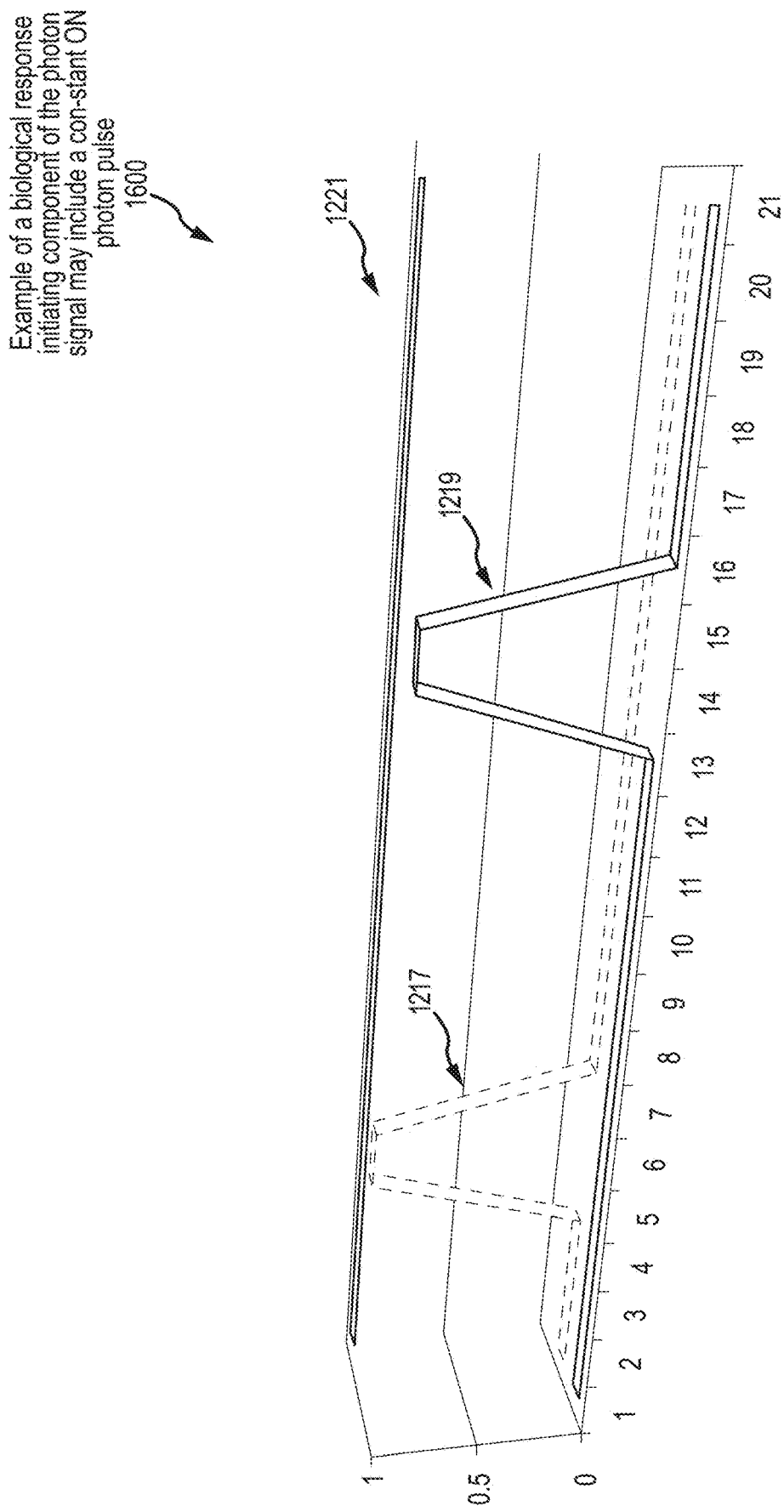
FIG. 16 is an example of a biological response initiating component of the photon signal which may include a constant ON photon pulse.

In another example, shown in FIG. 16 of the present disclosure, the biological response initiating component of the photon signal may include a constant ON photon pulse 1221 with one, two, three or more wavelengths (including a full spectrum of colors or "white") however the signal will still include additional components for response inducing 1217 and a resent component 1219 that is pulsed in the ON duration and OFF (such as for 50 us, 100 us, 250 us, 500 us, 1000 us, 5000 us or 10000 us) before the signal is repeated.

The modulation of individual color spectrums of photons to plants, fungi, yeast, bacteria, mammals, such as cattle, horses, humans, dogs, cats or pigs, birds, such as chickens, or fish, such as salmon, trout, tuna, tilapia, by providing at least one biological response inducing component within a signal, allows for peak stimulation of a mammal's biological components and responses through the efficient excitation and resetting of the molecules associated with color specific and response specific photoreceptors, such as a mammal's retina opsins and hypothalamus opsins for ovulation, pineal gland to regulation hormone production. This peak stimulation allows for the regulation of biological responses such as the production of hormones by increasing the production of specific hormones from 0.1%, 1.0%, 5%, 7.5, 10%, 12.2%, 20%, 33.3%, 50%, 81.7%, 100%, 143.9%, 150%, 181.4%, 200%, 250%, 444.2%, 500% and 1000% and all integers in between, over the baseline hormone level of an organism, such as a mammal, bird, or fish, or decreasing the production of specific hormones from 0.1%, 1.2%, 7.7%, 10%, 15.6, 20%, 47.2%, 50%, 74.5%, 100%, 150%, 200%, 250%, 500% and 1000% and all integers in between, under the baseline hormone level of a mammal as in the mammal, along with regulation or control of a mammal's mood by reducing stress or calming the mammal.

Examples of the ability to induce/excite and reset or regulate photoreceptor molecules for specific biological responses in an organism through the pulsing of individual color spectrums, specific color wavelength or a range of color wavelengths may include but are not limited to:

a. milk production in mammals through the modulation of pulses when melanopsin is pre-stimulated with 620 nm light responses to 480 nm light is enhanced;

b. use of blue spectrum between 390 nm to 470 nm to treat jaundice in prenatal mammals, such as human premature babies;

c. ovulation through the modulation of pulses of a specific far-red wavelength (such as 730 nm, an example wavelength range may include 710 nm to 850 nm) for a period of time;

d. hunger, growth, sexual development as well as helps to control the mood of the mammals by pulses of blue light, as well as the regulation of circadian rhythms (an example range may include with a range of 450 nm to 495 nm);

e. ultraviolet or violet light (by example 10 nm to 450 nm) may be used to influence social behavior and mood as well as to facilitate nutrient update such as calcium;

f. additional orange light (590 nm to 620 nm) and/or yellow light (570 nm to 590 nm) may also be used to influence mammal responses;

g. egg production in birds through the modulation of pulses of a specific far-red or in combination with near red wavelengths (example wavelengths may include 620 nm to 850 nm) for a period of time;

h. hunger, growth, sexual development as well as helps to control the mood of the birds by pulses of blue light, as well as the regulation of circadian rhythms (an example range may include with a range of 450 nm to 495 nm);

i. green light (such as 560 nm, but may include 495 nm to 570 nm) may be used to promote or stimulate growth, including muscle growth, improve reproduction as well as egg quality;

j. additional orange light (590 nm to 620 nm) and/or yellow light (570 nm to 590 nm) may also be used to influence bird responses.

k. the control of seed germination in some higher plants through the modulation of pulses of a specific far-red wavelengths (such as 730 nm, an example wavelength range may include 710 nm to 850 nm) for a period of time and then pulses of blue light (an example range may include with a range of 450 nm to 495 nm) in combination with near red light (such as 660 nm, an example range may include range of 620 nm to 710 nm);

l. increased growth of higher plants through the cycling of pulses of near red wavelengths with pulses of blue wavelengths and far-red wavelengths;

m. seed production in higher plants through the exposure of plants to shortened pulses of blue light after and exposure of lengthened pulses of near red light and far red light;

n. flower production where if various types of higher plants are exposed to a variation of pulses timing of far-red light (730 nm to 850 nm) after the exposure to pulses of near red light and blue light, the plants are induced to flower; and o. destruction of organisms such as bacteria or a virus where in an organism is exposed to a pulse of an ultraviolet wavelength such as 243 nm, while the spectrum of ultra violet will be understood by one skilled in the art, an example range may include with a range between 200 nm and 275 nm.

The ability to initiate, regulate and control desired biological responses is based on the relationship or correlation between response initiation component or components and the response reset component within a signal. Each organism has a peak absorption for a desired biological response based on the peak absorption of the photoreceptor for the color spectrum associated with the desired biological response. If for example, one skilled in the art was using recipe shown in FIG. 17 to induce improved egg quality in poultry or ovulation in horses and the results shown poor yolk formation or lack of ovulation, as shown in FIG. 17, the relationship between the components can be adjusted to improve the biological response. By way of example, the ON duration of the initiation component may be increased and time between the start of the OFF duration of the initiation component and the start of the ON duration of the reset component may be decreased or increased.

As will be understood by one skilled in art, in an additional embodiment, the method for use in the regulation of a desired biological response, such as the expression of hormones as described herein may be completely housed in a single unit comprising multiple LED lights creating an array, allowing each individual single unit to be self-sufficient, without the need for an external control or logic unit. An example self-sufficient unit with multiple LED lights may be in the form of a unit that may be connected to a light socket, or light fixtures that may be suspended above one or more mammals and connected to a power source.

An additional example embodiment to the methods, systems and apparatuses described herein may include less heat creation: LED lighting intrinsically creates less heat than conventional lights. When LED lights are used in a dosing application, they are ON less than they are OFF. This creates an environment with nominal heat production from the LED lights. This is not only beneficial in terms of not having to use energy to evacuate the heat from the system but is beneficial to the mammal because lighting may also be used to reduce animal stress or calm the animal.

The systems as shown in FIG. 11 may also take the form of a gateway/LED light system, a gateway/master/emitter system, or a master/slave system, where by example, a master LED light containing all logic and controls for the emission of photon from master LED light as well as any additional LED lights in communication with the master LED light.

An embodiment provided herein includes the regulation of hormones in organisms such as mammals, birds, fish, reptiles, and others through the emission of one or more repetitive signals with a response initiating component and a response reset component illuminating or radiating an organism, where each component contains repetitive pulse group with at least one individual color spectrums or ranges of color spectrums, including blue, green and/or red spectrums, at a frequency, intensity and duty cycle, which can be customized, monitored and optimized for the specific hormone to be regulated in the mammal while minimizing energy used in the system.

By way of example, by supplying control over the rates and efficiencies of modulated photon energy to the mammal, different parts of the photostimulation of the mammal's opsins located in the hypothalamus and the retina (such as red opsins and green opsins) photo receptors are maximized allowing for regulation of hormones, including an increase in the production of specific hormones from 0.1% 10%, 20%, 50%, 100%, 150%, 200%, 250%, 500% and 1000% or greater and all integers in between, over the base line hormone level of a mammal, a decrease in the production of specific hormones from 0.1% 10%, 20%, 50%, 100%, 150%, 200%, 250%, 500% and 1000% or less and all integers in between, under the base line hormone level of a mammal as in the mammal, as well as regulation or control of a mammal mood by reducing stress or calming the mammal.

Opsins are a type of membrane bound phytochrome receptors found in the retina and the hypothalamus region of the brain of mammals. Opsins mediate a variety of functions in mammals, including hormone production, through the conversion of photons of light into an electrochemical signal.

In dairy cattle, the pineal gland is involved in synthesizing and secreting the hormone melatonin. This synthesis is initiated in mammals via light information received in the suprachiasmatic nuclei via the retinohypothalmic tract. Melanopsin, which is a photopigment, is thought to play an important role in this light signaling cascade. Melanopsin is in ganglion cells such as rods and cones and is also found throughout many of the structures in the brain. Some Melanopsin photoreceptors have a peak light absorption at 480 nanometers. Additionally, studies have shown that when melanopsin is pre-stimulated with 620 nm light responses to 480 nm light is enhanced. This efficiency has also been proven to be wavelength, irradiance and duration dependent.

Melanopsin stimulation is thought to inhibit melatonin production by the pineal gland. Melatonin production is directly related to milk production in dairy cows as it is an inhibitor to prolactin, the hormone responsible for milk production. Studies have shown that cows which are between milk production cycles which have higher melatonin levels will produce more milk when brought back into a production cycle. Low melatonin levels are also important during the milk production cycle as it allows for maximum prolactin levels.

In an embodiment of the facility of the current disclosure, by using the method of illuminating dairy cattle with a photon signal with a near red initiation component and a far-red reset component, melatonin levels in dairy cattle can be regulated, allowing for improved milk production in cattle. This same mechanism is thought to exist in all mammalian species.

Melatonin is also an important element of a mammal's sense of photoperiod which is directly hormonally tied to the ovulation cycle of the animal. By regulating melatonin levels in mammals via alternating wavelengths of light mammalian ovulation may be regulated.

The responses of mammals to the variations in the length of day and night involve photon absorption molecular changes that closely parallel those involved in the vision cycle in humans.

Mammal responses to a photon signal with one or more specific photon components may be monitored depending upon the desired hormone to be regulated. When the desired hormone is the production of melatonin, the mammal may be monitored for the stimulation of the pineal gland for the expression or release of melatonin or the release of luteinizing hormones, a heterodimeric glycoprotein to indicate impending ovulation in female mammals. Melatonin or luteinizing hormones may be monitored via blood or urinary samples. Samples may be taken daily or at various times during the day to identify the mammal reaction to the photon modulation to ensure efficient ovulation, or milk production.

The present disclosure also provides methods and systems for the amount of electric power used in the process of mammal, bird, fish, reptile and other vertebrate hormone production, where the amount of energy delivered can be defined by calculating the total area under the graph of power over time. The present disclosure further provides methods and systems that allow for the monitoring, reporting and control of the amount of electric power used to regulate a desired hormone in a mammal, allowing an end user or energy provider to identify trends in energy use.

An embodiment of the system of the present disclosure comprises at least one LED light with at least one photon source, such as an light emitting diode or array of light emitting diodes in communication with a photon emission modulation controller, including but not limited to a digital output signal, a solid-state relay or field effect transistor BJT, or FET, or power converter. LED lights are modulated to send a signal with two or more components of repetitive pulse of photons, where each individual pulse comprises at least one color spectrum, wavelength or multiple color spectrums, full light or wavelengths and is capable varying intensities. Each photon pulse is directed toward an organism for a duration of time ON between 0.01 nanoseconds and 5000 seconds (such a 50 us, 100 us, 500 us, 50 ms, 75 ms, 200 ms, 750 ms, 12 seconds, 50 seconds) and all integers in between (nanoseconds, microseconds, milliseconds, and seconds) OFF durations between 0.1 microseconds and 24 hours, and all integers in between, such as two milliseconds, 10 microsecond or 5 seconds with one or more intensities, with a duration of delay or time OFF between photon pulses, such as two hundred milliseconds or up to 24 hours.

The methods described above and shown in FIG. 11 and FIG. 12 may also take the form of a synchronized series of lights or daisy chain of lights, a mesh network of lights or a synchronized array, where by example, two or more LED lights are in communication with each other as well as a gateway or a gateway/master in order to synchronize the emission of signals with two or more components or two or more LED lights where the communication, control and photon emission signal is held in one LED light ("Master LED light") and said communication, control and photon emission is transferred through hardwire or wireless to one or more other LED lights. To clarify, each LED light will individually emit a signal comprising at least two components, however the system, by example, through commands from a master logic controller or Master LED light, will allow for the emission of signals from the series of emitters to be synchronized.

A variety of power supplies may be used in the present disclosure. These sources of power may include but are not limited to battery, converters for line power, capacitor, solar and/or wind power. The intensity of the photon pulse may be static with distinct ON/OFF cycles or the intensity may be changes of 5% or larger of the quanta of the photon pulse. The intensity of the photon pulse from the LED light can be controlled through the variance of voltage and/or current from the power supplies and delivered to the light source. It will also be appreciated by one skilled in the art as to the support circuitry that will be required for the system of the present disclosure, including the LED light control unit and the LED lights. Further, it will be appreciated that the configuration, installation and operation of the required components and support circuitry are well known in the art. The program code, if a program code is utilized, for performing the operations disclosed herein will be dependent upon the particular processor, circuitry and programming language utilized in the system of the present disclosure. Consequently, it will be appreciated that the generation of a program code from the disclosure presented herein would be within the skill of an ordinary artisan.

Figure 13:
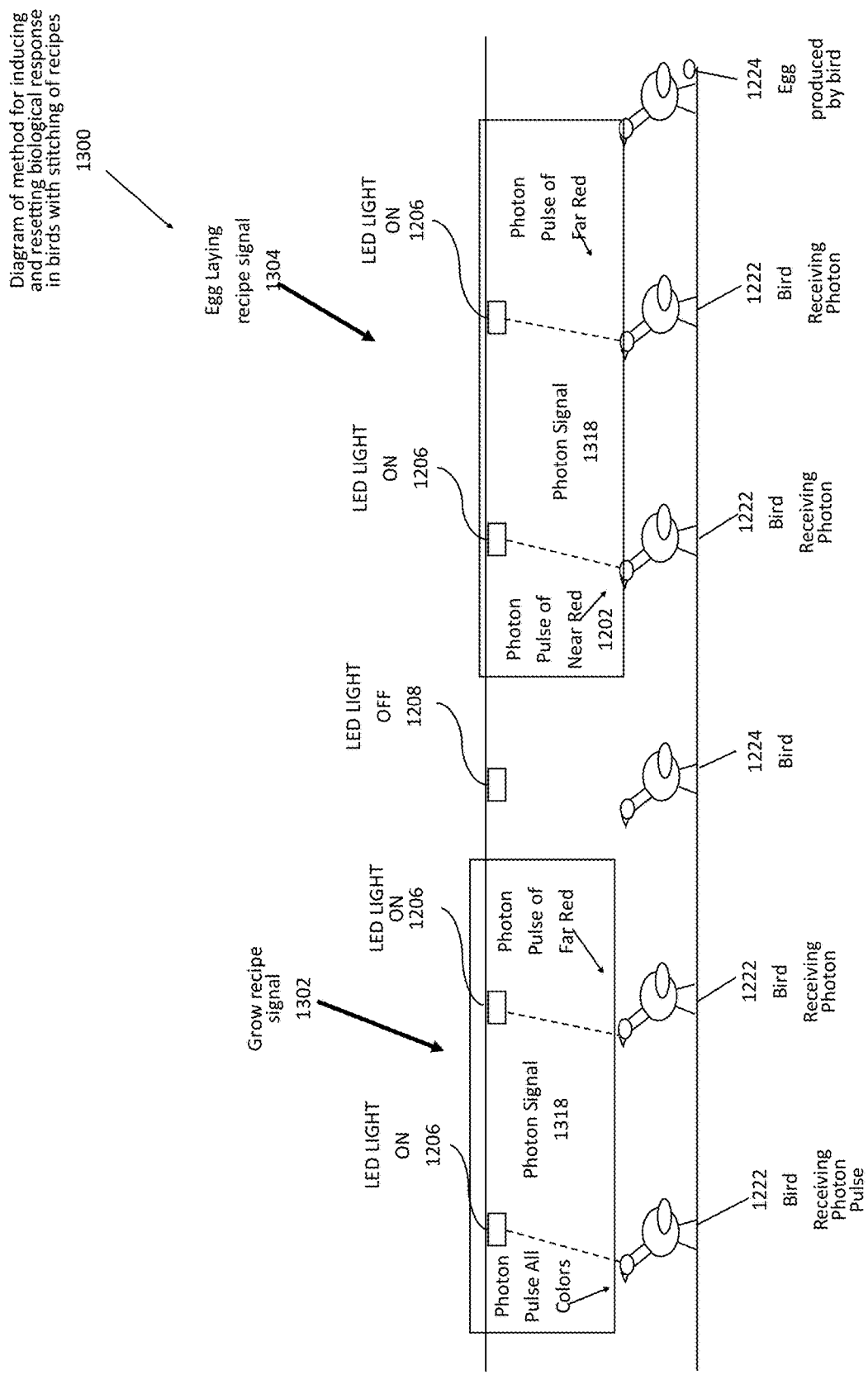
FIG. 13 is a diagram showing an example method for inducing and resetting a biological response in birds with the stitching of recipes.

In another example embodiment of the facility of the current disclosure, FIG. 13 provides a block diagram showing an example of a method for the regulation of biological responses in birds through the initiation and stimulation of the photoreceptor molecules, such as excitation of cis/trans isomers of the bird and the reset of the cis-trans isomer through the use of the reset component (such as far-red) at the end or near the end of repetitive signal toward the bird. As shown in FIG. 13 and repeated from FIG. 12, an LED light 1206 and 1208 is shown over a period of time in communication with a photon emission modulation controller for the purpose of modulating individual pulses of photons comprising individual color spectrums to a bird (not shown), including but not limited to white, green, near-red, blue, yellow orange, far-red, infrared, and ultra-violet color spectrums, wavelength between 0.1 nm and 1 cm. As will be understood by one skilled in the art, the present disclosure may include color spectrums of specific, individual wavelengths between 0.1 nm and 1.0 cm, or may include a range or band of wavelengths 0.1 to 1600 nm in width.

The modulation of individual color spectrums of photons to a bird by providing at least one component that is a response inducing color spectrum pulse and a reset component within a signal, initiated in synchronization but offset within the signal and then repeated, allows for peak stimulation of a bird's biological components and responses, such as a bird's retina opsins and hypothalamus opsins for ovulation, pineal gland to regulation hormone production. This peak stimulation allows for the regulation of hormones by increasing the production of specific hormones such as melatonin from 0.1%, 1.0%, 5%, 7.5%, 10%, 12.2%, 20%, 33.3%, 50%, 81.7%, 100%, 143.9%, 150%, 181.4%, 200%, 250%, 444.2%, 500%, 888% and 2000% and all integers in between, over the baseline hormone level of a bird, or decreasing the production of specific hormones such as melatonin from 0.1%, 1.2%, 7.7%, 10%, 15.6%, 20%, 47.2%, 50%, 74.5%, 100%, 150%, 200%, 250%, 500% and 4000% and all integers in between, under the baseline hormone level of a bird, along with regulation or control of a bird's mood by reducing stress or calming the bird and increasing livability.

The modulation of individual color spectrums, specific wavelengths and a range of wavelengths of photons to a bird by providing specific color spectrum pulses for a duration along with a delay between pulses also allows for the control hormone production for mood, growth, ovulation, sexual maturity, interpolation of circadian rhythm and hunger in bird. An example may include one light or through the combination of many lights, cycling the lights on and off to control ovulation, egg production, hunger and mood.

As discussed in FIG. 13 and repeated from FIG. 12, a master logic controller or gateway (MLC) is in communication with a photon emission modulation controller by means of a communication signal. The MLC provides the system of the present disclosure with input/output of the parameters and the appropriate instructions or the specialized functions for the modulation of a specific individual color spectrum of photons from an LED light 1206 and 1208.

The photon emission modulation controller receives commands and instructions from the MLC (or in an embodiment with a gateway the MLC and the photon emission modulation controller may not be provided) including but not limited to the duration ON and intensity, duration OFF, wavelength band and frequency of each repetitive initiating photon pulse 1202 and reset pulse 1204 within a photon signal 1218 or a plurality of pulses of a specific color spectrum from an LED light 1206 and 1208 within a photon signal. The photon emission modulation controller provides the control and command for the duration ON and intensity, duration OFF, wavelength band and frequency of each repetitive response initiating photon pulse 1202 and reset pulse 1204 within a photon signal 1218 or plurality of pulses from an LED light 1206, and 1208.

In FIG. 13, the bird is received a photon signal 1218 with a growth recipe 302 and then over time, as the bird gets older and gains weight, the recipe of the photon signal is changed to an egg laying recipe 1304. This adjustment or change in recipes to change to the biological response in the organism is termed "stitching" recipes together and allows one to modify or change the biological response of an organism based on changes in the recipe.

As shown in FIG. 12, based on the instructions from the MLC 1202 (or in an embodiment with a gateway), the photon emission modulation controller 1204 sends a photon emission control signal to an LED light 1206 and 1208. When the photon emission control signal sent to the LED light 1206 ON, the LED light 1206 emits one or more repetitive photon pulses of a specific color spectrum 1202 or 1204, comprising the photon signal 1218, which is transmitted to a bird 1222. Then based on the instructions from the MLC 1202, when the LED light control signal sent to the LED light 1208 goes OFF, the LED light 1208 will not emit a photon signal, and therefore no photons are transmitted to a bird 1222. As shown in FIG. 12, starting from the left side of FIG. 12, the emission of a photon signal 1218 comprising repetitive photon pulses of a specific color spectrum 1202 (response initiating green) and 1204 (reset far-red) and bird 122 hormone production is shown over a period of time. The example of FIG. 12 provides a photon signal 1218 with photon pulse or plurality of pulses of a green color spectrum 1202 emitted from an LED light 1206 for two (2) milliseconds, followed by a photon pulse or plurality of pulses of a far-red color spectrum 1204 for a duration of two (2) milliseconds with a duration of delay of two hundred (200) milliseconds of each pulse before the photon signal repeats with a photon pulse or plurality of pulses 1202 emitted from the same LED light 1206 for two milliseconds followed by a second photon pulse or plurality of pulses of a far-red color spectrum 1204 for a duration of two milliseconds from the same LED light 1214 (please note that FIG. 12 is a descriptive example of photon pulses emitted over time, the signal and the components with the signal are then repeated as desired. FIG. 12 is not drawn to scale and the amount of hormone production by the bird between pulses in FIG. 12 is not necessarily to scale). Please note that the two components (green and far-red) within the signal 1218 are pulsed simultaneously but with their durations ON and OFF offset in this example. While two photon pulses are shown in FIG.

12, as one skilled in the art will understand once they understand the invention, any number of pulses, from 1 to 15 or even more, may be within a photon signal directed to an organism.

The method of the present disclosure as described in FIGS. 12 and 13 allows for the regulation and control of the production of various hormones in a mammal or a bird through the cycling of initiating and reset component with one or more colors or spectrums of light at different times, durations and intensities, such as near-red, green, blue and far-red, allowing single pulses or multiple pulses of one spectrum with a delay before pulsing another spectrum. The pulsing of individual color spectrums in unison or individually offset for a duration with a delay between pulses within a signal allows for increased efficiency in the stimulation of opsins for hormone regulation and production by the stimulation of opsins and a cis to trans conversion as well as the reset of the cis trans isomer.

A variety of sources or devices may be used to produce photons from the LED lights, many of which are known in the art. However, an example of a device or sources suitable for the emission or production of photons from an LED light include a light emitting diode, which may be packaged within a light emitting diode array designed to create a desired spectrum of photons. While LED lights are shown in this example, it will be understood by one skilled in the art that a variety of sources may be used for the emission of photons including but not limited to sun light, metal halide light, fluorescent light, high-pressure sodium light, incandescent light as well as light emitting diodes and lasers. Please note that if sun light or a metal halide light, fluorescent light, high-pressure sodium light, incandescent light is used with the methods, systems and apparatuses described herein, the proper use of these forms of LED lights would be to modulate and then filter the light to control what wavelength for what duration is passed through.

Embodiments of the present disclosure can apply to LED lights having various durations of photon emissions, including durations of photon emissions of specific color spectrums and intensity. The pulsed photon emissions of specific color spectrums within a photon signal may be longer or shorter depending on the organism in question, the age of the organism and how the emission will be used in facilitating the regulation of hormones and control of stress or mood.

The use of an array of LED lights may be controlled to provide the optimal photon pulse of one or more color spectrums for specific mammal ovulation, milk production and growth such as in beef or specific bird ovulation, egg production, or hunger. The user may simply select the photon pulse intensity, color spectrum, frequency and duty cycle in addition to the photon pulse intensity, color spectrum, frequency and duty cycle of a resetting component for a particular type of organism to encourage efficient biological responses in that organism. LED light packages can be customized to meet each organism's specific requirements. By using packaged LED light arrays with the customized pulsed photon emission, as discussed above, embodiments described herein may be used to control light to alter the organism weight, and sexual maturity within the target organism.

FIG. 13 provides a block diagram showing an example of a photon modulation management system 1300 for the regulation of cis trans isomers in birds to initiate a desired response in birds. As shown in FIG. 13, an LED light 1206 and 1208 is shown over a period of time in communication with a photon emission modulation controller 1204 for the purpose of emitting signals comprising initiating components and cis-trans reset components that are directed toward birds.

The modulation of individual color spectrums, specific wavelength and a range of wavelengths of photons to a plant by providing a signal with at least one initiating component and at least one reset component allows for the control of plant responses such as root production, vegetative growth, flowering, seed and fruit production.

The most common pigments utilized for plant growth are chlorophyll a, b, c, and d, phycobilins, terpenoids, carotenoids, cryptochromes, UV-B receptors (such as riboflavinoids), flavonoids, and betacyanins. These photoreceptors transfer their electrochemical energy to the electron transport chain. The photon absorbing photoreceptors such as chlorophyll, terpenoids, carotenoids etc. are actually conjugated molecules known as chromophores that allow for the conversion of photons into electrical potentials. Chromophores exist in many other biological functions outside of plants, including melanocytosis and color sensing cells in human vision.

The responses of plants to the variations in the length of day and night involve photon absorption molecular changes that closely parallel those involved in the vision cycle. Chrysanthemums and kalachoa are great examples of this. They flower in response to the increasing length of the night as fall approaches. If the night is experimentally shortened, the plants will not flower. If the plants are exposed to near red (660 nm) of light then they will not flower. If the plants are then exposed to far red (730 nm) after the exposure to near red then they will flower. It is well known that wheat, soybean, and other commercial crops are best suited or being grown in specific latitudes with different periods of light and darkness. The absorption of near red pigment (cis) converts the pigment to a far-red absorption state (trans). The near red/far red chemical reversing also controls seed germination and growth cycles. These photo-absorbing chromophores in plants have been named phytochromes. It is also understood that Pheophytins (Chlorophyll a, b, and c that lack the $Mg^{2+}$ ion) also naturally exist in plants. The Pheophytins lack of double bond ring can also exhibit the cis trap configuration changes. They are control mechanisms for triggering and controlling both growth cycles and reproduction cycles. These control triggers can be altered and/or controlled by modifying the dosing of photons to cause rapid cis trans configuration changes as compared to naturally occurring or normal artificial light sources.

Phytochromes and cryptochromes are proteins capable of absorbing specific wavelengths of light resulting in a conformational/geometric change or a change in binding affinity. These molecules are key in giving the plant cues on time of day, seasonality, and other external stimuli. This in turn can have differing impacts on growth, DNA transcription, and plant hormone control. Different studies have shown that the growth pattern of a plant can depend on the last wavelength "seen" by the plant. Studies have shown that lettuce exposed to near-red light vs far-red light prior to growth under white light will show different growth patterns. Another example is directly tied to permeability of gibberellic acid, a potent plant hormone that stimulates growth and elongation of cells. A phytochrome in the stroma of etioplasts/chloroplasts can absorb far-red light causing a change in binding affinity. This phytochrome can then bind with gibberellic acid transport proteins in the etioplast/chloroplast membrane that cause an increase in gibberellic acid permeability through the membrane. By absorbing near-red light, the phytochrome will undergo a different conformational change that decreases its binding affinity for gibberellic permeases and permeability decreases. Thus specific wavelengths "seen" by the plant can result in different cell processes taking place. Pulsed lighting with targeted alternating wavelengths can direct these cell processes to occur in a directed pattern by causing conformational changes in specific phytochromes in the plant.

The photochrome molecule is made up of an open group of atoms closely related to the rings in the chlorophyll molecule. It has two side groups that can change from the cis form to the trans when they are excited by specific pulses of light, however, a shift in the position of the molecule's hydrogen atoms is more likely. The changes in the phytochrome molecule following excitation by a flash of light is similar to those in rhodopsin. These intermediate stages also involve alterations in the molecular form of the protein associated with phytochrome, just as there are alterations in the form of opsin, the protein of rhodopsin. In its final form phytochrome differs from rhodopsin in that the molecule of phytochrome remains linked to the protein rather than being dissociated from it. Far-red light will reverse the process and convert the final form of phytochrome back to its initial red-absorbing form, although a different series of intermediate molecular forms is involved. Again, these are just a few examples of how controlling the modulated pulsing of light can control/enhance growth, repair and destruction of biological organisms.

Furthermore, when organisms are subject to varying amounts of light, often in excess, the efficiency of photosynthesis is decreased and can even damage components of the electron transport chain. In the presence of excess light for example, the chlorophyll may not rapidly transfer its excitation energy to another pigment molecule and thus will react with molecular oxygen to produce a highly reactive and damaging free radical superoxide. The plant must then spend energy otherwise reserved for growth to create protecting molecules such as Carotenoids and superoxide dismutase to absorb the excess superoxides. By supplying control over the rates and efficiencies of modulated photon energy to the organism, different parts of the photochemical reaction can be maximized and the amount of electric power used in the process can be reduced.

Traditional light sources, as well as sunlight, create a bottleneck insofar as energy transfer in an organism is concerned. Chromophores of chlorophyll for example absorb protons and through the electron transport chain and redox reactions to convert the energy to sugars. In each lamellae structure in chlorophyll, there is on average one sink for this energy for every 500 chlorophyll molecules. This is one example where the bottleneck in an organism is created insofar as energy transfer is concerned. Giving a plant more light does not directly mean that the plant will be able to process the extra light. In an overly simplified explanation, it is believed that phytochrome molecules are not only involved in the very slow (more hormone based) influence of germination, growth, and reproduction rates of various organisms, but also perform and regulate very fast membrane and energy sink reactions within the lamellae. Therefore, it can be assumed that controlling and altering the natural timing and synchronization of photon pulses to photochromic response will affect germination, growth, and reproduction rates of various organisms.

Table 5 below provides a table of lighting options with FIGS. 18-27 providing diagrams corresponding to the options provided below. As shown in Table 5, column one provides the name or designation of the lighting option or pulse signal, column two provides the colors pulses corresponding to the initiation component and the reset component of each lighting option, column three is the duration ON of each pulse within the pulse signal, column four is the duration OFF of each pulse within the pulse signal, column five provides the time from ON to OFF.

TABLE 5

Figure 18:
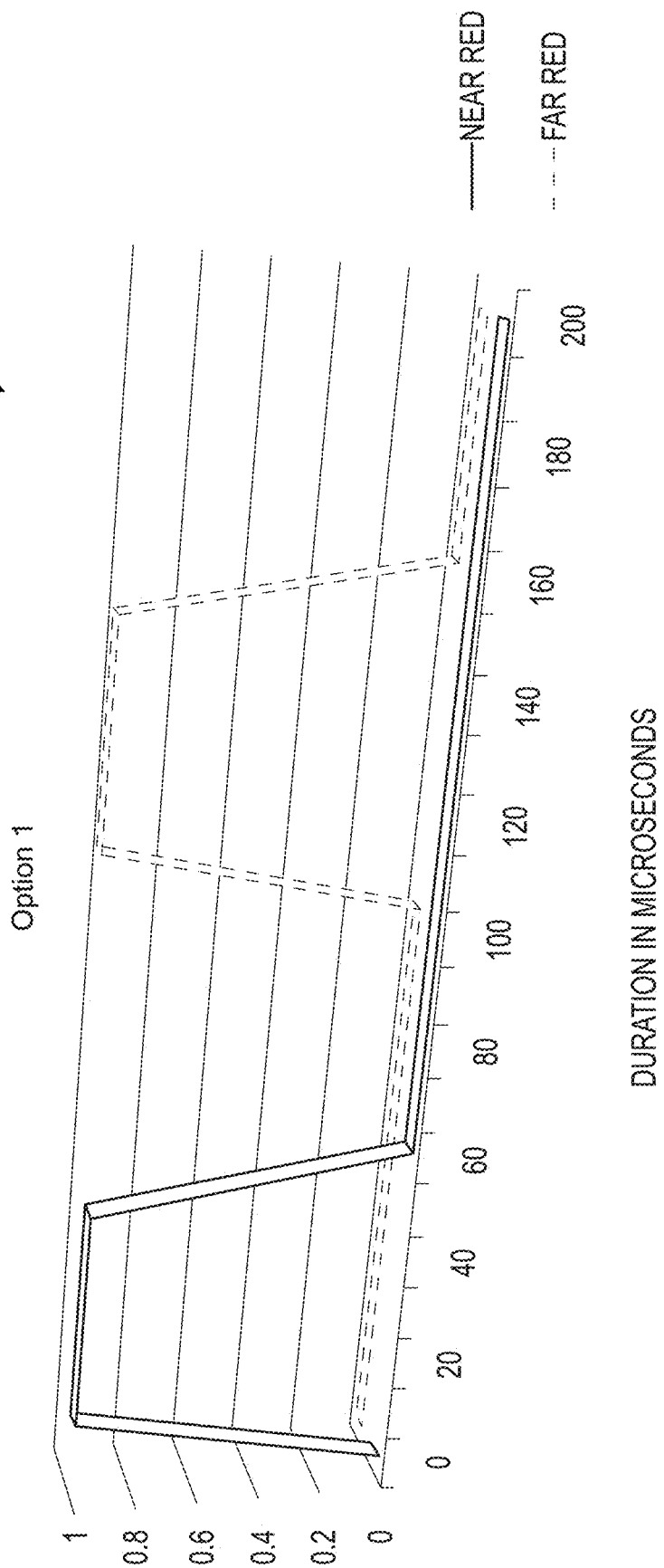
FIG. 18 is a diagram of lighting Option 1 as described in Table 5.
Figure 19:
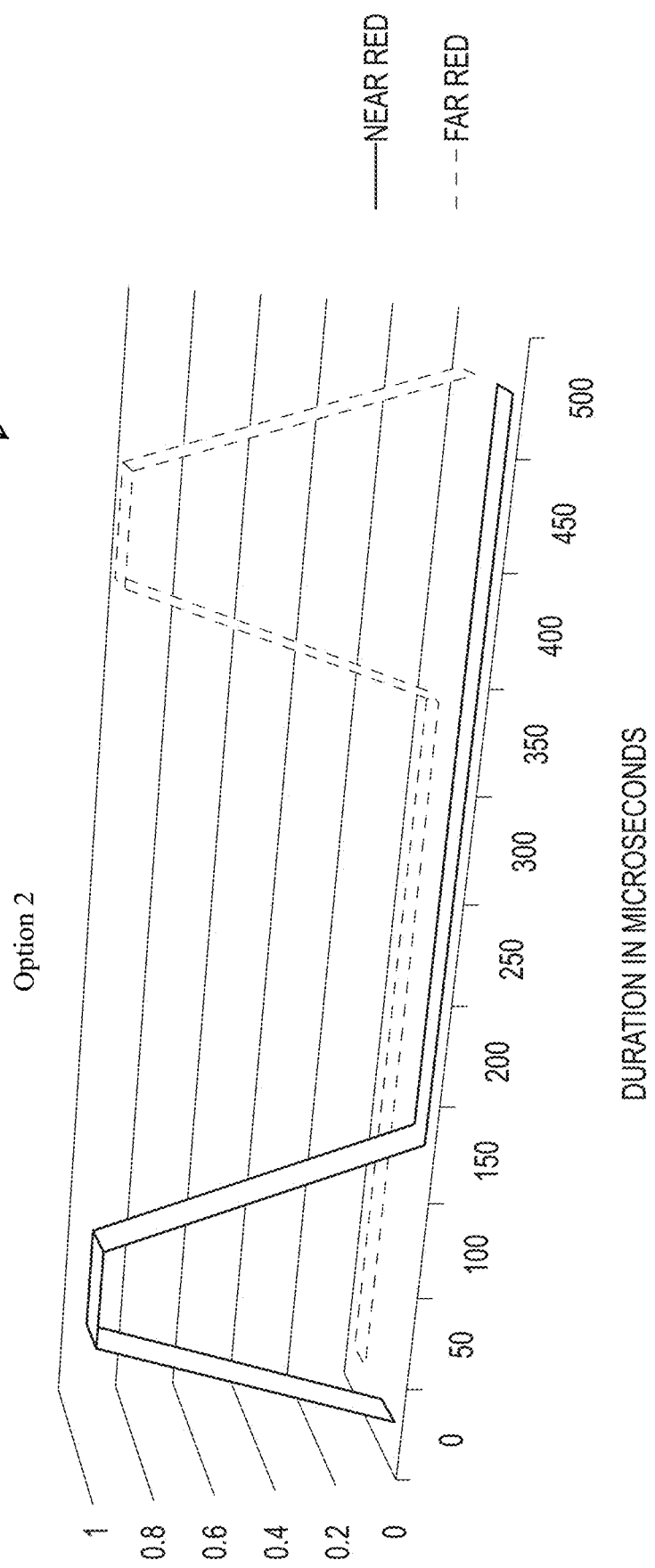
FIG. 19 is a diagram of lighting Option 2 as described in Table 5.
Figure 20:
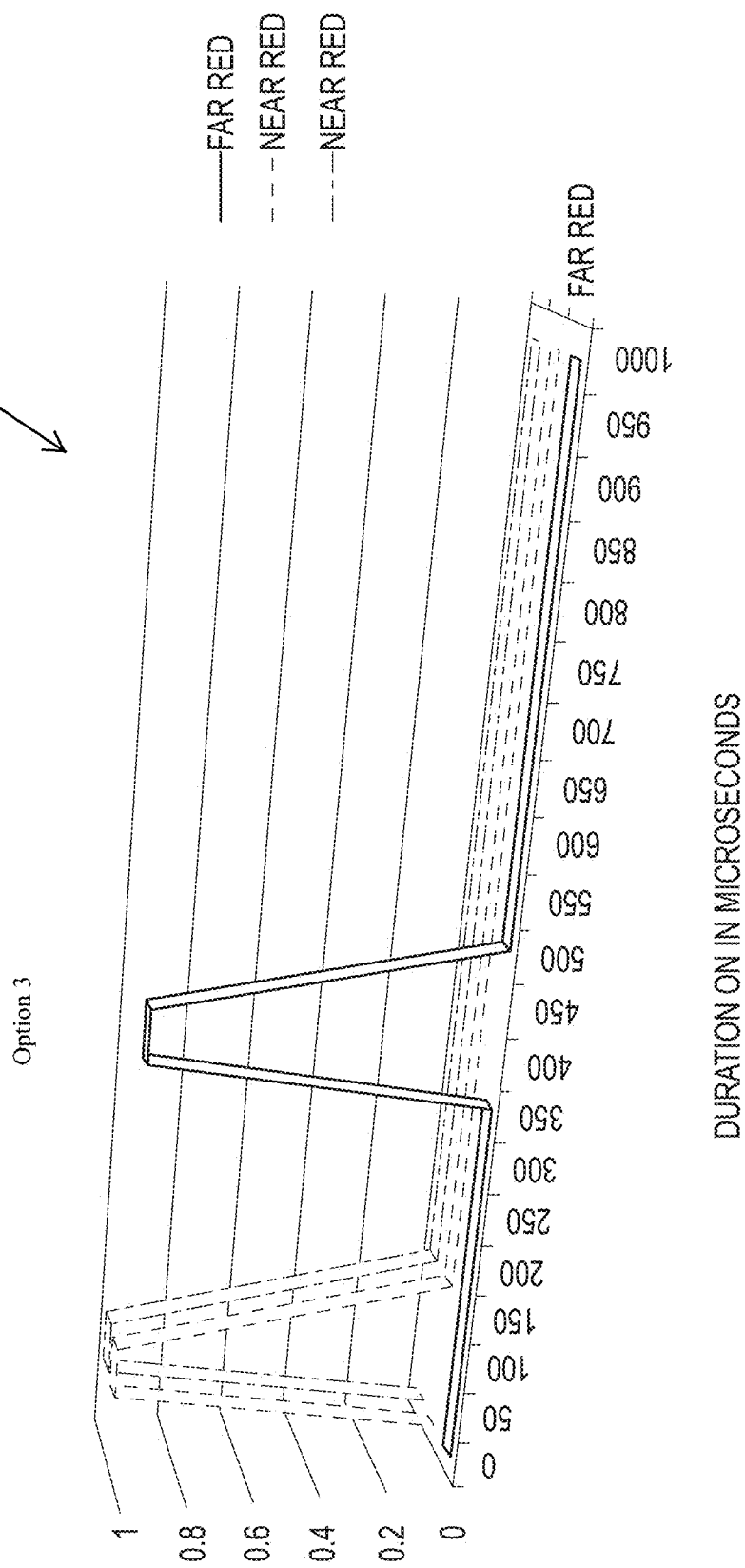
FIG. 20 is a diagram of lighting Option 3 as described in Table 5.
Figure 21:
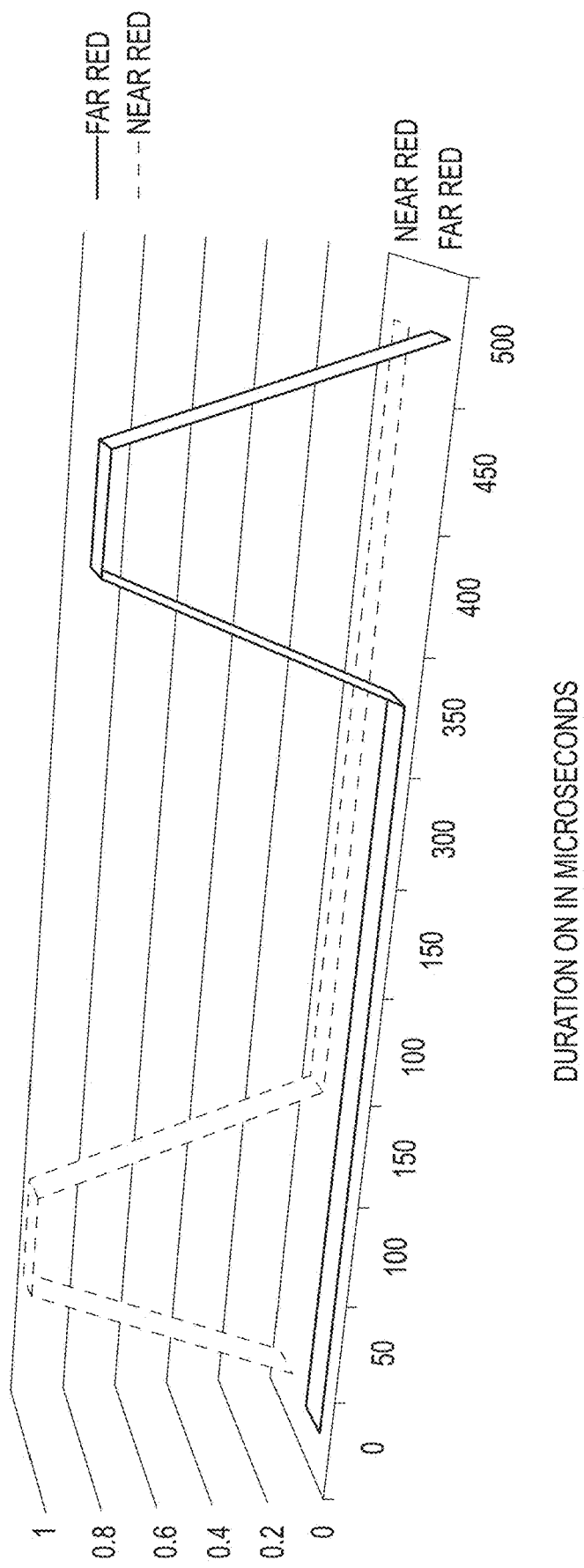
FIG. 21 is a diagram of lighting Option 4 as described in Table 5.
Figure 22:
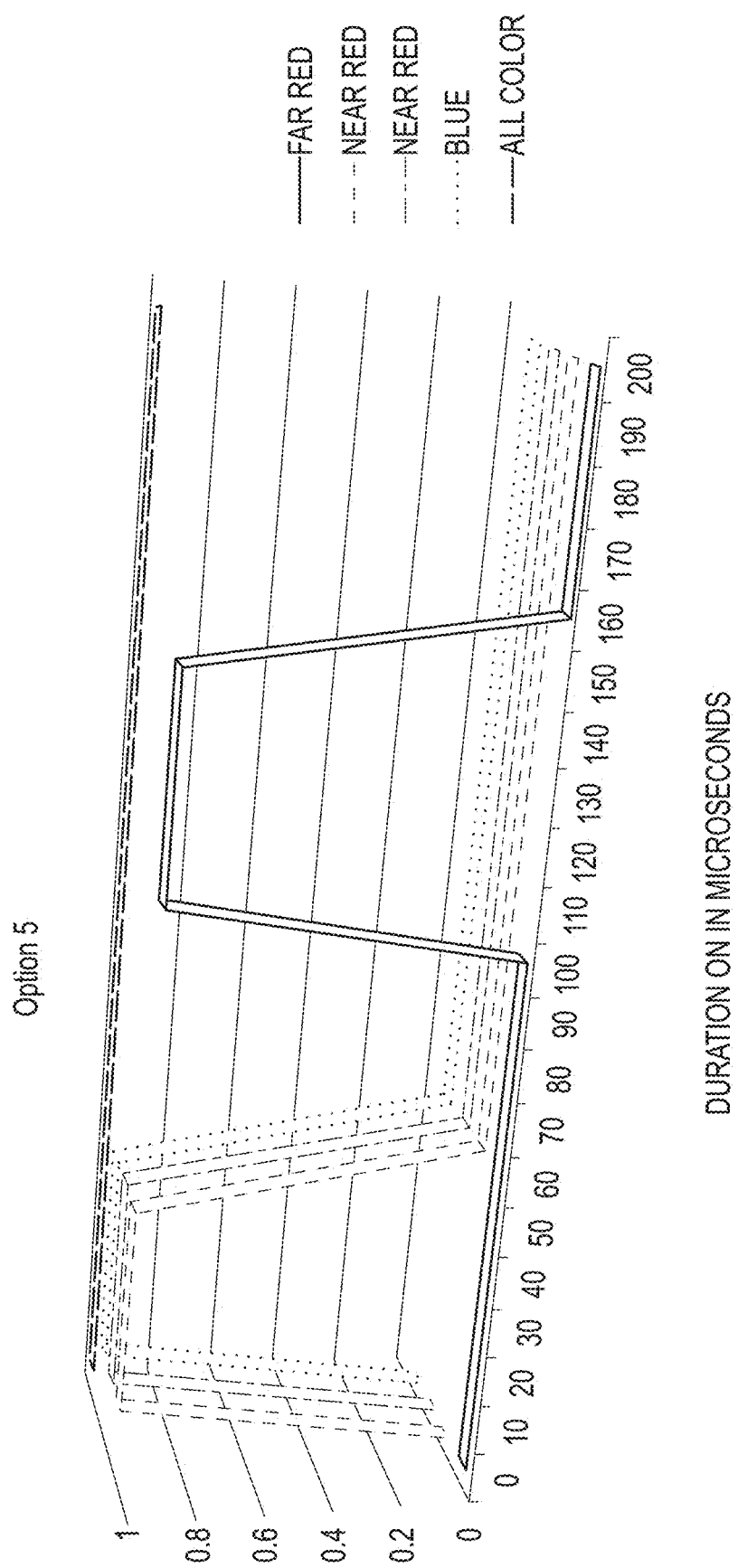
FIG. 22 is a diagram of lighting Option 5 as described in Table 5.

| Lighting Option | Colors | Duration ON | Duration OFF | Timing from t-0 | Ma of each color | FIG. |
|---|---|---|---|---|---|---|
| Option 1 | Near red 1 Near red 2 | 50 us | 150 us | ON - 0 OFF- 50 US | 600 | FIG. 18 |
|  | Far Red | 50 us | 100 us | ON - 100 us OFF- 150 us | 900 |  |
| Option 2 | Near red 1 Near red 2 | 50 us | 450 us | ON - 0 OFF- 50 US | 600 | FIG. 19 |
|  | Far Red | 50 us | 400 us | ON - 400 us OFF- 450 us | 900 |  |
| Option 3 | Near red 1 Near red 2 | 150 us | 850 us | ON - 0 OFF- 150 us | 600 | FIG. 20 |
|  | Far Red | 100 us | 750 us | ON - 750 us OFF- 850 us | 900 |  |
| Option 4 | Near red 1 | 50 ms | 450 ms | ON - 0 OFF- 50 ms | 600 | FIG. 21 |
|  | Far Red | 50 ms | 350 ms | ON - 400 ms OFF- 450 ms | 900 |  |
| Option 5 | Near red 1 Near red 2 Blue | 50 us | 50 us | ON - 0 OFF- 50 US | 600 | FIG. 22 |
|  | White (all colors) | Continuous ON |  | Continuous |  |  |
|  | Far Red | 50 us | 100 us | ON - 100 us OFF- 150 us | 900 |  |
| Option 6 | Near red 1 Near red 2 | 150 us | 100 us | ON - 0 OFF- 150 us | 600 |  |
|  | Far Red | 100 us | 10 secs | ON - 650 us OFF- 750 us | 900 | Figure not available |
|  | Far Red | 100 us | 10.001 secs | ON - 800 us OFF - 900 us | 900 | due to scale |

TABLE 5-continued

Figure 23:
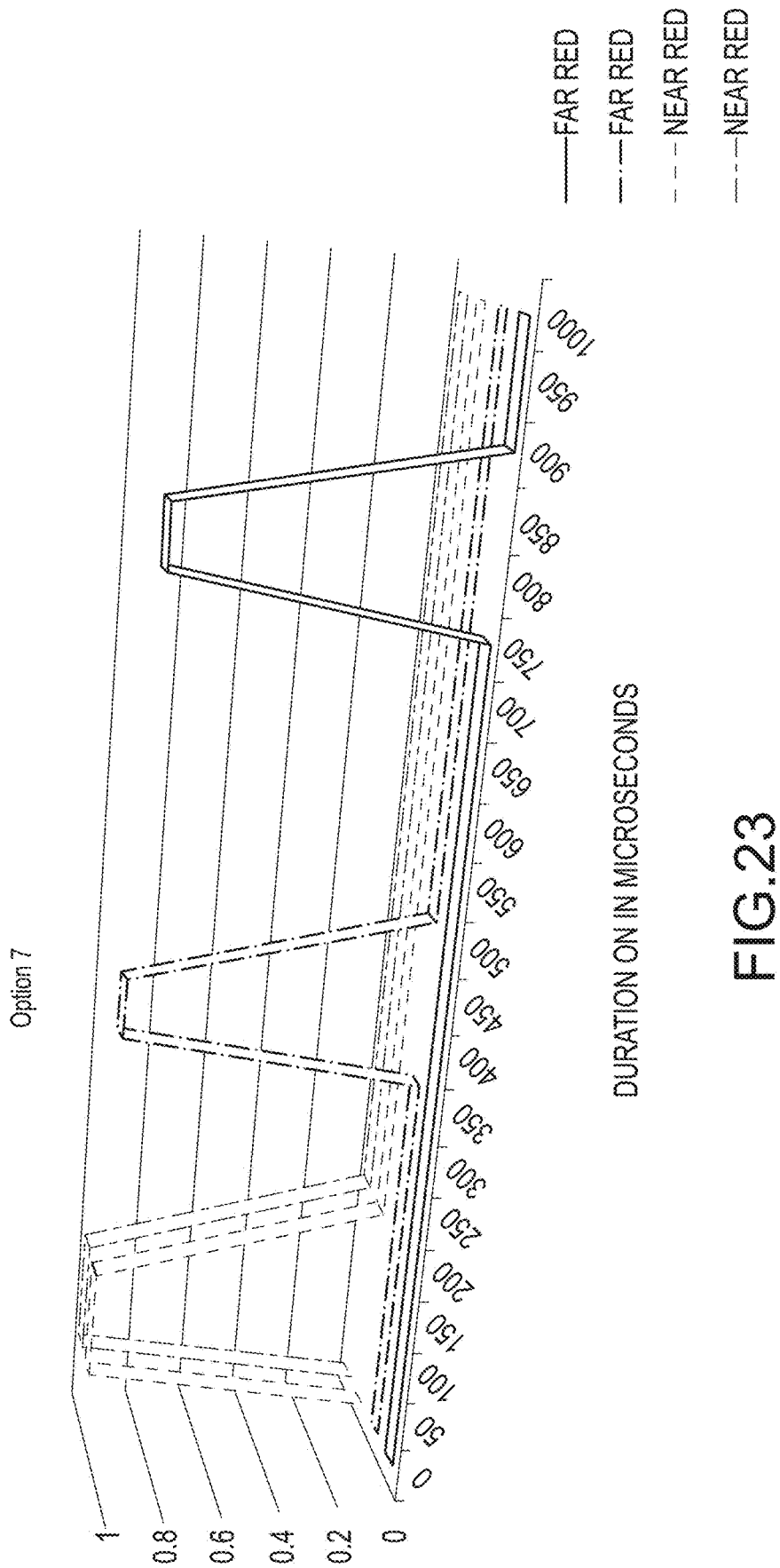
FIG. 23 is a diagram of lighting Option 7 as described in Table 5.
Figure 24:
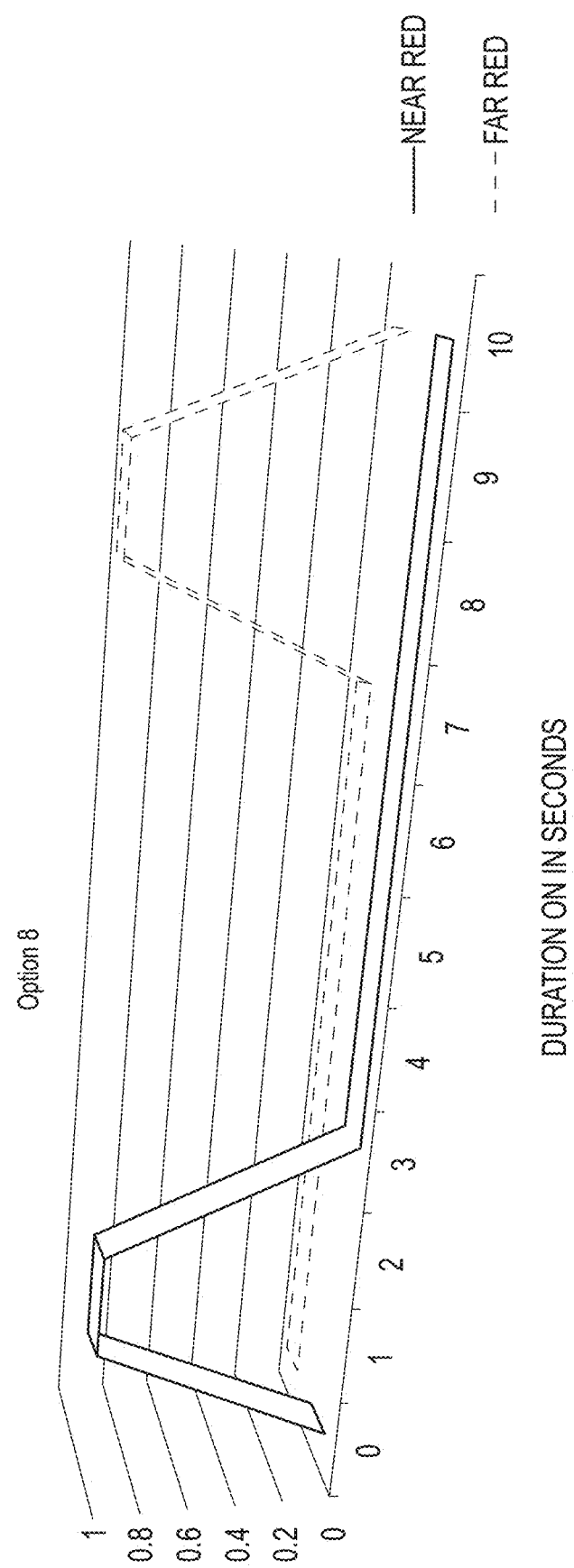
FIG. 24 is a diagram of lighting Option 8 as described in Table 5.
Figure 25:
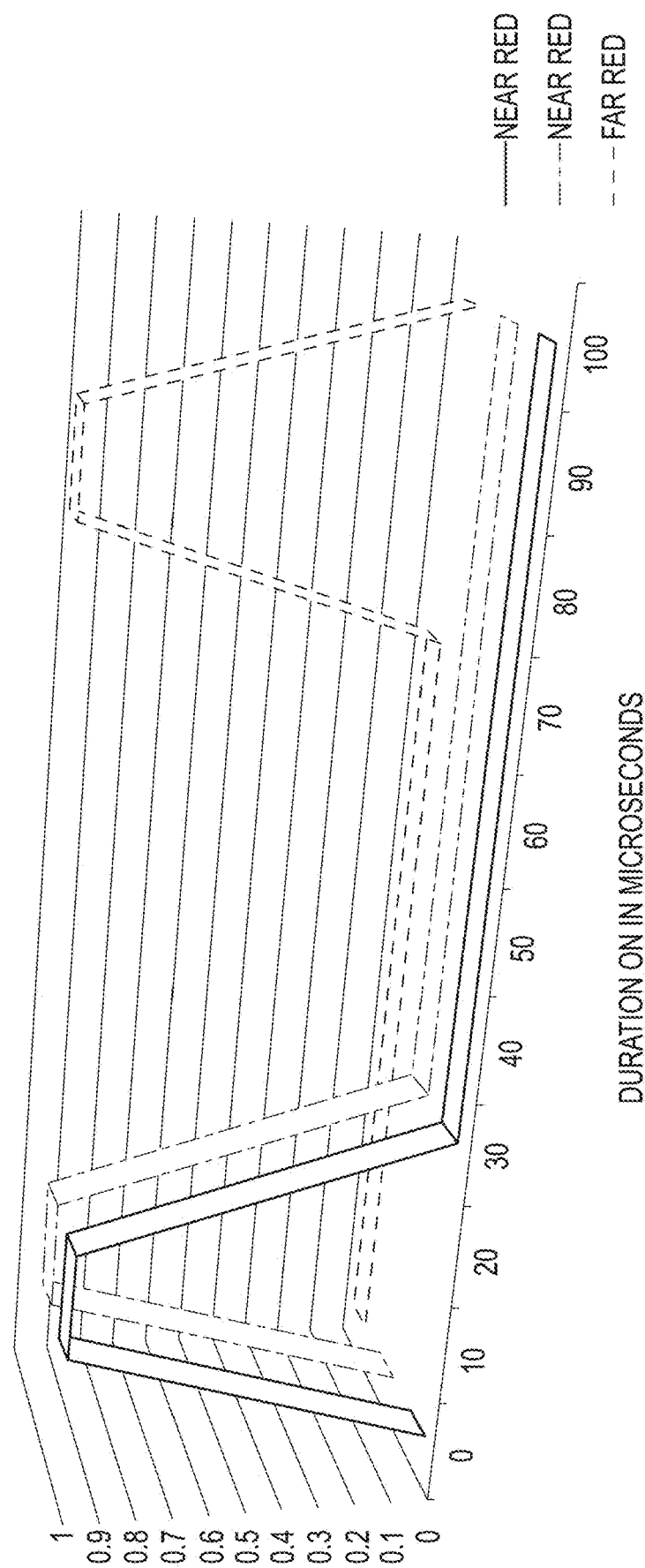
FIG. 25 is a diagram of lighting Option 9 as described in Table 5.
Figure 26:
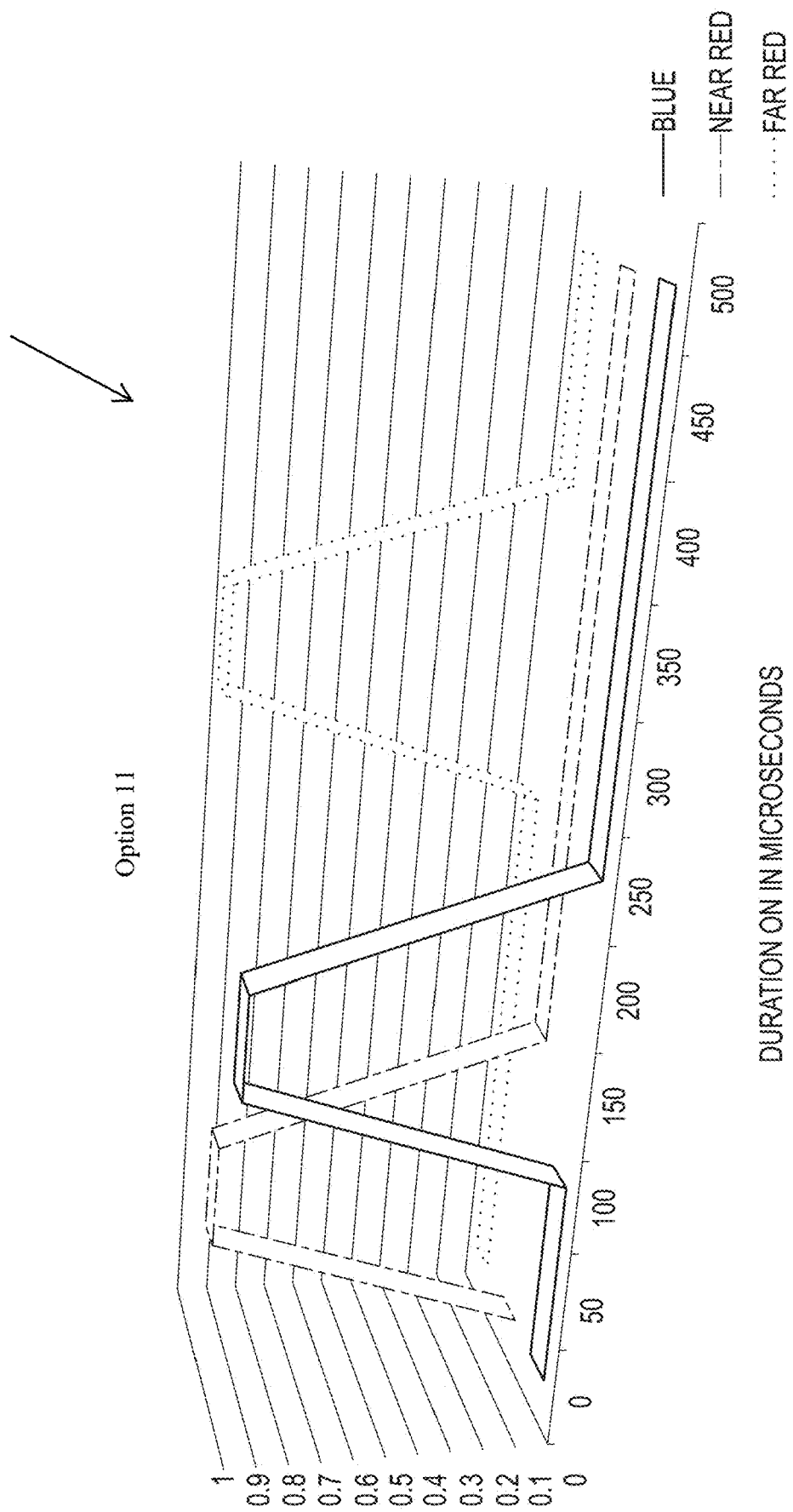
FIG. 26 is a diagram of lighting Option 11 as described in Table 5.
Figure 27:
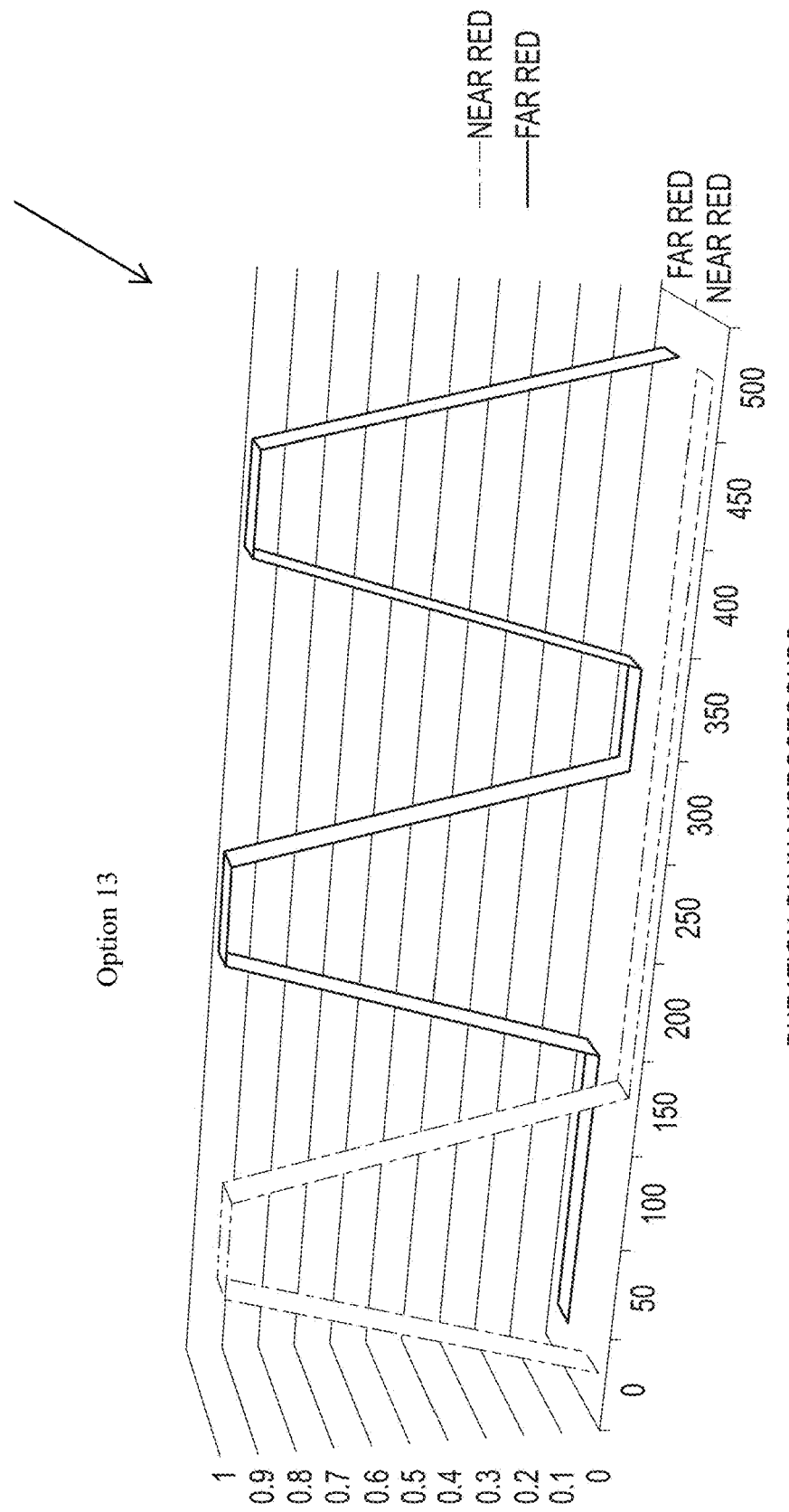
FIG. 27 is a diagram of lighting Option 13 as described in Table 5.

| Lighting Option | Colors | Duration ON | Duration OFF | Timing from t-0 | Ma of each color | FIG. |
|---|---|---|---|---|---|---|
| | Blue | 10 us | 100 us | ON -1000 us OFF-1010 us | 900 | |
| Option 7 | Near red 1 Near red 2 | 150 ms | 850 ms | ON - 0 OFF- 150 us | 600 | FIG. 23 |
| | Far Red | 100 ms | 650 ms | ON - 650 ms OFF- 700 ms | 900 | |
| | Far red | 100 ms | 800 ms | ON - 800 ms OFF - 850 ms | 900 | |
| Option 8 | Near red | 1 sec | 10 secs | ON - 0 OFF- 1 sec | 600 | FIG. 24 |
| | Far Red | 1 sec | 10 secs | ON - 8 secs OFF- 9 secs | 900 | |
| Option 9 | Near red 1 Near red 2 | 10 secs | 100 secs | ON - 0 OFF- 10 secs | 600 | FIG. 25 |
| | Far red | 10 secs | 100 secs | ON - 80 secs OFF- 90 secs | 600 | |
| Option 10 | Near red 1 Near red 2 | 10 secs | 24 hours | ON - 0 OFF- 10 secs | 600 | Figure not available |
| | Far red | 10 secs | 500 us | ON - 150 us OFF- 200 us | 600 | due to scale |
| Option 11 | Near red 1 | 50 us | 100 us | ON - 0 OFF- 50 US | 600 | FIG. 26 |
| | Blue | 50 us | 500 us | ON - 150 us OFF- 200 US | 600 | |
| | Far red | 50 us | 50 us | ON - 300 OFF- 350 US | 600 | |
| Option 12 | Far red | 50-100 us | 50-1500 us | ON - 0 OFF- 50 US | 600 to 1100 | Figure not available |
| | Far Red | 50-100 us | 50-1500 us | ON - 100 us OFF- 150 us | 900 to 1100 | due to scale |
| Option 13 | Near red | 50 us | 500 us | ON - 0 OFF- 50 US | 600 to 1100 | FIG. 27 |
| | Far Red | 50 us | 500 us | ON - 200 us | 900 to 1100 | |
| Option 14 | Near red 1 Near red 2 | 50 ns | 150 ns | ON - 0 OFF- 50 ns | 600 | |
| | Far Red | 50 ns | 100 ns | ON - 100 ns OFF- 150 ns | 900 | Figure not available due to scale |
| Option 15 | Near red 1 Blue | 10 min | 150 min | ON - 0 OFF- 10 min | 900 | Figure not available |
| | Far Red | 50 min | 100 min | ON - 100 min OFF- 150 min | 900 | due to scale |
| Option 16 | Ultraviolet | 100 us | 50 us | ON - 0 OFF- 10 us | 600 | Figure not provided |
| | Ultraviolet | 50 us | 50 us | ON - 50 us OFF- 100 us | 1100 | |
| Option 17 | Ultraviolet | 50 us | 150 us | ON - 0 OFF- 50 us | 600 | Figure not provided |
| | Near red 1 Near red 2 | 50 us | 150 us | ON - 0 OFF- 50 us | 600 | |
| | Far Red | 50 us | 100 us | ON - 100 us OFF- 150 us | 900 | |

EXAMPLES

The following examples are provided to illustrate further the various applications and are not intended to limit the invention beyond the limitations set forth in the appended claims.

Example 1—Regulation of Cis-Trans to Increase Expression of Melatonin in Humans

An adult male human (*Homo sapiens*), was exposed on Mar. 22, 2018 and Mar. 23, 2018 in Greeley, Colorado to supplemental pulsed lighting (Option 13 in Table 5 at 600 Ma for near red and 900 Ma for far red) approximately six hours during the night and eight hours during the day within a 24-hour period to assess melatonin levels under typical daily activities. Supplemental lighting was added to normal environmental lighting, such as computers, television, etc.

Blood was collected from the Caucasian male human in his mid-40s. The first two samples were collected under ambient lighting conditions at 9 am and 5 μm. The subject was then exposed to supplemental pulsed lighting (Option 12 in Table 5) for 14 hours, including sleep, over the course of the next 24 hours and his blood was drawn at 9 am and 5 pm. A total of eight samples were drawn. The samples were taken from the antecubital area of the arm. The blood was collected using 25-gauge needles with 3 cc syringes. The samples were immediately transferred to a lithium-heparin tube and inverted a total of ten times. The blood cells were centrifuged for 10 min at 3200 rpm using a Cole-Parmer centrifuge to isolate the plasma. The plasma samples were poured into 1.5 mL centrifuge tubes and placed into the freezer at −17° C. The samples were prepared using the ab213978 melatonin ELISA kit from Abcam Labs. The samples were analyzed using a Varioskan LUX from Thermo Scientific.

All precipitates and solids were removed via centrifugation. Equal volumes (500 μL) of cold ethyl acetate and plasma sample were placed into an Eppendorf tube and gently vortexed. The layers were allowed to separate over ice. The sample was vortexed again and incubated over ice for two minutes. After, the samples were centrifuged at 1000 g for 10 min. The organic layer was carefully pipetted into a new tube. It was then dried over a stream of inert gas (Argon). Next, the pellet was suspended in 100-200 μl of 1× stabilizer. The sample was then kept on ice after the suspension and the assay was performed immediately.

The ELISA kit was purchased as a 96-well plate and ready to use upon arrival. The immunoassay was stored in a sealed pouch with desiccant in the refrigerator at 8° C. until the day of use.

All kit components were brought to room temperature. Plasma samples were used directly without any dilution. Next, 100 μL of sample was added to each well of a pre-coated well plate along with 100 μL of 1× stabilizer added to the blank wells. Then, 50 μL of 1× melatonin tracer and 50 μL of 1× melatonin antibody were added to each sample well except to the blank wells, respectively. The plate was sealed and incubated at room temperature (RT) on a shaker plate for 1 hour at about 500 rpm. After incubation, the samples were washed with the wash buffer a total of three times with 400 μL per well. After the last wash, the plate was emptied, and the contents were aspirated, and the plate was blot dried by tapping on a paper towel to remove any remaining wash buffer. Next, 200 μL of melatonin conjugate solution was added to each well expect to the blank wells. Again, the plate was sealed and was incubated at RT on a plate shaker for 30 minutes at about 500 rpm. The plate was washed again in the same manner as before and all the wash buffer was removed. At this point, 200 μL of TMB substrate solution was added to each well, and the plate was incubated for 30 minutes at RT on a shaker plate at the same rate as previously performed. Then, 50 μL of the stop solution was added to each well. Optical Density (OD) readings were recorded at a 450 nm wavelength by a plate reader.

All data is presented as means using curve fitting programs (4-parameters) from the plate reader software (Skanit Software 5.0 for microplate readers). All the plots were created in excel. Known concentrations of melatonin antibody were pre-immobilized onto the plates. FIG. 19 shows the dilution curve for each pre-immobilized dilution (0, 50, 100, 250, 500, 1000 pg/mL) of melatonin antibody in the well plates.

Figure 28:
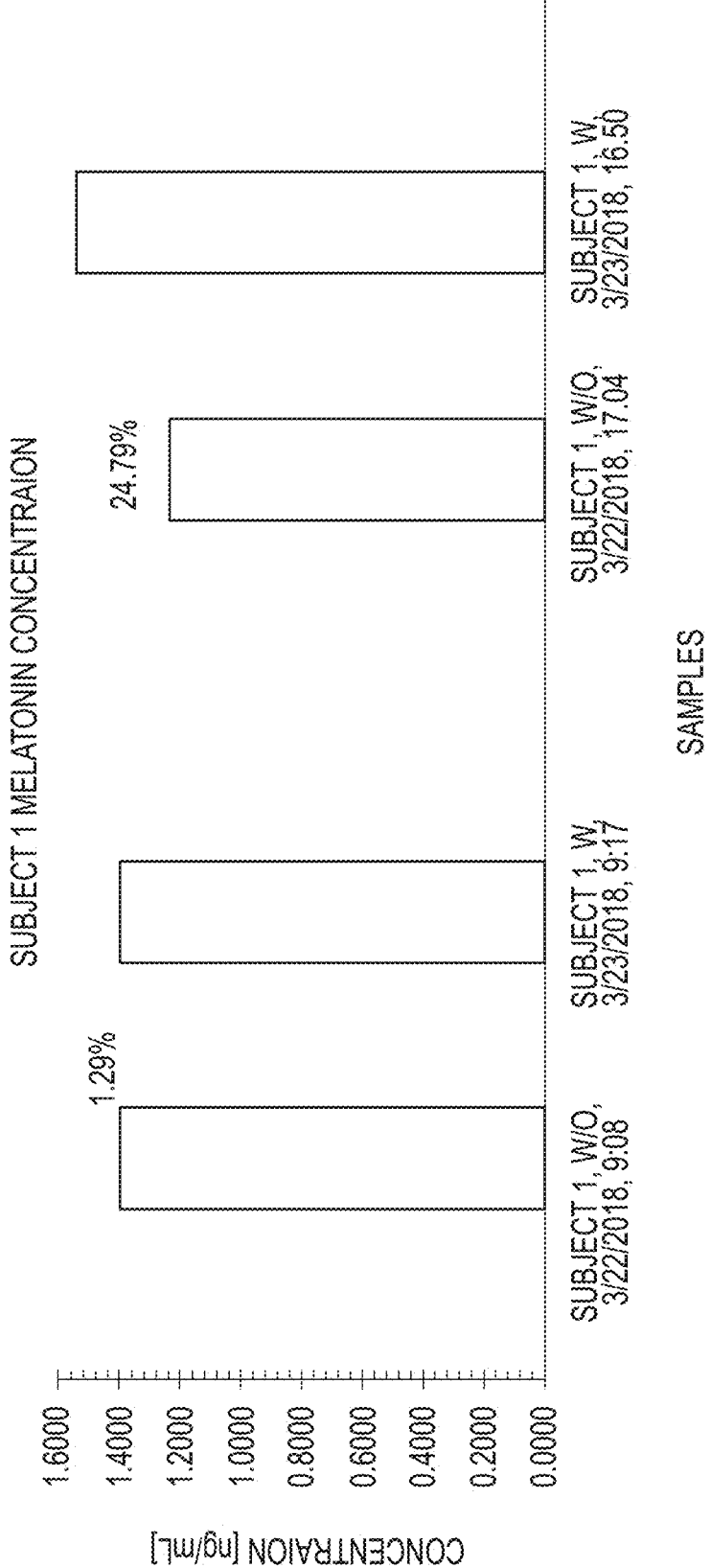
FIG. 28 is a Graph of melatonin concentrations in ng/mL. The control light is shown in the "Subject 1 w/o" and lights as described herein is shown in "Subject 1, w". All concentrations were calculated based on the standards shown in FIG. 20.
Figure 29:
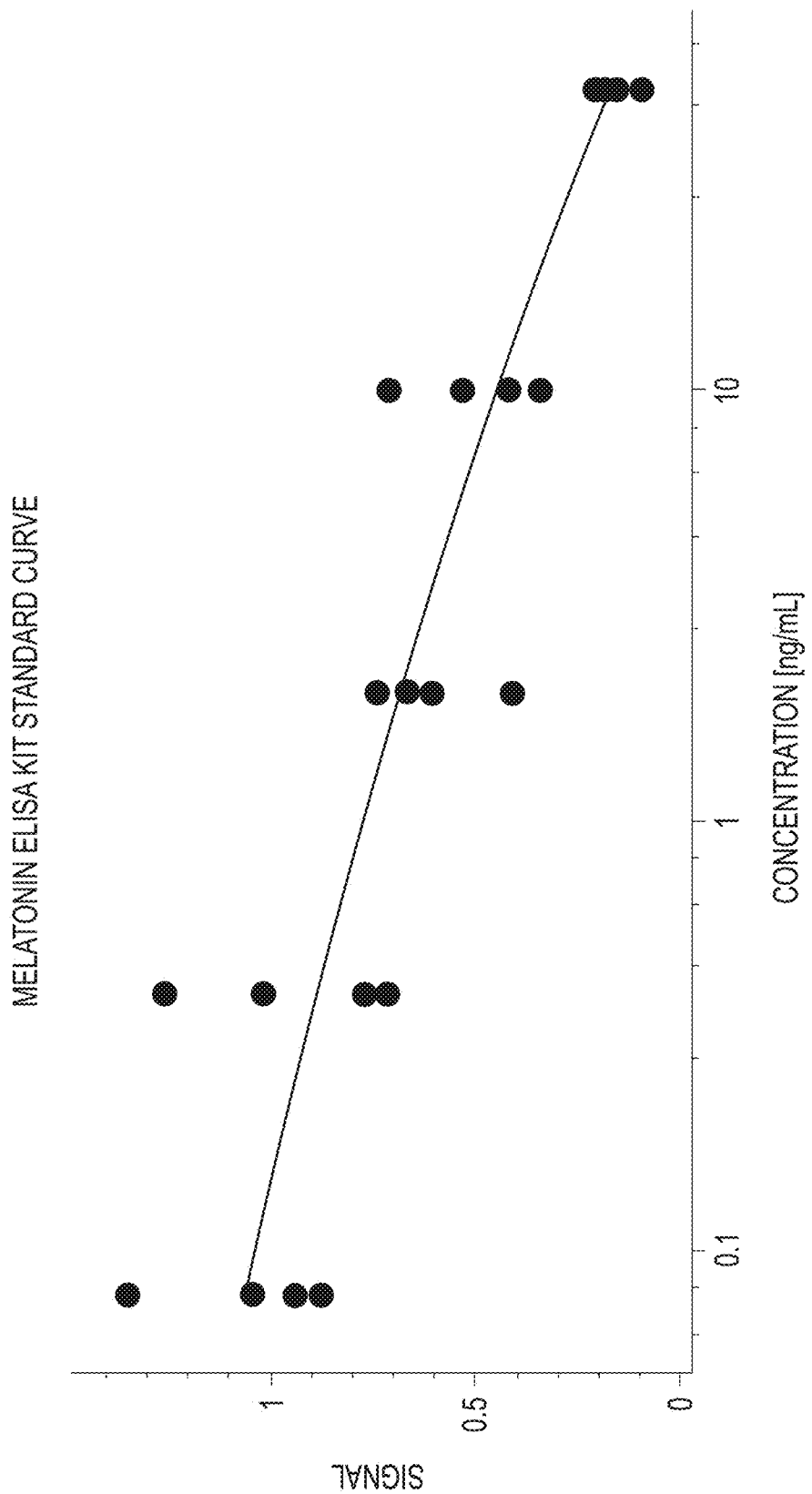
FIG. 29 is a Melatonin Elisa Kit Standard Curve showing the concentrations ranging from 0.04 ng/mL to 50 ng/mL. The reading of blank is not show on the plot because of the log-scale of the X axis.

With known standards, the change in melatonin concentrations in ng/mL were obtained under lights (Option 12 in Table 5) as described herein and compared to a control light (shown in FIG. 28). Blood was collected from a human subject over a two-day period. The first set of samples were collected approximately eight hours apart under standard light conditions. The second set of samples were collected under lights as described herein (Option 12 in Table 5) at the same time of day as the first set of samples, respectively. The samples were placed into 1.5 mL Eppendorf tubes and stored in the freezer at −17° C. until the day of use. All the standards, blanks and samples were taken in replicate and averages were obtained.

Melatonin is a major factor in the circadian rhythm in mammals. Extensive research has shown that different light cycles effect melatonin production. This trial was conducted to determine the effect of lights as described herein on human melatonin levels.

The data in FIG. 28 shows that human melatonin levels increased by 24.79% after the first and second eight-hour timepoints. There was a greater increase in the melatonin level after a longer exposure to the lights (Option 12 in Table 5 at 600 Ma and 900 Ma) as described herein. The data would indicate that pulsing of lighting as described herein results in direct regulation of melatonin levels in humans.

Example 2—Excitation of Cis-Trans Isomer to Increase Melatonin Expression in Cattle The 10-month-old black angus bull, raised in Yuma, Colorado was placed in a 12×12 ft agricultural panel pen under normal lighting. After blood samples were collected for the first 3 timepoints (1400 hours, 2200 hours and 700 hours), the bull was housed in a tarped enclosure framed in by the agricultural panels and the only light source was a specific set of lights as described herein (Option 12 in Table 5 at 1100 Ma). Supplemental air into the tent was provided via an HVAC fan and the bull was fed ad libitum grass hay and 5 pounds of sweet grain a day consistent with normal rations. Light intensity under lights as described herein (Option 12 in Table 5 at 1100 Ma) within the enclosure ranged from 52 to 1012 $mW/m^2$. If required, the bull was moved into a squeeze chute for blood collection and then returned to the enclosure.

Blood was collected from the bull at approximately eight (8) hour intervals. The first three samples were collected under ambient lighting conditions at 1400 hours, 2200 hours and 700 hours followed by a 74-hour exposure to a specific pulsed lighting recipe. Three additional samples were taken after the light exposure at approximately the same time of day as the initial blood collection (1400 hours, 2200 hours and 700 hours). The samples were taken from the coccygeal (tail) vein. The blood was collected using 23-gauge needles with 3 cc syringes. The samples were immediately transferred to a lithium-heparin tube and inverted a total of ten times. The blood samples were centrifuged for 10 min at 3200 rpm using a Cole-Parmer centrifuge to isolate the plasma. The plasma samples were poured into 1.5 mL centrifuge tubes and placed into the freezer at −17° C. The samples were prepared using the ab213978 melatonin ELISA kit from Abcam Labs. The samples were analyzed using a Varioskan LUX from Thermo Scientific.

All precipitates and solids were removed via centrifugation. Equal volumes (500 μL) of cold ethyl acetate and plasma sample were placed into an Eppendorf tube and gently vortexed. The layers were allowed to separate over ice. The sample was vortexed again and incubated over ice for two minutes. After, the samples were centrifuged at 1000 g for 10 min. The organic layer was carefully pipetted into a new tube. It was then dried over a stream of inert gas (Argon). Next, the pellet was suspended in 100-200 μL of 1× stabilizer. The sample was then kept on ice after the suspension and the assay was performed immediately.

The ELISA kit was purchased as a 96-well plate and ready to use upon arrival. The immunoassay was stored in a sealed pouch with desiccant in the refrigerator at 8° C. until the day of use.

All kit components were brought to room temperature. Plasma samples were used directly without any dilution. Next, 100 μL of sample was added to each well of a pre-coated well plate along with 100 μL of 1× stabilizer added to the blank wells. Then, 50 μL of 1× melatonin tracer and 50 μL of 1× melatonin antibody were added to each sample well except to the blank wells, respectively. The plate was sealed and incubated at room temperature (RT) on a shaker plate for 1 hour at about 500 rpm. After incubation, the samples were washed with the wash buffer a total of three times with 400 µL per well. After the last wash, the plate was emptied, and the contents were aspirated, and the plate was blot dried by tapping on a paper towel to remove any remaining wash buffer. Next, 200 µL of melatonin conjugate solution was added to each well except to the blank wells. Again, the plate was sealed and was incubated at room temperature on a plate shaker for 30 minutes at about 500 rpm. The plate was washed again in the same manner as before and all the wash buffer was removed. At this point, 200 µL of TMB substrate solution was added to each well, and the plate was incubated for 30 minutes at room temperature on a shaker plate at the same rate as previously performed. Then, 504 of the stop solution was added to each well. Optical Density (OD) readings were recorded at a 450 nm wavelength by a plate reader.

All data is presented as means using curve fitting programs (4-parameters) from the plate reader software (Skanit Software 5.0 for microplate readers). All the plots were created in excel. Known concentrations of melatonin antibody were pre-immobilized onto the plates. FIG. 22 shows the standard curve for each pre-immobilized dilution (50, 10, 2, 0.4, 0.08 ng/mL) of melatonin antibody in the well plates.

Figure 30:
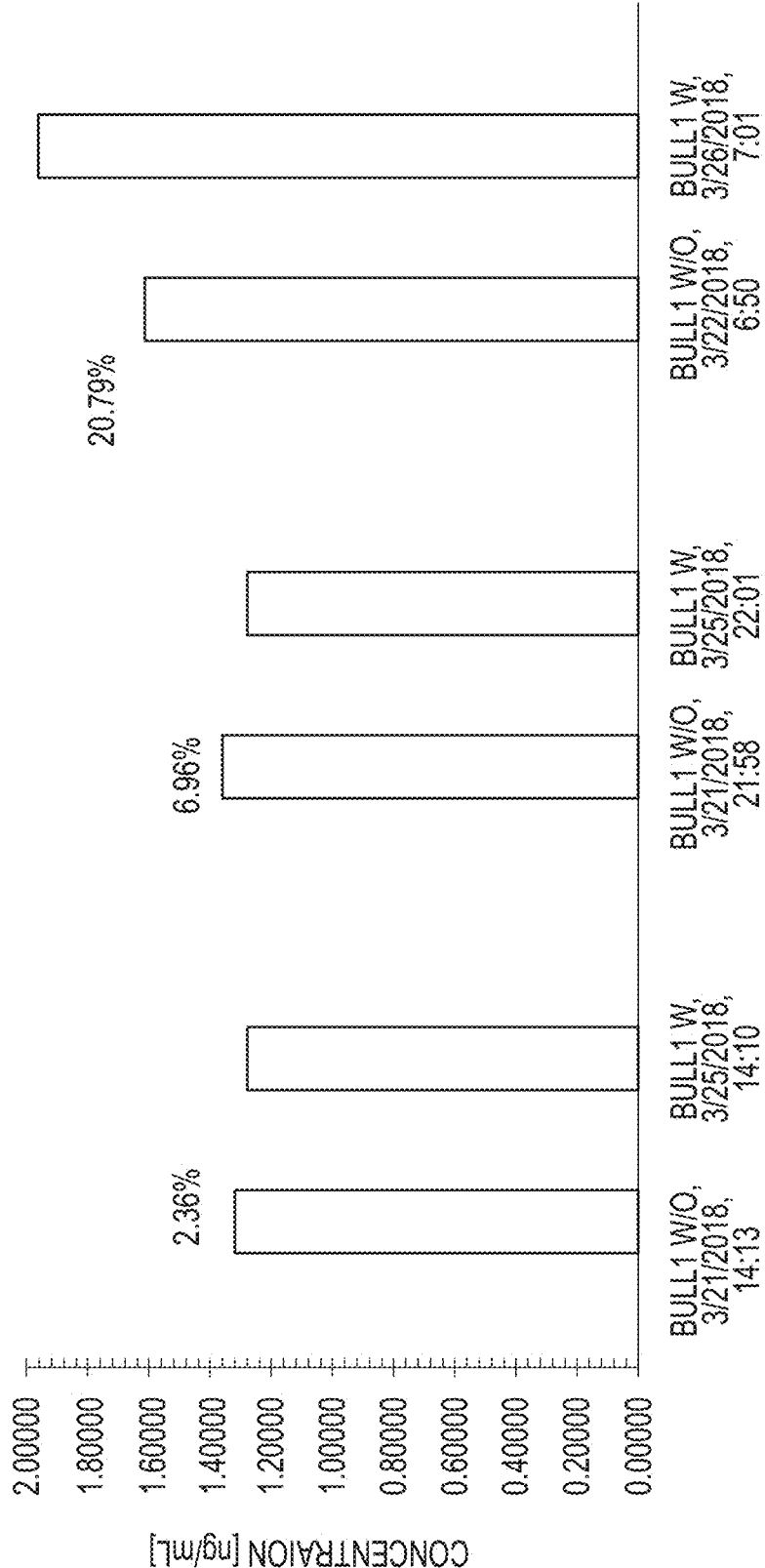
FIG. 30 is a graph of bovine melatonin concentrations in ng/mL with and without lighting. The control light is shown in the "Bull 1 w/o" and lights as described herein are shown in "Bull 1, w". All concentrations shown are averages taken from replicate samples. All concentrations were calculated based on the standards shown in FIG. 22.

With known standards, the change in melatonin concentrations in ng/mL were obtained under lights as described herein and compared to a control light (shown in FIG. 30). Blood was collected from a bull over a five-day period. The first set of samples were collected every eight hours for a total of three times under the control light. The second set of samples were collected lights as described herein at the same time of day as the first set of samples, respectively. The samples were placed into 1.5 mL Eppendorf tubes and stored in the freezer at −17° C. until the day of use. All the standards, blanks and samples were taken in replicate and averages were obtained.

Melatonin is a major factor in the circadian rhythm in mammals. Extensive research has shown that different light cycles effect melatonin production. This trial was conducted to determine the effect of lights as described herein on bovine melatonin levels.

The data in FIG. 30 shows that the bovine melatonin levels increased by 20.79% with longer exposure to lights as described herein. After exposure to lights as described herein (Option 12 in Table 5 at 1100 Ma) for approximately 92 hours a significant increase of 20.79% was observed. The preliminary data would indicate that different lighting recipes can result in direct regulation over melatonin levels in bovine.

Example 3—Genetic Expression and Hormonal Excretion Found in Pigs

In another example, the light inputs of the systems and methods described herein affect genetic expression and hormonal excretion found in pigs. In both gilts and sows, seasonal infertility has many important economic impacts. Reduced farrowing rates are a result of increased numbers of gilts and sows returning to oestrus and insemination and a higher proportion of spontaneous abortions occurring from breedings completed during late summer and early autumn. This results in inefficient use of facilities and a decreased number of piglets being produced. Additionally, smaller litter sizes, increased time from weaning to oestrus and delayed puberty in gilts expected to mature between August and November in the northern hemisphere has been associated with long days. All of these factors contribute to the animal's non-productive days.

Example 4—Regulation of Circadian Rhythm in Mammals

In yet another example of light inputs and circadian rhythms affecting human genetic expression and hormonal excretion can be found in the spring forward effects from daylight savings time (DST). These affects are widespread and from modern research show effects ranging from a 10% increased myocardial infarction risk, 8% increased risk of cerebrovascular accidents, increase in suicides, and decreased in-vitro fertilization successes.

Example 5—Regulation of Circadian Rhythm in Mammals

In another embodiment of the facility of the present disclosure, pulsed alternating photos were used to regulate melatonin production in cattle. Manipulating light exposure at strategic points in the life cycle of cattle is a non-invasive technique to improve performance, health, and well-being. A small-scale study was conducted in Greeley, Colorado to compare the hormonal (melatonin and cortisol) and neurotransmitter (serotonin) levels in cattle exposed to pulsed photons using the system and methods disclosed herein vs. unexposed control calves.

Holstein heifer calves (3 days old) were housed individually in polyethylene hutches with a front yard of 2.25 m2 with sand bedding and assigned into 1 of 2 treatments: (1) control (CON; n=4); and (2)pulsed photon exposed (PAWS; n=4). Hutches in the PAWS group had interior LED lamps affixed to the hutch roof and were constantly on. All the study calves had free access to the enclosed front yard. Calves were fed and managed according to farm management program. Blood samples were collected for determination of serum melatonin and serotonin concentration at 0600 h, 1200 h, 1800 h, and 2400 h on d0 (enrolment), d2, d4, and d14. Hair was sampled for cortisol determination on day 0, day 14, day 40, and day 60. No group differences for cortisol concentration were determined. Table 6 below presents mean (SE) melatonin and serotonin serum concentrations for the overall monitoring period, by day, and by day at 2400 hour, which was the time of maximum exposure to the treatment. Data from this initial small-scale study indicate a significant effect for PAWS on melatonin concentration versus the control.

TABLE 6

| | Melatonin (mean SE; pg/mL) | | | Serotonin (mean SE; ng/mL) | | |
|---|---|---|---|---|---|---|
| Time | CON | PAWS | P-value | CON | PAWS | P-value |
| Overall | 5.47 ± 1.86 | 11.6 ± 1.85 | 0.02 | 1644 ± 91.5 | 1,462 ± 91.6 | 0.16 |
| | | | Day average | | | |
| d 0 | 2.66 ± 2.08 | 9.98 ± 2.08 | 0.02 | 1,406 ± 118 | 1,268 ± 119 | 0.42 |
| d 2 | 4.58 ± 2.27 | 10.3 ± 2.27 | 0.08 | 1,926 ± 196 | 1,850 ± 196 | 0.78 |
| d 4 | 4.99 ± 2.36 | 9.80 ± 2.36 | 0.16 | 1,369 ± 192 | 1,279 ± 192 | 0.74 |
| d 14 | 9.10 ± 6.80 | 17.0 ± 6.80 | 0.41 | 1,870 ± 172 | 1,458 ± 172 | 0.10 |
| | | | Sample at 2400 h | | | |
| d 0 | 4.56 ± 7.66 | 22.6 ± 7.66 | 0.14 | 1,781 ± 311 | 1,458 ± 311 | 0.49 |
| d 2 | 5.13 ± 7.13 | 23.7 ± 7.13 | 0.11 | 2,700 ± 405 | 2,543 ± 405 | 0.79 |
| d 4 | 10.1 ± 9.06 | 20.8 ± 9.07 | 0.43 | 2,169 ± 470 | 1,758 ± 470 | 0.55 |
| d 14 | 4.45 ± 9.62 | 15.4 ± 8.33 | 0.43 | 1,803 ± 320 | 1,925 ± 277 | 0.78 |

Example 6—Total Weight of Cherry Tomatoes Produced

Figure 31:
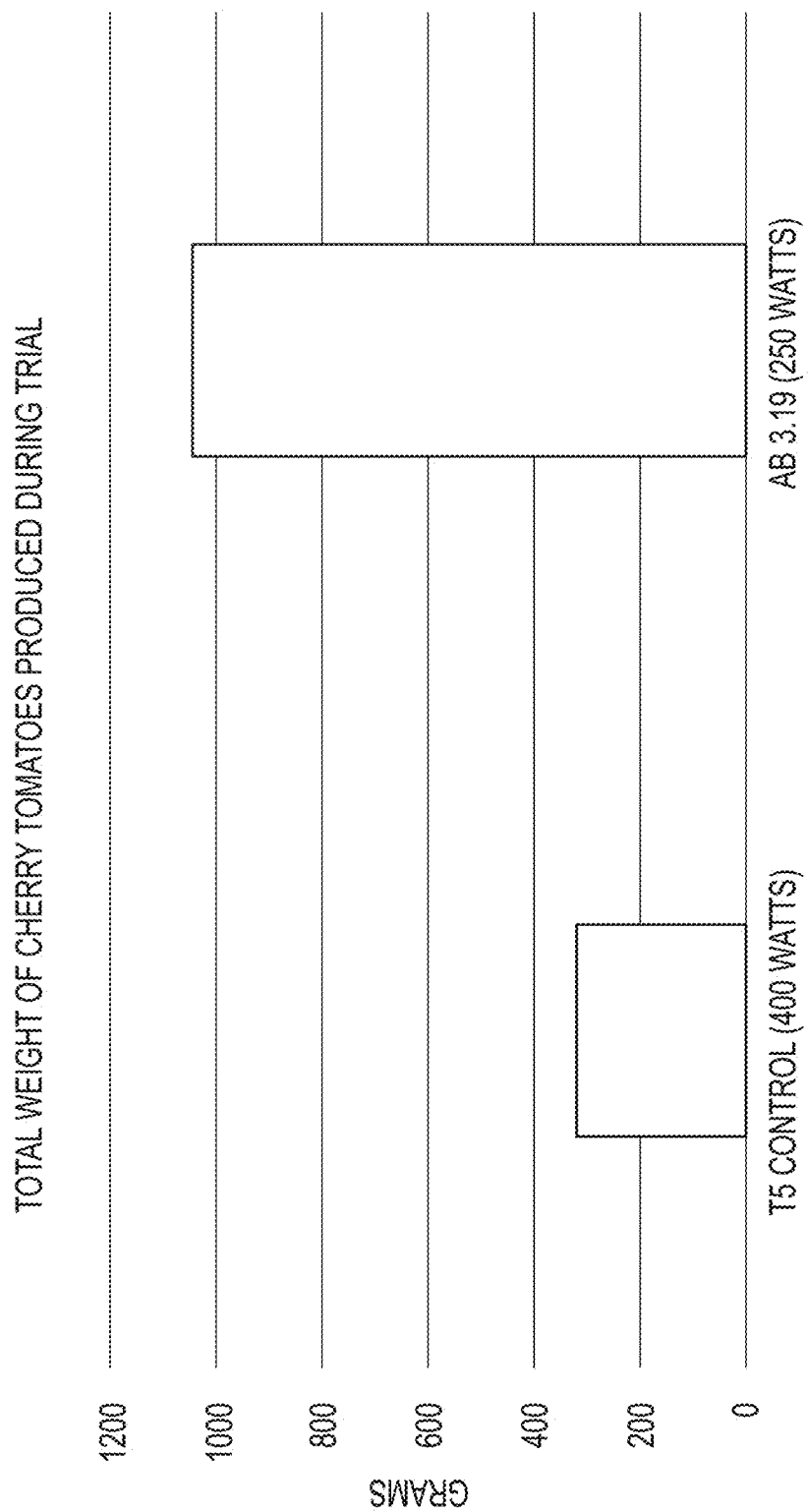
FIG. 31 is a graph showing a comparison of cherry tomato the total weight grams grown under a T5 control and lighting recipe AB 3.19 of the present disclosure.

In another example, dwarf, determinate cherry tomatoes where grown under a control and a light emitting device of the current method. Seeds were planted and plants were grown for 89 days and fruit harvested. Seeds were planted in pots with Miracle Grow® potting soil with 20 pots per tent/trial with one recipe lighting program per tent with ebb and flow irrigation. Soil pH, humidity and temperatures levels were maintained at a consistent level in all eight tents of the trial. FIG. 31 shows a comparison of total weight in grams of cherry tomato fruit produced under two lighting schemes.

In Column 1, labeled "T5", tomatoes were grown under a T5 conventional grow light. Wattage was 406 at a 116 voltage with a power factor of 0.9.

In Column 2, labeled "AB 3.19", tomatoes were grown under the lighting system provided herein using LED light emitters with emitters located at 18 inches from the pots. Wattage was 249 at a 120 voltage with a power factor of 0.62. The recipe of "AB 3.19" includes: A first initiation component that comprises a wavelength at 445 nm with an intensity of 30%, a wavelength of 465 nm with an intensity of 38%, a wavelength of 395 nm with an intensity of 25% and a second initiation component with a wavelength of 660 nm at an intensity 150%. A reset component with a wavelength of 740 nm with an intensity of 100%. The initiation components are ON for a duration, such as 50 us, followed by an OFF duration where both components are OFF for 50 us and then the reset component is ON for a duration of 50 us and then both components are OFF for 50 us and then the signal repeats.

As shown in FIG. 31, the T5 Control tent produced 327 grams of tomato fruit, while plants grown under the 3.19 lighting produced 1049.8 grams of fruit or a 312% increase over the T5 lighting.

Example 7—Total Weight of Cherry Tomatoes Produced

In another example, dwarf, determinate cherry tomatoes may be grown under a control and a light emitting device of the current method. Seeds may be planted and plants grown for 89 days and fruit harvested. Seeds were planted in pots with Miracle Grow® potting soil with 20 pots per tent/trial with one recipe lighting program per tent with ebb and flow irrigation.

Tomatoes may be grown under the lighting system provided herein using LED light emitters with emitters located at 18 inches from the pots. Wattage was 249 at a 120 voltage with a power factor of 0.62. The recipe includes: A first initiation component that comprises an ultraviolet wavelength with an intensity of 60% and a reset component with an ultraviolet wavelength with an intensity of 100%. The initiation components are ON for a duration, such as 50 ms, followed by an OFF duration where both components are OFF for 50 ms and then the reset component is ON for a duration of 50 ms and then both components are OFF for 50 ms and then the signal repeats allowing the plant to increase the amount of blanching in each plant.

Example 8—Shrimp Growth

In another example of the method of the current disclosure, shrimp were grown under the lighting of current disclosure and a control.

Figure 32:
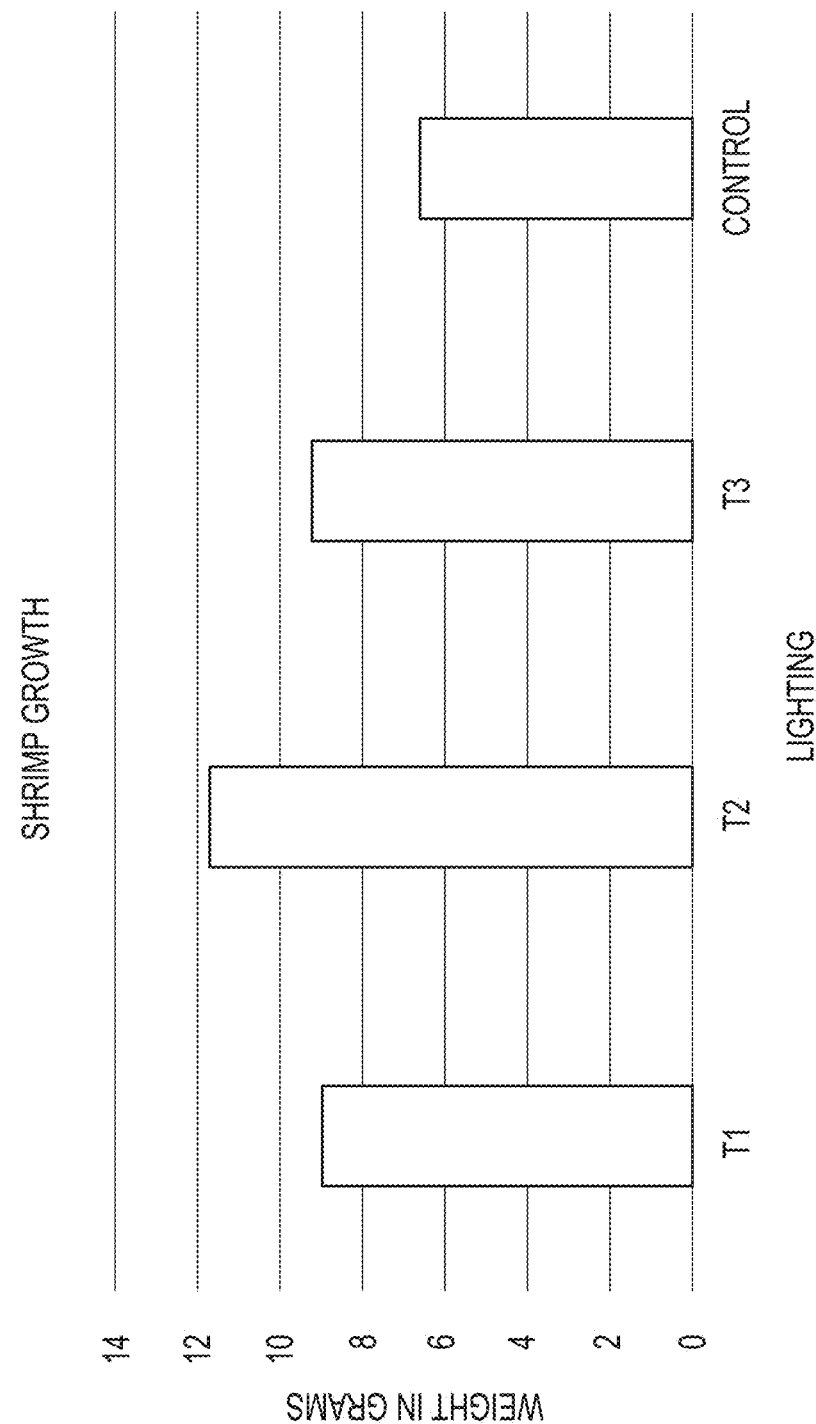
FIG. 32 is a graph showing a comparison of shrimp growth under three photon signal recipes of the current disclosure in comparison with a control.

As shown in FIG. 32, four grow tanks were provided with 30 shrimp per tank, with White Leg Pacific Shrimp (*L. vannamei*) as the testing variety. All shrimp were of the same variety and the same age. Shrimp were grown in 4× Glasscages (Dickson, TN) Custom 30 Gallon Glass Aquarium (with Drain) and overflow.

Shrimp were reared in one tank until size of approximately 1 cm was reached. At 1 cm 30 shrimp were randomly harvested and placed into one of four groups. Three (3) photon pulse recipe treatment groups and one (1) control group. The treatment groups were grown under one of three options shown in Table 5 (Option 1, Option 2 and Option 17) or one (1) control t5 fluorescent light fixture. Shrimp growth rate was observed and qualitatively evaluated on a weekly basis for 10 weeks. During this time shrimp were fed Zeigler Raceway three and SI Grower feed. The amount of feed each tank received was approximated using a feed to consumed time interval (one minute from food fed until completely consumed) and adjusted accordingly. Eheim auto feed timers were used to insure shrimp were fed the same amount of food in 3 equal portions daily. At the end of the 10-week trial period shrimp were toweled off and weight on a balance and recorded for each treatment group. Pictures were taken of each tank population compared to a ruler for visual size comparison. Trial was terminated early due to cannibalism in treatment group 2.

The first column shows the average weight of the 30 shrimp in grams when grown under a photon signal of the Option 17 with an initiation component with a UV aspect and a reset component with far red.

The second column shows the average weight of the 30 shrimp in grams when grown under a photon signal of the Option 1 with an initiation component with a grow recipe and a reset component with far red.

The third column shows the average weight of the 30 shrimp in grams when grown under a photon signal of the Option 2 with an initiation component with a sexual maturity recipe and a reset component with far red.

Column four shows the average weight of the 30 shrimp in grams when grown under a T5 fluorescent light.

As shown in FIG. 32, the shrimp grown under the lighting method of the current disclosure (shown in columns 1-3) showed significantly more weight in grams than shrimp grown under the T5 fluorescent lamp.

Example 9—Shrimp Growth

In another example of the method of the current disclosure, shrimp may be grown under the lighting of current disclosure and a control. Shrimp may be grown under a growth recipe of a far red excitation component and a reset component with far red allowing shrimp grown under the lighting method of the current disclosure to show more weight in grams than shrimp grown under the T5 fluorescent lamp.

Example 10—Stitching Recipes—Bird Growth to Egg Production

In another example of the current disclosure, photon signal recipes may be changed over time to produce different biological responses in an organism. By way of example in chickens, for a day old poulet, the young bird may be illuminated or radiated by a grow recipe that may include an initiation component that is pulsed with all colors and a second initiation component that is blue followed by a reset component of far red that is designed to increase the bird's desire to eat without inducing sexual maturity. The bird is illuminated on a 24-hour period with a target intensity of the signal 200 mW.

Once the bird reaches a target weight, such a 2.8 lbs., the bird is moved to a layer house where it is illuminated in a photon signal for a 17-hour period with a signal designed to induce the bird to reach sexual maturity and to produce eggs. The second photon signal recipe is composed of a near red initiation component and a far-red reset component with an intensity of 200 mW for one week and then 110 mW.

Once egg production from the bird begins to dip, a third photon signal recipe is directed toward the bird where the reset component contains a second or third photon pulse prior to the repeat of the photon signal (shown in Option 13 and FIG. 23).

Figure 33:
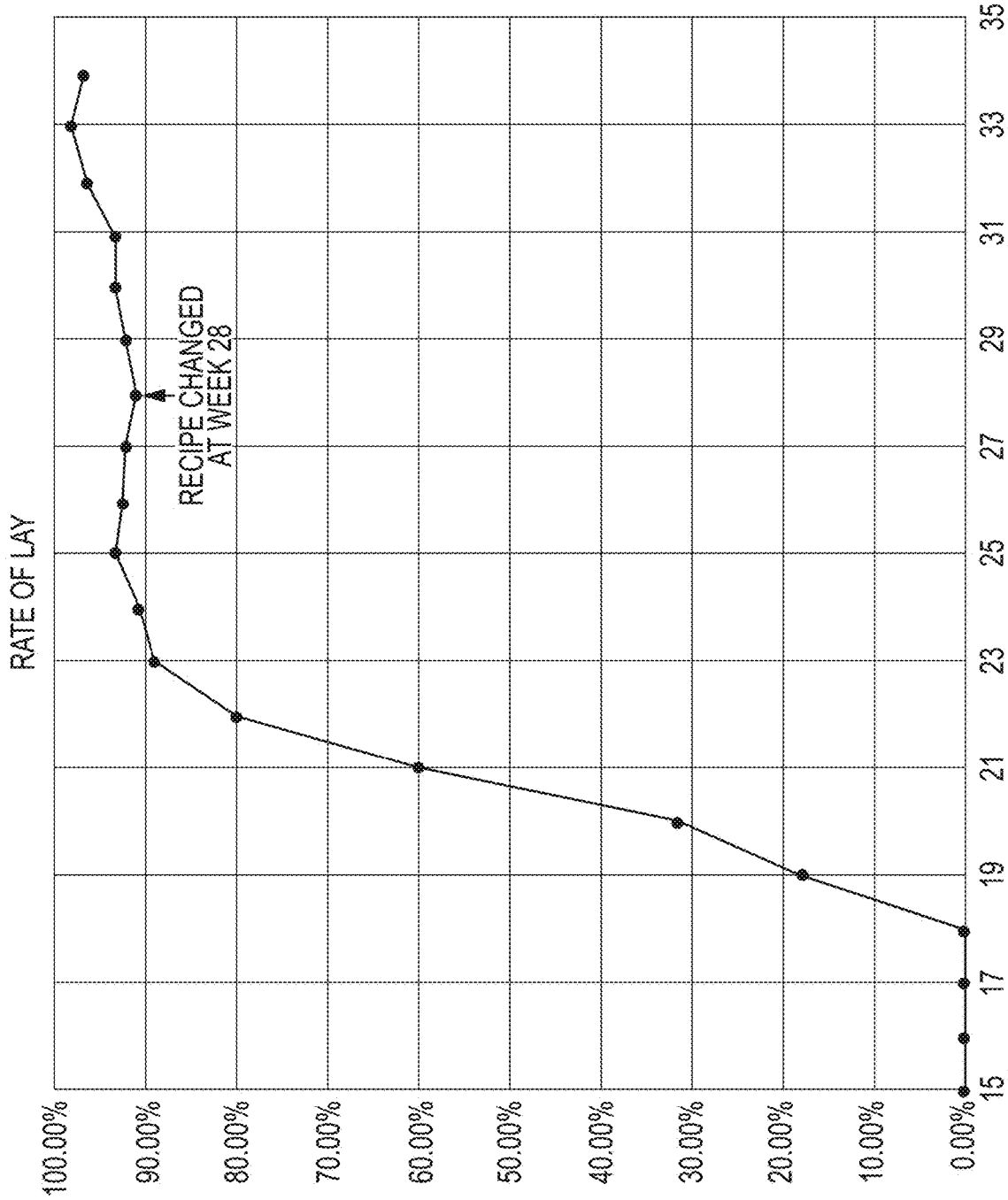
FIG. 33 is a graph showing a second increase in egg production in birds with a change in photon signal recipe.

FIG. 33 provides an example of increased egg production over time by stitching recipes. As shown in FIG. 33, egg production in a bird begins at week 18 and increased overtime with a peak production in week 25. A dip in production is seen in week 26, however in week 29 the receipt of the photon signal is changed to add a second pulse of far red in the reset component (shown in FIG. 17), thus inducing a second increase in egg production from the bird.

Example 11—Stitching Recipes—Egg Production to Second Egg Production

Figure 34:
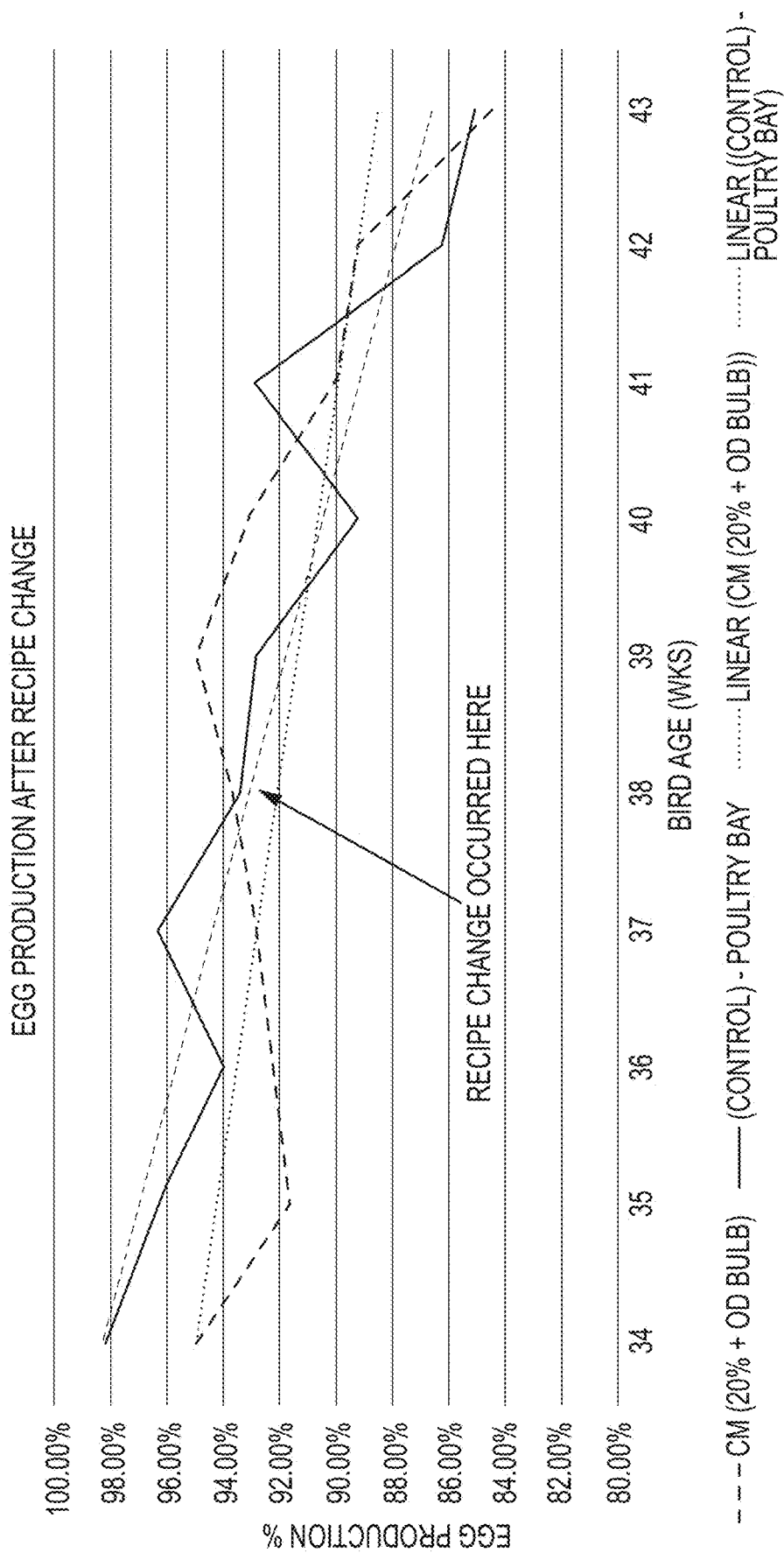
FIG. 34 is a graph showing the effect of a 30% change in intensity in egg production between weeks 37 and 38.

In another example of the current disclosure, FIG. 34 shows birds at ages 34 weeks radiated under lighting option 1 and compared with a poultry light from Once Innovations, Inc. As shown in FIG. 34, once egg production from the bird begins to dip at week 38, a second photon signal recipe is directed toward the bird where the reset component contains a second or third photon pulse prior to the repeat of the photon signal (shown in Option 13 and FIG. 24 verse) with an increase in egg production from week 38 to 39.

Example 12—Stitching Recipes—Mammal Growth to Milk Production

In another example of the current disclosure, photon signal recipes may be changed over time to produce different biological responses in an organism. By way of example in cattle, for a day old calf, the young calf may be illuminated or radiated by a grow recipe that may include an initiation component that is pulsed with all colors and a second initiation component that is blue followed by a reset component of far red that is designed to increase the calf's desire to milk without inducing sexual maturity. The calf is illuminated on a 24-hour period with a target intensity of the signal 200 mW.

Once the calf reaches a target weight or age, the calf is moved to a dairy house for milk production where it is illuminated in a photon signal for a shortened period with a photon signal designed to induce the calf to reach sexual maturity and to begin to produce milk or lactate. The second photon signal recipe is composed of a near red initiation component and a far-red reset component with an intensity of 200 mW for one week and then 110 mW.

Example 13—Stitching Recipes—Plant Vegetative Growth and Flower Production

In another example of the current disclosure, photon signal recipes may be changed over time to produce different biological responses in an organism. By way of example in plants, such as petunias, once a cutting has been rooted and is ready for vegetative production, the plant may be illuminated or radiated by a grow recipe that may include an initiation component that is composed of near red wavelengths with blue wavelengths and followed by a reset component of far red that is designed to increase vegetative growth. The plant is illuminated on a 24-hour period with a target intensity of the signal 100 mW.

Once the plant reaches a target size, the photon recipe can be adjusted to a recipe to induce flower production where it is illuminated in a photon signal for a 24-hour period with a photon signal. The second photon signal recipe is composed of an initiation component in a combination of blue and near red and a far-red reset component with an intensity of 150 mW.

Example 14—Bump Feeding

In another example, bump feeding may be used to encourage eating by an organism, even in a photon signal recipe designed for sexual maturity, egg laying or other desired biological. In this example, the term bump feeding is when the LED light is turned off in the middle of a lighting recipe for a brief period of time, creating an entirely dark environment for the organism with no external light. By way of example, for a bird under a photon signal for laying eggs, with a 17-hour exposure period, one to four times during the 17-hour period, the LED lights are turned off for a period of one to ten minutes and then turned on again. This triggers a supplemental excitation of the bird's photoreceptors and induces the birds to eat. While birds are used in this example, it will be understood by one skilled in the art that bump feeding as described above can also be applied to other organisms, such as plants, mammals, fish, reptiles, crustaceans and others.

Example 15—Intensity Data

Figure 41:
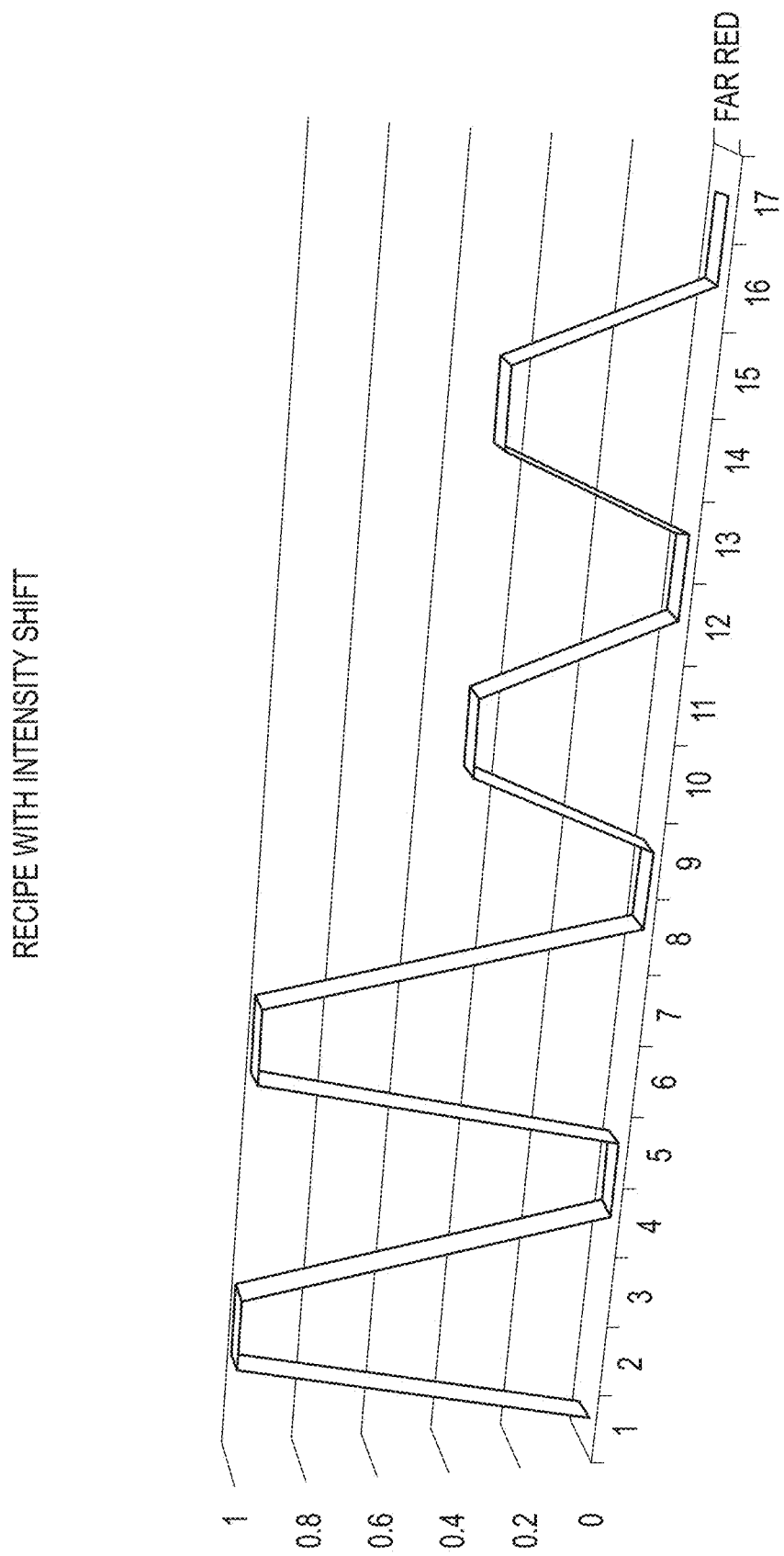
FIG. 41 shows a graph of a single component of far red with a shift of intensity from 100% to 50%.

In another embodiment of the facility of the present disclosure, the intensity of the initiation and the reset components can be adjusted based on the needs of the organism. FIG. 41 provides a basic example of this concept with a graph of a single component of far red with a shift of intensity from 100% to 50%.

This is further shown in FIG. 34 which shows egg production over time with a recipe change at week 37 where the intensity of the receipt was changed from 100% to 30% which led to stimulating birds to increase in egg production.

Example 16—Adjusting the Relationship of Components within a Signal to Account for Changes in Environment In another example of the current disclosure, changes in the environment, such as temperature and barometric pressure, can have on effect upon the biological response of an organism. In order to maintain the consistency and optimization of the effect of a desired biological response, the initiation and reset components of a photon signal may be adjusted in in order to maintain the desired response or the photon signal recipe may be changed or stitched to account for the environmental change, such as changing the components of a photon signal from ovulation to a photon signal that will encourage eating in the case of an approaching winter storm.

Aliasing

In another embodiment of the facility of the current disclosure, photon signal recipes may be emitted toward an organism to influence the organism's temporal awareness. By way of example, photon signal recipes can be emitted toward an organism to replicate sunset, sunrise or the sun at midday, with these time frames designed to replicate sunset on August $1^{st}$ at a specific location, such as Manhattan, Kansas, while the organism is actually located in Miami, Florida This allows for the replication of a specific lighting spectrum that would be received by an organism at a specific time, on a specific date, at a specific location. This can allow for photoperiod specific organisms, such as corn, to be grown in locations in different seasons than would normally take place in an external environment.

The current disclosure accomplishes this by using aliasing to induce the organism that it is receiving a light spectrum that mimics what the organism would expect at a certain location during a specific season. By pulsing a spectrum with certain color spectrums for specific periods (24 hours, 18 hours, 17, hours, 16 hours, 14, hours, 12 hours, 10 hours, 9 hours, 8, hours, 6 hours) allows for aliasing to mimic a specific photoperiod that can induce the organism into a specific biological response, such as growth, sexual maturity, ovulation, egg production and others.

Aliasing refers to the distortion or artifact that results when the signal reconstructed from samples is different from the original continuous signal. Aliasing occurs in signals sampled in time or in spatially sampled signals. Aliasing is a phenomenon that happens when a signal is sampled at less than the double of the highest frequency contained in the signal. FIGS. 35-40 show examples of a signal with a single frequency f that is sampled at a frequency fs. FIGS. 35-40 and discussed below show the signal in the time domain and the sampling points.

Sinusoids are an important type of periodic function, because realistic signals are often modeled as the summation of many sinusoids of different frequencies and different amplitudes (for example, with a Fourier series or transform). Understanding what aliasing does to the individual sinusoids is useful in understanding what happens to their sum.

Figure 35:
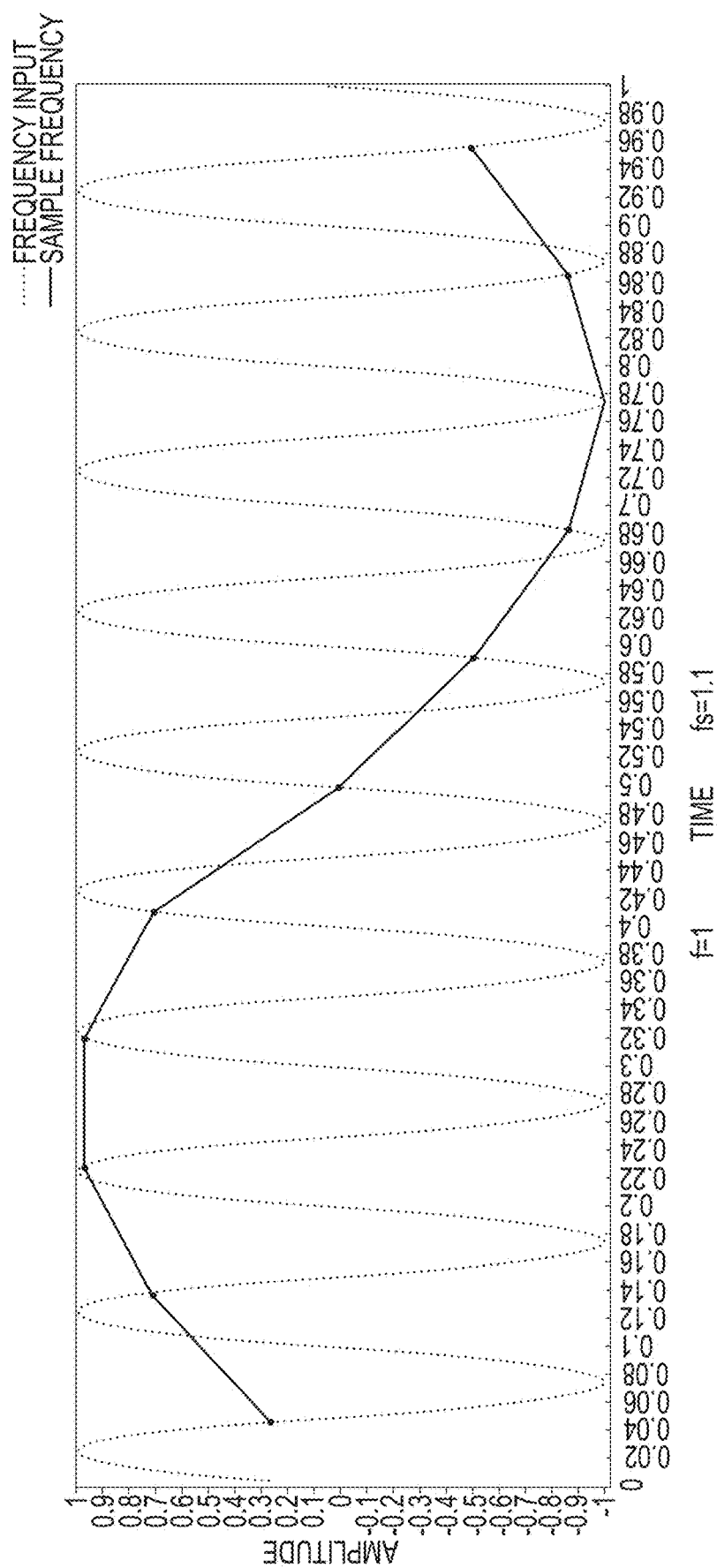
FIG. 35 shows a plot of two different sinusoids that fit the same set of samples.

The plot shown in FIG. 35 depicts a set of samples whose sample-interval is 1. As shown in FIG. 35, the x axis is time, for example, a ten second period, the y-axis is amplitude from 0 to 1. The sample-rate or temporal (spatial, world or environmental) awareness of an organism in this case is f=1. For example, if the interval is one (1) second, the rate is one (1) sample by the organism per second. Ten cycles of the dotted line sinusoid (f) are shown and one (1) cycle of the solid line sinusoid (fs) span an interval of ten (10 samples, showing the interaction or temporal awareness of an organism with the sinusoid (f). The corresponding number of cycles per sample are f=1 and fs=1.1. If these samples were produced by sampling functions $\cos(2\pi(1.0)x-\theta)$ and $\cos(2\pi(1.1)x-\emptyset)$, they could also have been produced by the trigonometrically identical functions $\cos(2\pi(-1.0)x+\theta)$ and $\cos(2\pi(-1.1)x+\emptyset)$ which introduces the useful concept of negative frequency.

The examples of FIGS. 35-40 show a frequency input as a sinusoidal signal. As one skilled in the art would understand, the input photon signal may be comprised of one or many periodic waveforms, including but not limited to, square wave, saw tooth wave, triangle wave or any other periodic function. It should be noted that the periodic waveform may be a single type of periodic function or a combination of one or more different types of periodic functions with or without pauses and sequences of periodic functions mixed with or without pauses. One skilled in the art would also understand that while the figures and examples below are presented in the time domain, they could also be referenced in the frequency domain as well.

As shown in FIG. 35, two different sinusoids are provided that fit the same set of samples or organism check-ins with the surrounding world. When fs<2f, the sampled frequency signal of 1.1f appears to have a different frequency than the original input frequency.

Figure 36:
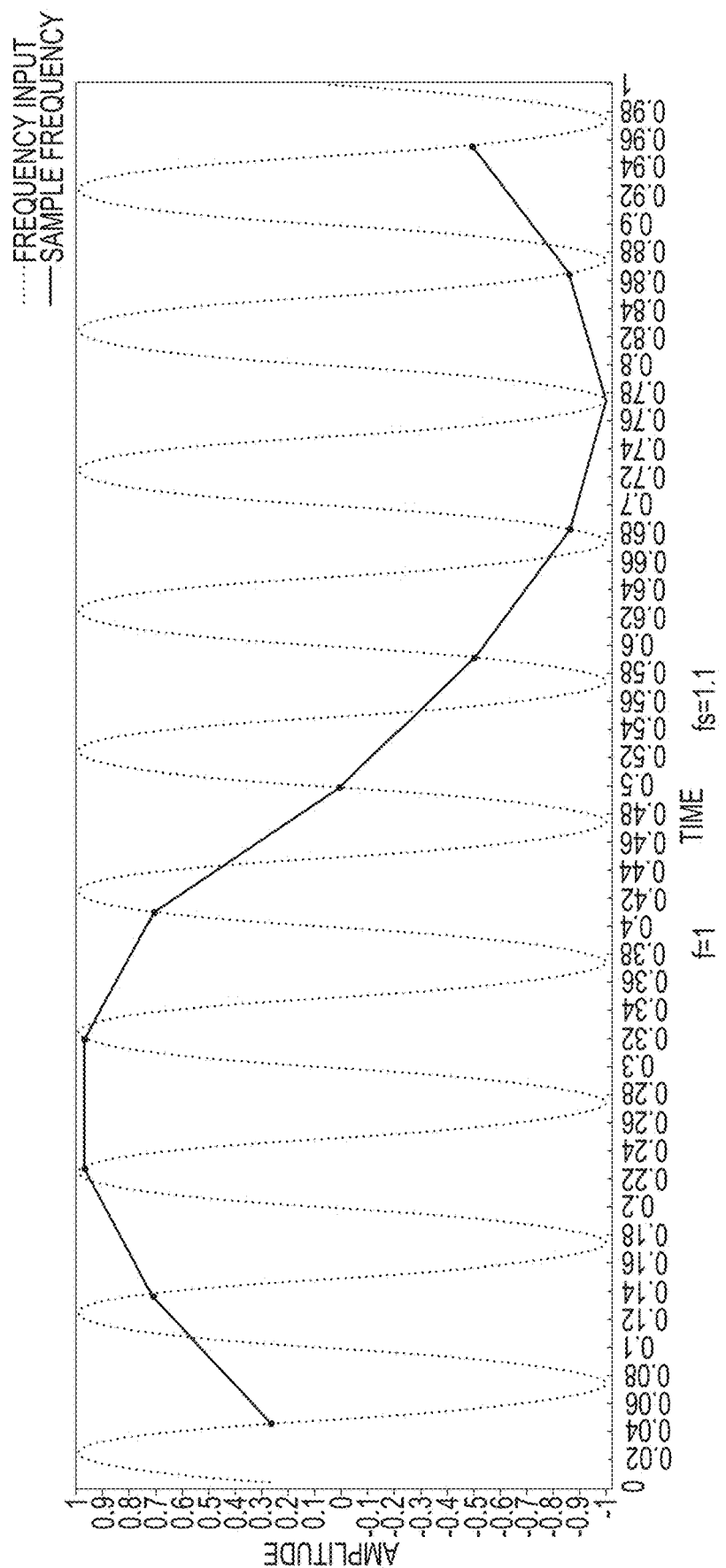
FIG. 36 shows a plot of when fs<2f, the sampled frequency signal of 1.9f appears to have a different frequency than the original input frequency.

As shown in FIG. 36, when fs<2f, the sampled frequency signal of 1.9f appears to have a different frequency than the original input frequency.

In general, when a sinusoid of frequency f is sampled with frequency fs, the resulting number of cycles per sample is f/fs (known as normalized frequency), and the samples are indistinguishable from those of another sinusoid (called an alias) whose normalized frequency differs from f/fs by any integer (positive or negative). Adding an integer number of cycles between the samples of a sinusoid has no effect on the values at the sample points. This is the essence of aliasing. Replacing negative frequency sinusoids by their equivalent positive frequency representations, we can express all the aliases of frequency f as $f_{alias}(N) \overset{def}{=} |f-Nfs|$, for any integer N with $f_{alias}(0)=f$ being the true value, and N has units of cycles per sample. Then the N=1 alias of f is fs (and vice versa).

Figure 37:
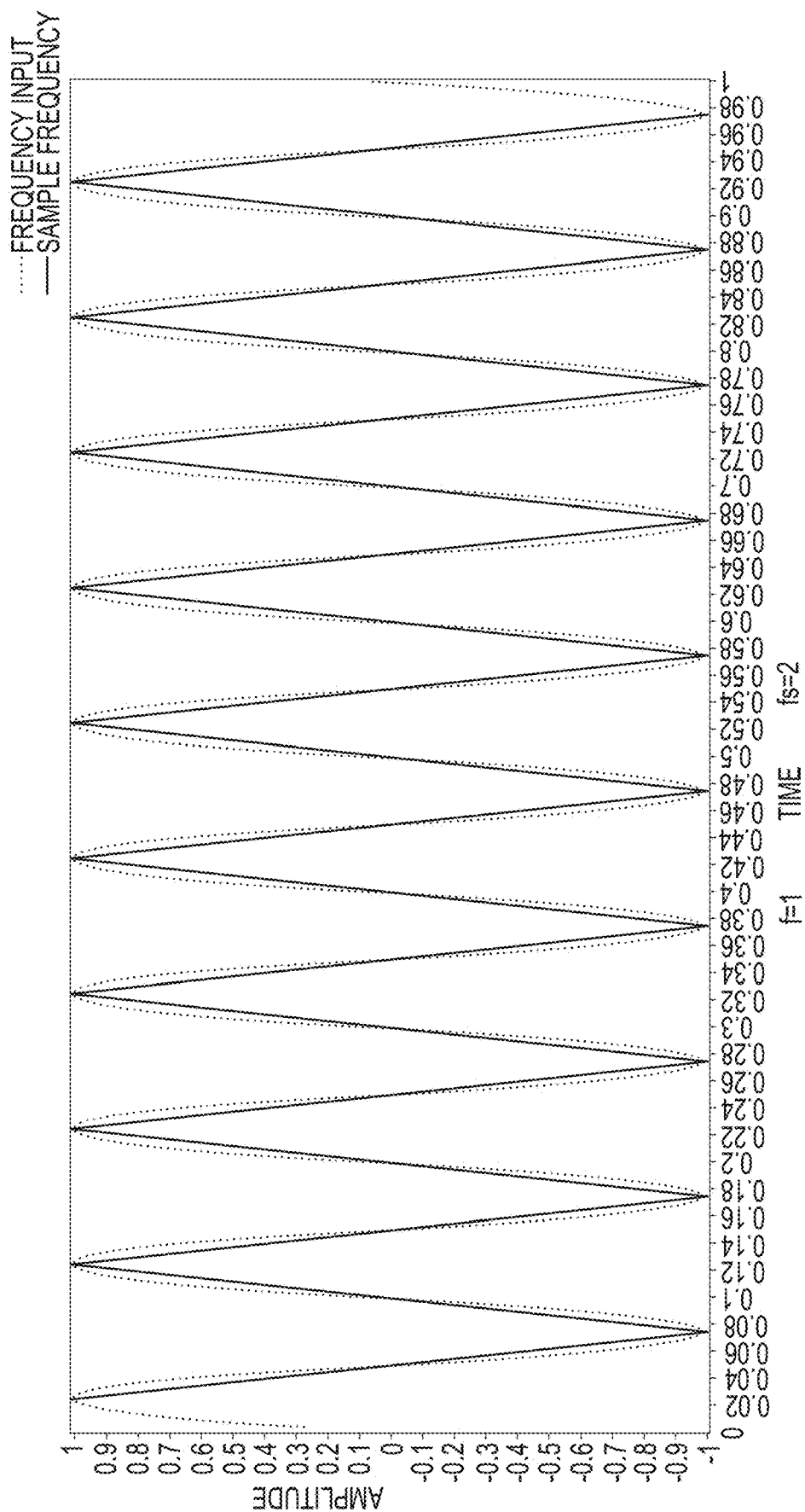
FIG. 37 shows a plot of when fs>2f or fs=2f, the sampled frequency signal of 2.0f appears to have the same frequency as the original input frequency.

As shown in FIG. 37, when fs>2 f or fs=2f, the sampled frequency signal of 2.0f appears to have the same frequency as the original input frequency or signal.

Figure 38:
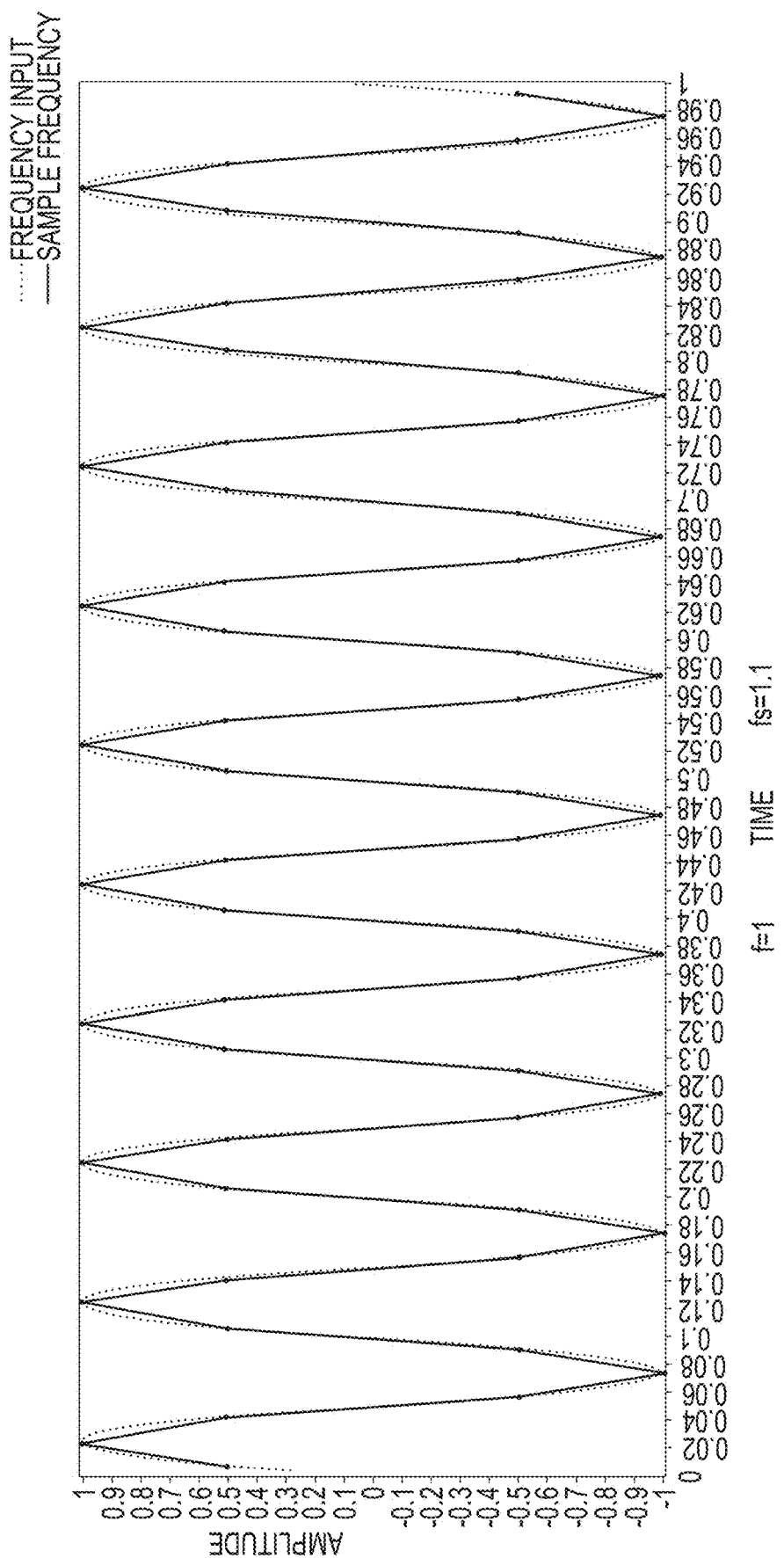
FIG. 38 shows a plot of when fs>2f or fs=2f, the sampled frequency signal of 2.0f appears to have the same frequency as the original input frequency.

As shown in FIG. 38, when fs>2 f or fs=2f, when the sampled frequency signal of the of 2.0f appears to have the same frequency as the original input frequency.

If you lower the sampling frequency below fs=2f, the sampled signal appears to have a different frequency. This effect is called aliasing and it also happens when you watch wheels spinning so fast that it appears that they are moving slowly in the other direction (the Wagon-wheel effect).

In general, a signal with frequency fi after sampling could have been obtained by the sampling of signals with frequency, f $$f_i = |f - N*fs|$$

Where N is any integer. Then, with N=1, the alias with frequency 0.1f comes from sampling at frequencies 0.9f (fi=|f−0.9*f|=|0.1*f|) or 1.1f(fi=|f−1.1*f|=|0.1*f|). Likewise, the alias with zero frequency comes from sampling cases:

$$fs=1f, N=1: |f-1*1f|=0$$

$$fs=0.5f, N=2: |f-2*0.5f|=0$$

$$fs=0.2f, N=5": |f-5*0.2f|=0$$

A photon signal is normally composed of two, three or more frequencies, and this effect can be analyzed individually for each of them.

As will be discussed in further detail below, by applying aliasing to an organism, biological chemicals, hormones, proteins and biological responses of an organism may be controlled and regulated, including but not limited to, in the form of chemical products and biological functions.

If a function x(t) contains no frequencies higher than B hertz, it is completely determined by giving its ordinates at a series of points spaced 1/(2B) seconds apart. Therefore, if you sample a signal with bandwidth B at a frequency lower than 2B, aliasing exists. This condition is known as not meeting the Nyquist criterion. You have two ways of looking at it:
 a. For a given signal with bandwidth B, you must sample at less than the Nyquist rate, which is 2B to cause aliasing
 b. At a given sampling frequency fs, the signal to be sampled must have a bandwidth larger than the Nyquist frequency, which is fs/2 to cause aliasing.

When light is used as the periodic function (frequency input) and it is intentionally pulsed where fs<2f is true, you can give a new perceived input to biological targets. Because there is no such thing as a negative intensity (amplitude) the above figures have been rectified to remove all negative parts of the frequency input.

Figure 39:
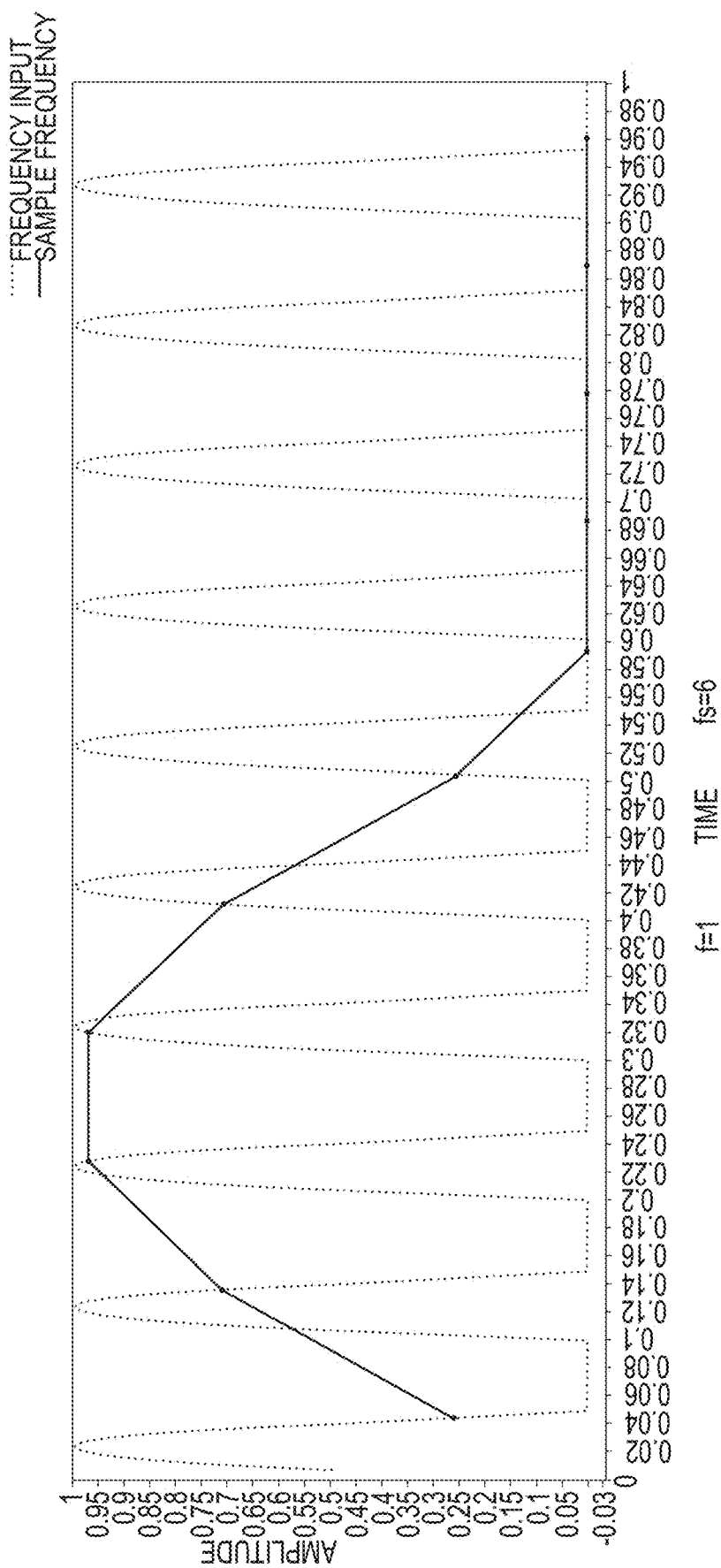
FIG. 39 shows a plot of two different sinusoids that fit the same set of samples with the negative portion of the frequency input removed. When fs<2f, the sampled frequency signal of 1.1f appears to have a different frequency than the original input frequency.

As shown in FIG. 39, two different sinusoids are shown that fit the same set of samples with the negative portion of the frequency input removed. When fs<2f, the sampled frequency signal of 1.1f appears to have a different frequency than the original input frequency.

Figure 40:
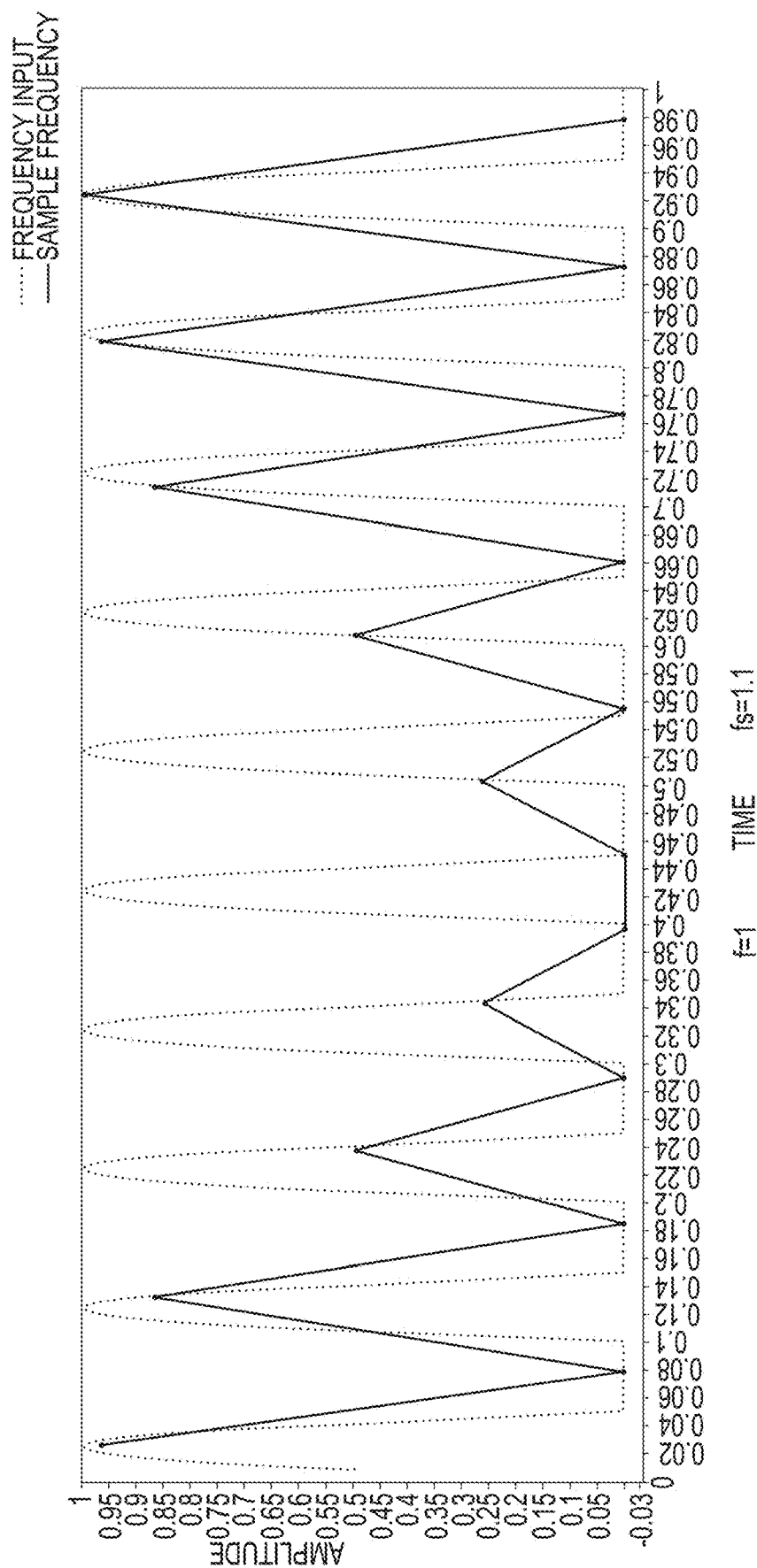
FIG. 40 shows a plot of two different sinusoids that fit the same set of samples with the negative portion of the frequency input removed. When fs<2f, the sampled frequency signal of 1.1f appears to have a different frequency than the original input frequency.

A shown in FIG. 40, two different sinusoids that fit the same set of samples with the negative portion of the frequency input removed. When fs<2f, the sampled frequency signal of 1.9f appears to have a different frequency than the original input frequency.

The intentionally aliased light input of a target or targets may include, but are not limited to, light-induced conformational changes of proteins, molecules, or chemicals. These targets may include, but are not limited to, general proteins, DNA, hormonally active proteins and chemical molecules, carrier proteins, neurotransmitters, G-protein bound photoreceptors, pigment containing molecules (i.e. phytochrome, cryptochromes, chromophores, etc.), photosystems, chlorophylls, cytochromes carotenoids, cell wall/ membrane proteins, organic molecules, fluorophores, and vitamins. These substances can be found in organisms, such as plants, animals, bacteria, fungi, viruses, and humans. These molecules can undergo conformational changes in the setting of the appropriate light stimuli.

The resulting effect on a biological function may include but is not limited, to fertility, ovulation, hunger, egg production, growth, sexual maturity, milk production, behavior and socialization, root, tissue or hyphal growth, vegetative growth, flower or fruiting body production, fruit, spore or seed production, stopping growth, elongation of a specific plant part, repairing an organism or destruction of the organism and interpolation of circadian inputs. Examples include, but are not limited to; creating electro-magnetic wave emission pulse trains (photons) of individual color spectrums in sufficient intensity to drive photochemical response in an organism to control a biological function, using a characteristic frequency or pattern to minimize the required input power necessary to stimulate, while also allowing for the monitoring of the power consumption and other variables of the system.

As used herein, "light stimuli" may include, but is not limited to, visible light or other "non-visible" parts of the electromagnetic spectrum such as infrared or ultraviolet. These light stimuli molecules may then be able to return to their initial state via "natural" or light-induced stimulation as in bi-phasic molecules, or in some instances, for example DNA, may result in a heritable change. Thus, the light-induced conformational change of proteins, molecules, and chemicals can be returned to the natural state via a "reset substrate".

a. Light sensitive molecule+reset substrate=Product timing($P_t$) and/or Product level($P_l$)

By aliasing the frequency input, a new perceived signal can be sent to the target or targets, and when appropriate, stimulating the secondary receptor pathway of bi-phasic molecules by changing and controlling the rate at which the signal is being sent. By modifying the rate at which these proteins undergo conformational change, different results, products, growth characteristics, blood levels, behavior modifications, and circadian rhythms can be controlled, adjusted or made. This allows for control over certain organismic physiological processes.

By way of example, it is generally accepted that an organism, including, but not limited to, plants, mammals, birds, reptiles, fish, bacteria and fungi, is able to periodically check in (sample frequency) with its environment to sense wavelength and intensity of light. This is most likely based on a ratio of near and far red wavelengths in most instances. It is also known that sampling by an organism replicates the color spectrum of the original signal at distance multiples of the sampling frequency. If an extremely high input frequency of pulsating light is directed at the organism, it is possible to alias, modify and control the organisms' normal sampling frequencies. This is shown in the growth of kalanchoe plants. A kalanchoe is normally considered to be a short-day flowering plant, meaning that it usually requires less than eight (8) hours of light in a 24-hour period to cause flowering to set. Using the aliasing technique provided herein, it is possible to leave the pulsing lights on all the time and still initiate the setting of flowers in the kalanchoe by adjusting the input frequency signal to the plant so that when the plant samples the signal, the plant believes it is time to set flowers. Similarly, it is standard practice to light poultry layers for 18 hours a day to maximize the number of eggs produced. Using the aliasing technique, it has been shown that egg production can increase over the standard 16-18-hour lighting cycle by lighting the birds all the time with the proper aliased signal.

For many types of organisms, biological functions are based on a day/night cycle. For example, as winter approaches egg laying decreases with many if not most species of organisms. To combat the decrease in egg production, artificial light is often used in egg laying facilities to recreate or mimic a longer day length as opposed to night. Artificial light is often used throughout the chicken production process including but not limited to breeder houses, hatcheries, and broiler houses, to promote organism growth and egg production.

Aliasing Examples

Example 17—Poultry Long Day and Short Day Photoperiods to Induce Hunger and Ovulation As previously discussed, in another example of the current disclosure, photon signal recipes may be used in the facility to mimic the photoperiod of a specific location at a specific time period and changed to mimic a different photoperiod to induce different biological responses in an organism. By way of example in chickens, for a day old poulet, the young bird may be illuminated or radiated by a grow recipe to mimic a long day photoperiod to induce hunger and growth. The photo signal may include an initiation component that is pulsed with all colors and a second initiation component that is blue followed by a reset component of far red that is designed to mimic the long day photoperiods to increase the bird's desire to eat without inducing sexual maturity.

Once the bird reaches a target weight, such a 2.5 lbs., the bird may be moved to a layer house where it is illuminated in a photon signal for a 17-hour photoperiod with a signal designed to induce the bird to reach sexual maturity and to produce eggs. The second photon signal recipe is composed of a near red initiation component and a far-red reset component with an intensity of 200 mW for one week and then 110 mW.

Example 18—Long Day and Short Day Photoperiods to Induce Growth, Flowering and Seed Production in Corn in Ames, Iowa In another example of the current disclosure, photon signal recipes may be used in the facility to mimic the photoperiods for corn grown in Ames, Iowa in specific zones of the facility. For example, corn may be grown in a warehouse in Calgary, Alberta in January but by using aliasing, the plant may be grown to mimic growth patterns in May, flowering in July and seed production in August in Ames, Iowa. Young corn plants may be illuminated or radiated by a grow recipe to mimic a long day photoperiods of May in Ames, Iowa, and with the plant periodically checking, the photon signal will induce the plant to think it is May and will induce growth. The photo signal may then be adjusted to mimic the photoperiods of July in Ames, thus inducing the plant to begin flower production and then adjusted to mimic August photoperiods to initiate seed production.

Example 19—Long Day Photoperiods to Induce Growth, Flowering and Seed Production in Wheat in Lincoln, Nebr In another example of the current disclosure, photon signal recipes may be used to mimic the photoperiods for wheat grown in Lincoln, Nebraska For example, wheat may be grown in a warehouse in Miami, Florida in August but by using aliasing, the plant may be grown to mimic growth patterns in May, flowering in July and seed production in August in Lincoln, Nebraska Young wheat plants may be illuminated or radiated by a grow recipe to mimic a long day photoperiods of May in Lincoln, Nebraska, and with the plant periodically checking, the photon signal will induce the plant to think it is May and will induce growth. The photo signal may then be adjusted to mimic the photoperiods of July in Lincoln, thus inducing the plant to begin flower production and then adjusted to mimic August photoperiods to initiate seed production.

Example 20—Short Day Photoperiods to Induce Bract Production in Poinsettia in Mexico City, Mexico In another example of the current disclosure, photon signal recipes may be used in the facility to mimic the short-day photoperiods for poinsettia grown in Mexico City, Mexico. For example, poinsettias may be grown in a warehouse in Denver, Colorado in July but by using aliasing, the plant may be grown to mimic color bract production that is commonly desired in winter for poinsettias. Poinsettias need short photoperiods with 12 hours of darkness to induce production of colored bracts, such as red, pink and white. Mature poinsettia plants may be illuminated or radiated by a leaf production recipe to mimic 12 hour short day photoperiods and with the plant periodically checking, the pulsed repetitive photon signal will induce the plant to think it is winter in Mexico and will induce the plant to produce colored bracts.

Example 21—Aliasing Circadian Rhythm in Mammals

As discussed above, long day photoperiod exposed lactating cattle produced higher milk yield due to lower melatonin concentrations and higher prolactin concentration, whereas short day photoperiod during the dry period of multiparous cows enhances milk production in the following lactation. The use of aliasing allows for the mimic of photoperiods in a specific time of year at a specific location. For example, use of aliasing allows for the mimic of long day photoperiods of a cow in Greeley, Colorado to use the pulsed emission of photons from an LED light to mimic photoperiods in February and March that allows cows to check in to their environment and to be induced to produce milk but shortly thereafter allow for the photon recipe to be changed to recipes with mimic the long day photoperiods of July and August to induce ovulation.

Example 22—Short Day Photoperiods Vegetative Growth and Long Day Photoperiods to Induce Fruiting Body Production in *Agaricus bisporus*

In another example of the current disclosure, photon signal recipes may be used in a facility to mimic mushroom production in Corvallis, Oregon For example, fungal mycelium may be grown in a warehouse in Marquette, Michigan in December but by using aliasing, full mushroom production may be accomplished. *Agaricus bisporus* mycelium may be radiated with short photoperiod photon pulses allowing the mycelium to check in with its environment and convinced to produce vegetative growth. Once the mycelium has completely encompassed its substrate, the photon recipe may be adjusted to mimic a long day photoperiod identical to Corvallis, Oregon in June, inducing the mycelium to produce fruit bodies.

An additional example embodiment to the methods, systems and apparatuses described herein may include less heat creation in a facility: LED lighting intrinsically creates less heat than conventional grow lights. When LED lights are used in a dosing application, they are ON less than they are OFF. This creates an environment with nominal heat production from the LED lights. This is not only beneficial in terms of not having to use energy to evacuate the heat from the system, but is beneficial to the organism because lighting may also be used to reduce animal stress or calm the animal while also reducing the risk of burning the organism.

Embodiments provided herein provide mobile real time location units for use with an organism, such as a mammal, bird, reptile, or plant where the mobile real time location unit communicates data within the facility regarding the organism, such as the location within the facility, identity, health, behavior of the organism or the environment around the organism to lighting arrays or lighting networks around the organism. The data from the mobile real time location unit is processed by the lighting network and based on the data, the photon emission of the lighting may be adjusted to account for the needs or protection of the organism.

The lighting networks provided herein and described in PCT Application No. PCT/US20/65890 provide methods for inducing desired biological responses in an organism by emitting a photon signal from one or more LED lights with two or more components that are designed to induce a biological response by stimulating photoreceptors of an organism and/or then resetting the photoreceptor to allow for further stimulation of the photoreceptor. A specific photon signal from an LED light may be designed to stimulate an ovulation response specific to a bird, however if a person walked into the same room, they may not want to be stimulated by the same photon signal. The mobile real time location unit is designed to be worn by a person or attached to an organism and to emit a signal toward at least one LED light to indicate the presence of the organism in the vicinity of the LED light or to provide the LED light with information regarding the organism. Based on presence, instructions or commands, the LED light will then change the lighting emitted to the organism, such as a person, of an unwanted photon emission and resulting in an unwanted biological response or modification of the emission to enhance a wanted biological response. The system and methods provided herein, allow for isolated LED lights to be amended only in the vicinity of the organism associated with the mobile real time location unit while allowing other LED lights outside the vicinity to continue their programmed emission.

As will be described in more detail herein, the mobile real time location unit communicates and receives wireless signals with an array of LED lights or individual LED lights that allow the LED lights to determine the relative position of the mobile real time location units in relation to the LED lights as well as additional information relevant to the organism in relation to the mobile real time location units, allowing the LED lights to adjust their photon emissions as necessary depending on the location and needs of the organism associated with the device.

As will be discussed in further detail, the modulation or pulsing of photons or light from an artificial LED light source to an organism, can stimulate or influence a variety of desired biological responses or functions, including but not limited to, fertility, ovulation, hunger, egg production, sexual maturity, milk production, hormone production, behavior and socialization, root, tissue or hyphal growth, vegetative growth, flower or fruiting body production, fruit, spore or seed production, stopping growth, elongation of a specific plant part, repairing an organism or destruction of the organism and interpolation of circadian inputs. Examples include, but are not limited to; creating a signal with one, two or more components of electro-magnetic wave emission pulse trains (photons or light) of individual color spectrums in sufficient intensity to drive photochemical response in an organism to control a desired biological function, using the relationship between the timing of ON durations of at least two components within a repetitive signal. Specifically, by providing a signal with one or multiple repetitive photons or light pulses at specific combination of rates relative to the timing of the ON duration of each component, including intensities, waveforms, photochemical responses by organisms can be stimulated and optimized and adjusted controlled or determined manner.

As used herein a number of sensors may be incorporated into the mobile real time location unit or attached to an organism and communicated to the mobile real time unit in order to provide various information about the organism associated with the mobile real time location unit as well as the environment around the mobile real time location unit. Examples of such sensors may include but are not limited to temperature sensors, smoke, moisture, barometers, stem diameter, GPS, accelerometers, heart rate, blood pressure, ovulation, hormone tracking, such as estrogen, testosterone and cortisol (which may be used to monitor stress) as well as vibration, sound and vocalization to list of measurements.

Figure 42:
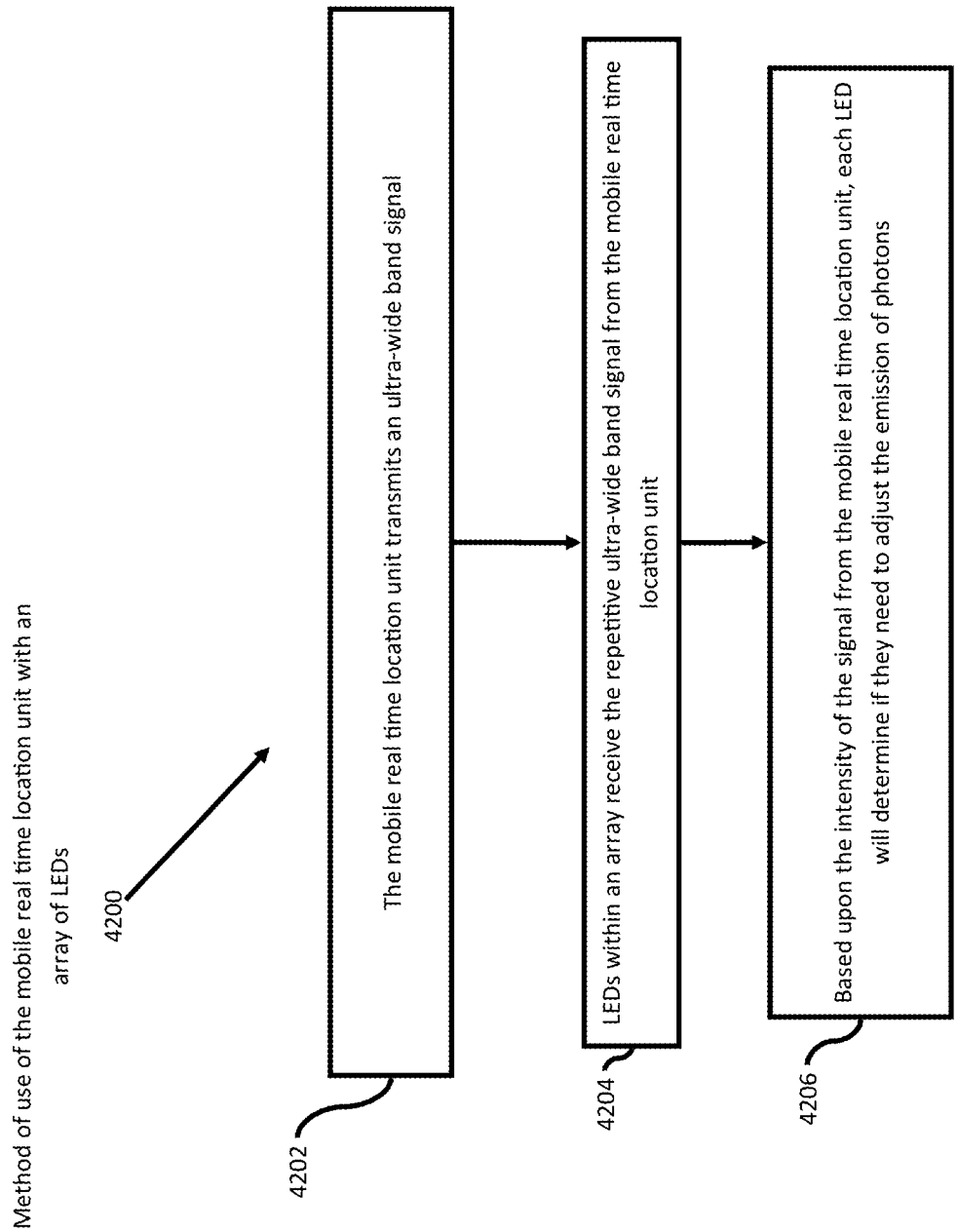
FIG. 42 is a flow diagram of an example method of using of the mobile real time location unit with an array of LED lights.

FIG. 42 provides a flow chart, for an example of the method of using the mobile real time location unit to monitor the location, health and/or environment of an organism, such as a person, horse, cow, bird or plant in relation to an array of LED lights emitting pulsed photons in order to induce a desired biological response. As shown in FIG. 42, in step 4202 a mobile real time location unit associated with an organism repetitively, constantly, or passively transmits a signal, such as an ultra-wide band signal or RFID. The mobile real time location unit may be associated with an organism by hanging the unit around the next of a person on a lanyard, on the collar of a mammal or bird or attached to plant. The signal emitted by the mobile real time location unit may contain data regarding the organism. The unit is associated with such as the identity of the organism, type of organism, age, sex and prior medical or heath data and history as well as information such as the heart rate, blood pressure, stress levels as well as the temperature of the organism as well as the location of the organism in relation to each LED light. In step 4204, an array of LED lights emitting photons receive the repetitive ultra-wide band signal from the mobile real time location unit. Each LED light within the array may also emit a signal with data that is received by the mobile real time location unit. In step 4206, based upon the presence of the signal from the mobile real time location unit as well as the intensity of the signal from the mobile real time location unit, each LED light determines its distance from the mobile real time location and/or other determining factors such as identification, each LED light will determine if they need to adjust its emission of photons. This allows for an organism, such as a person, to walk into a facility with one or more LED light arrays that are emitting photons directed toward organisms to induce a desired biological effect, such as ovulation in chickens, the LED light array to identify the presence and location of the person wearing the mobile real time location device and for the LED light to adjust the emission of photons to a new emission pattern of photons or to stop the modulation of photons from the LED light. However, the use of the mobile real time location unit and its communication with the LED light arrays in a facility allow for only the LED lights in the vicinity of the person to change their photons without effecting the emission of other LED lights in the facility. After the person moves out of range of the said LED light, the LED light would either return to its previous emission recipe or transition into a new temporary emission recipe.

In another embodiment of the facility of the present disclosure, each LED light in an LED light array also emits an output signal, such as an ultra-wide broad band signal or a contains RFID that is received or sensed by the mobile real time location unit. The signal from the LED light provides information to the mobile real time location unit regarding the LED light as well as provides information on the location of the LED light in the facility, and based on the signal strength and direction, allows the mobile real time location unit to know where each LED light is in relation to the mobile real time location unit.

Each LED light may be singular or part of an array of two to more LED lights. The array of LED lights may be in communication by a hardwired connection to each other or may communicate with each other wirelessly, such as by a mesh network. The LED light array may be in communication with at least one master which provides instructions to each LED light as well as receives information from the LED light about the LED light as well as any information and data that has been received from a mobile real time location unit. A gateway may also be used to provide command control of multiple arrays in communications masters that may be in multiple locations or for separate LED light arrays with different instructions and commands.

Figure 43B:
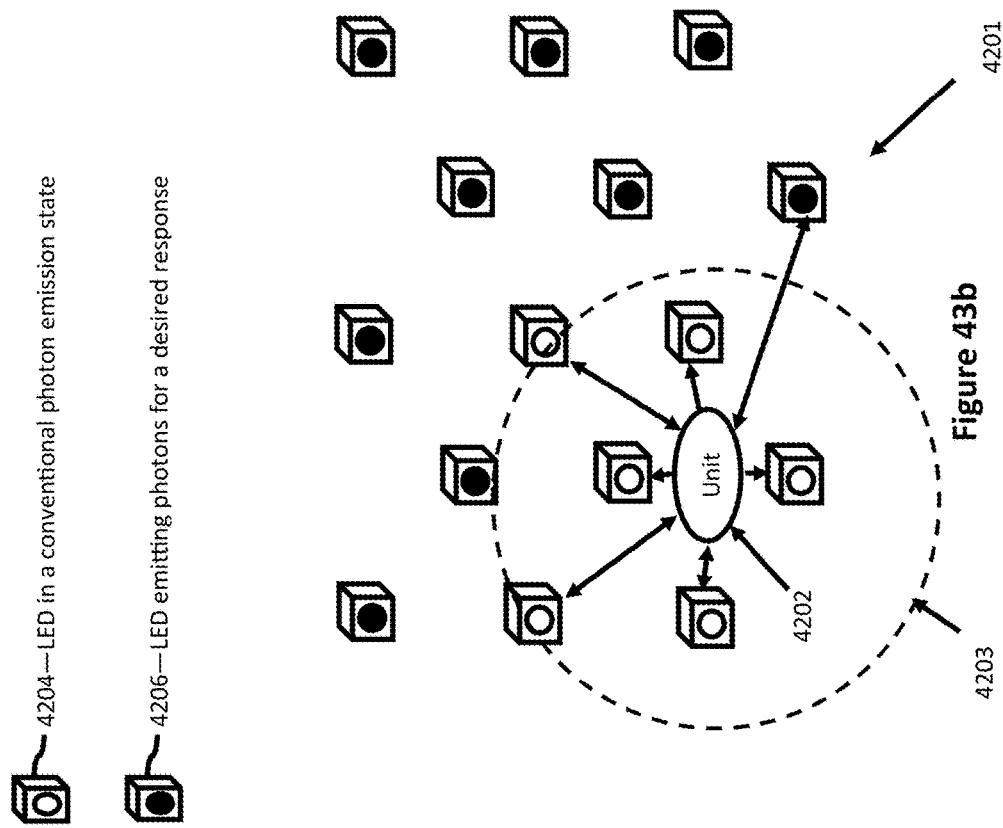
FIGS. 43a and 43b are examples of a mobile real time location unit in use in an array of LED lights to allow the LED lights to know the location as well as additional information of a person, animal or plant associated with the mobile real time location unit.
Figure 43A:
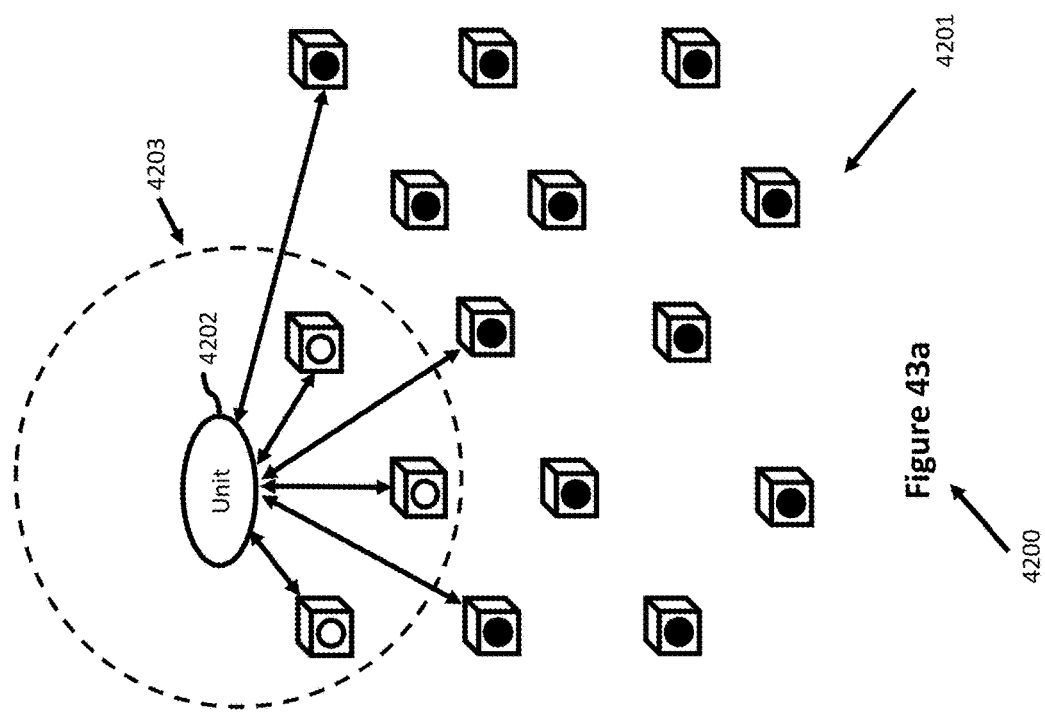
Figure 45:
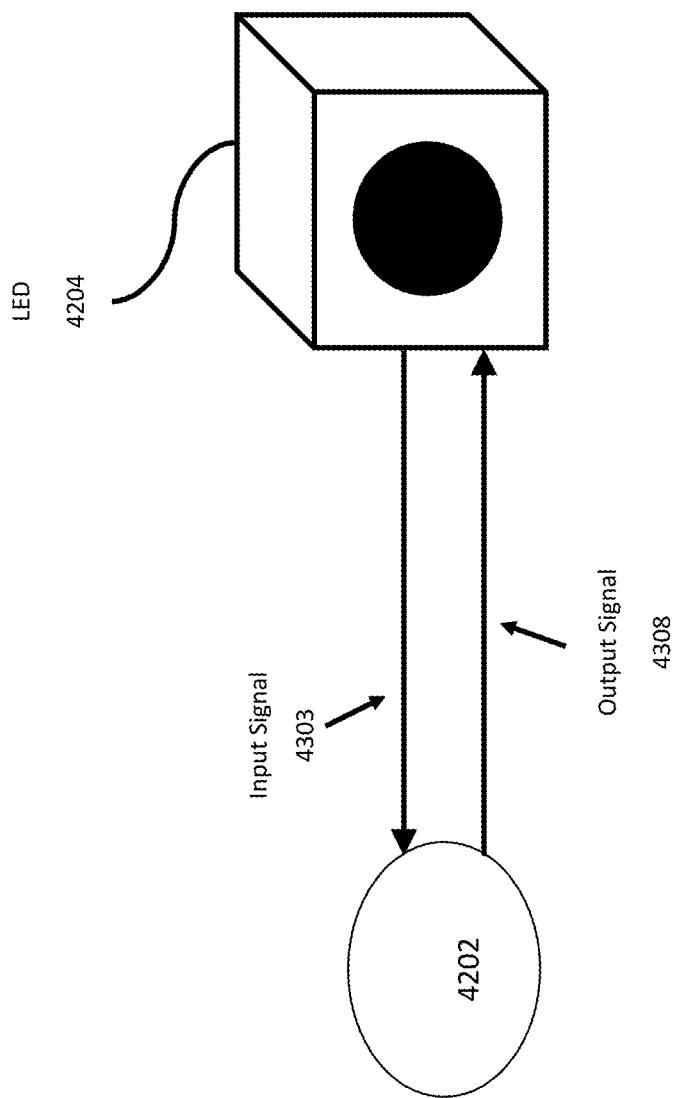
FIG. 45 in an example of two-way communications between a mobile real time location unit and an LED.

FIGS. 43a and 43b are examples of a mobile real time location unit in association with an organism, such as a person, as they move through an area of a facility radiated by an array of LED lights where the mobile real time location unit is in singular or two-way communication with each LED light in the array 4200. As shown in FIG. 43a, an array 4201 of fifteen (15) LED lights 4204 and 4206 are shown with a mobile real time location unit 4202. The mobile real time location unit 4202 is emitting a signal 4203 with information regarding its position. Three (3) LED lights 4204 in the vicinity of the mobile real time location unit 4202 have received the signal 4203 and have reacted to the presence of the mobile real time location unit 4202 and switched to their photon emission to conventional light. The remaining LED lights 4206 in the network or array 4201 not in a vicinity of the person, animal or plant will continue to emit photons for specific desired response on the organism receiving the emission. As further shown in FIG. 43a and provided in closer detail in FIG. 45, the system provided herein allows for singular or two-way communication between each LED light 204 and the mobile real time location unit 4202. As shown in FIG. 43a and FIG. 45, each LED light 4204 can also emits an input signal 4203 and 4203 back to the mobile real time location unit 4202 with data related to the light 4204 and the associated array while the LED light is also receiving the output signal 4303 and 4308 from the unit 4203 with information related to the unit 4203 as well as the organism associated with the unit 4203.

As shown in FIG. 43b, the mobile real time location unit or sensor 4202 has moved further into the LED lighting network 4201 where the lights in the network have received a signal 4203 from the mobile real time license unit 4202 on a person, animal or plant which instructs LED lights 4204 in the vicinity of the person to change their light recipe emitted to that of a conventional light. As shown in FIG. 43b, five (5) photon housing units 4204 are now in the vicinity of the mobile real time location unit 4202 and have reacted to the presence of the unit 4202, switching their photon emission to an alternative emission, such as full spectrum conventional lighting. The remaining LED lights 4206 in the network array continue to emit photons for specific desired response.

Figure 44:
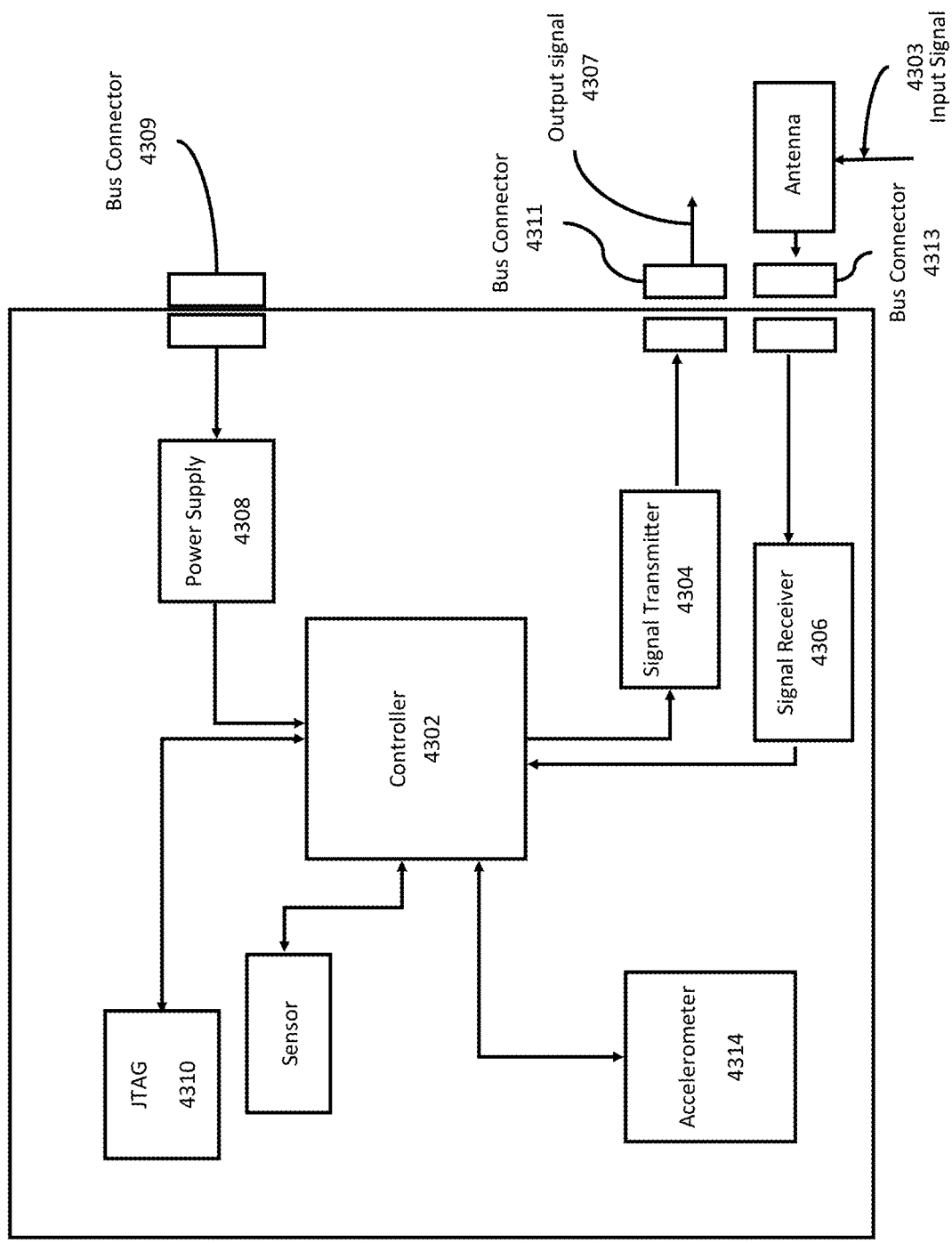
FIG. 44 is an example schematic of a mobile real time location unit.

FIG. 44 provides a schematic of the structure of a mobile real time location unit 4300. As shown in FIG. 44, the mobile real time location unit 4202 comprises a controller 4302, a signal transmitter 4304, a signal receiver 4306 (such as a ST microelectronics' Spirit wireless radio) operably coupled to an antenna 4305 through a bus connector 4311 and 4313, that transmits and receive signals to and from LED lights, a power supply or source 4308, such as a battery, operably coupled to a bus connection 4309 to allow for external power supply. In addition, the mobile real time unit 4202 may also include additional features such as a quick reset, such as a JTAG 4310 and one or more sensors or sensor receivers 4312, such as an accelerometer 4314.

The controller 4302 provides commands to the signal transmitter 4304 that emits an output signal out of the mobile real time location unit 4202 that is to be received by one or more LED lights. The output signal may be simply a signal that is used by the LED light to determine the distance and direction of the mobile real time location unit 4202 or the output signal may also contain information regarding the organism associated with the mobile real time location unit 4202. The signal receiver 4306 receives input signals 4307 through the antenna or wireless receiver/transmitter 4305 where the signal is relayed to the controller 4302 where the data in the signal is processed.

The controller 4302 may receive information from the one or more sensors 4312 and 4314 or receivers that receive information from external sensors regarding the location of the unit 4202 as well as the health and state of the organism and the environment associated with the mobile real time location unit 4202. The controller 4302 will process the data from the sensors 4312 and 4314 which are emitted as an output signal 4307 through the signal transmitter 4304.

In another embodiment, the mobile real time location unit 4202 may also include buttons in communication with the controllers 4302 that allows a person to send communication signals or output signal 4307 from the mobile real time location unit 4202 to each LED light to allow the mobile real time location unit 4202 to change the photon signal emitted from the LED light or functionality of the LED light and sensors. This allows a person to check the functionality of the LED light to confirm each LED light or an array of LED lights are functioning properly and in proper communication with the unit 4201.

The mobile real time location unit is used with an organism to allow individual LED lights, a lighting network or an array of LED lights and/or sensors to identify and monitor the location, status, health and environment of an organism, such as a person, mammal, bird or plant and modify or change the emission of photons as needed by the organism in order to produce or maintain a desired biological effect or in order to prevent a specific photon recipe having an undesired effect upon that person, mammal, bird or plant.

A variety of signal types may be used to be broadcast from the mobile real time location unit, by way of example a simple tone, ultra-wide band, broadband, pulse radio frequency (RF), passive RFID and others. The signal is broadcast and the reaction by each LED light is based on the presence of, intensity of the signal and/or the data contained within the signal, i.e., the stronger the intensity of the signal received by the emitter, the closer the unit is to the LED light. In an additional embodiment, each LED light may send signals to other LED lights in an array with information regarding the intensity of the signal or data within being received or the LED light may communicate directly with a master or gateway regarding the information in data signal (such as in the case of an emergency signal from the mobile real time location unit), thus allowing the LED lights to triangulate the exact location of the unit within the lighting array and to adjust their photon signals as appropriate. LED lights can be preprogramed with one or more signals which facilitates a change in light emission recipes or can received signals from a gateway with such commands.

The mobile real time location unit may be used as a safety device to prevent undesired exposure to lighting recipes but also allows use to monitor movement and time of individuals, animals or plants within an LED light network.

Example 1—Use of Mobile Real Time Location Unit with Dairy Cattle

Figure 46:
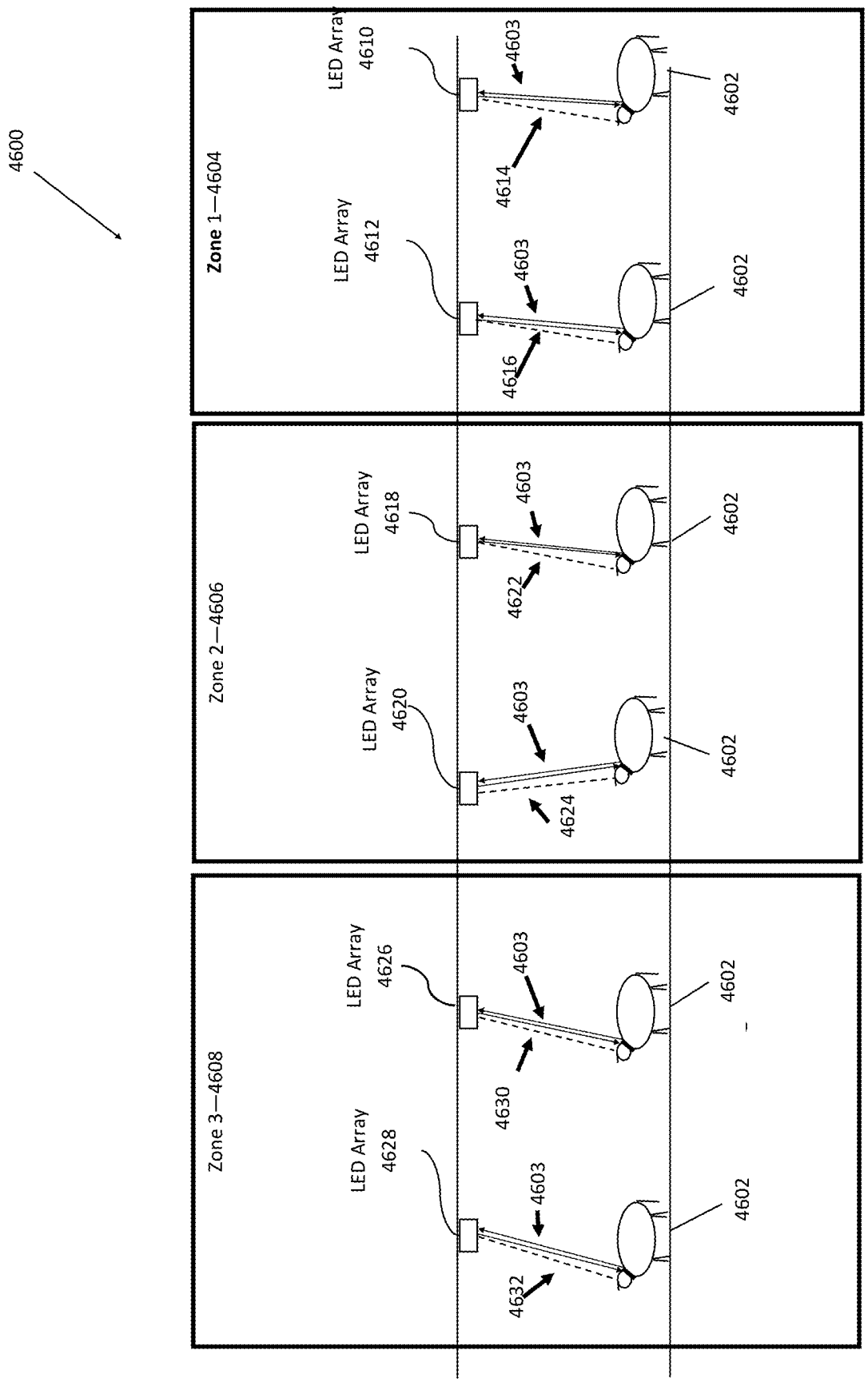
FIG. 46 is an example of the mobile real time location unit in use with a dairy cow in use with three separate zones of LED arrays in a barn.

FIG. 46 provides an example of the mobile real time location unit in use with a dairy cow. In this example, a dairy cow is in a dairy facility such as a barn 4600. Three zones of LED light arrays 4604, 4606 and 4608 are mounted in the facility to provide specific photon recipes for specific biological responses. In this example, zone one 4604 is established with an LED light array 4610 and 4612 that emits a photon signal 4614 and 4616 to encourage ovulation and milk production, while zone 2 4606 is established with an LED light array 4618 and 4620 to encourage hunger and to prevent sexual maturity to encourage growth and development of young cows while zone three 4608 is established with an LED light array to also encourage sexual maturity and milk production. In this example, the cow 4602 needs to be moved from zone 1 4604 to zone 3 4608, however the cow 4602 will have to transition through zone 2 4606 to get to zone 3 4608. The facility does not want the cow 4602 to be radiated by a photon signal that is going to reduce milk production, so as the cow moves from zone 1 and into zone 2, the mobile real time unit on the collar around the cow's neck emits an output signal 4603 to the LED light array 4618 and 4620 in zone 2 regarding the cow's location and the need to change the photon signal 4622 and 4624 from the LED lights 4618 and 4620 in zone 2 4606 in the vicinity of the cow 4602 to a sexual maturity and milk production signal. As the cow 4602 moves through zone 2 4606, each LED light 4618 and 4620 in the vicinity of the cow 4602 adjusts its emission 4622 and 4624 to prevent the cow 4602 from receiving a photon signal designed to prevent sexual maturity. Then as the cow 4602 moves away from each LED light 4618 and 4620 in zone 2 4606 and into zone 3 4608, each LED light 4618 and 4620 in zone 2 4606 will adjust back to its preprogrammed photon emission. Then in zone 3 4608, each LED light 4626 and 4628 in zone 3 4608 will receive a signal 4603 from the mobile real time location unit on the cow 4602 providing the location of the cow within zone 3 and instructing the LED lights in zone three to emit a photon signal 4630 and 4632 designed to induce milk production and sexual maturity. In another embodiment, the LED lights of zone 3 may communicate with the LED lights in zones 1 and 2 to confirm the location of the cow.

Example 2—Monitoring Location of Unit with an Organism

In an example of the present disclosure, the mobile real time location unit may be worn by a person in a chicken egg laying facility. The facility may have a lighting array that is designed to emit photon signals to stimulate ovulation or sexual maturity in the birds. In this example, a person may enter the facility to feed the birds or check the health of the birds. As the person enters the facility the mobile real time location unit on the person emits a signal that may be repetitive, passive or constant that is received by the LED lights of the lighting array. The signal from the mobile real time location unit is capable of providing information to the LED lights related to the person's location in relation to the LED lights as well as the identity or presence of the mobile real time location unit. The LED lights in the array will then process the data from the signal from the mobile real time location unit and will adjust the photon emitted from LED lights in the vicinity of the mobile real time location unit to prevent modulate photon stimulation to the person. LED lights in the array outside of the vicinity of the mobile real time location unit will not be adjusted.

Example 3—Mobile Real Time Location Unit for Use in Plant Production

In an example of the present disclosure, the mobile real time location unit may be attached or associated with a plant or plant container in a vertical plant production facility on a conveyer belt that moves the plant through the facility. In this example, the facility may have various lighting arrays at different locations and elevations. A mobile real time location unit may be attached or associated with a plant container that allows the mobile real time location unit to monitor the location of the plant as well as the plant health and the environment around the plant, such as soil moisture, plant hydration, nutrient uptake as well as provide data such as plant type, age and the stage of the plant (such as rooting, vegetative, flowering, seed). As the plant is transported through the facility, the mobile real time location unit is able to emit a signal regarding the location of the plant in relation to the various lighting arrays, allowing the LED lighting arrays to adjust their photon signal recipes based on the location of the plant, type of plant and the needs of the plant.

Example 4—Facilitate Continuous Photon Radiation

In another example of the present disclosure, the mobile real time location unit may be used to facilitate the continuous dosing of a specific photon recipe to an organism while the organism is being transported from one location to another. In this example, the mobile real time location unit is attached to a person who is undergoing a photon light therapy. If the person is moved from one room to another, the mobile real time location unit can communicate with LED lights arrays in the rooms and corridors along the path where the person is being transported, sending a signal to the LED light regarding the person's location as well as the need to adjust the LED light photon signal in the immediate vicinity of the person to the photon light therapy recipe to allow for the continued photon light therapy as the person is being moved. In this example, very specific LED light arrays will be continuously modified as the person is transported to a different location allowing for the person to continuously receive their photon light therapy without a gap.

Example 5—Health and Welfare of a Person in a Facility

In an example, the mobile real time location unit may be used to monitor the location and health of a person in a facility. In this example, the mobile real time location unit is attached to a person. The mobile real time location unit emits signals to the LED lighting array in the vicinity, communicating information such as the person's ID, location, duration at that location, position relative to vertical, as well as the heart rate and other health conditions of the person. The mobile real time location unit may also have an emergency button that will communicate a signal to the LED light array that will alert the LED light array of an emergency and will instruct the LED lights to communicate an emergency to local authorities. In an additional embodiment of the facility of the current example, should the mobile real time location unit detect a fall or a health issue of a person or animal or remotely triggered such in the event of a tornado, the mobile real time location unit can emit an output signal to the LED light array that will induce the LED light array pulse red and blue lights similar to that of emergency vehicles to notify other people in the area of a problem.

Example 6—Health and Welfare Checks of a Animals in Agriculture

In an example, the mobile real time location unit may be used to verify and track health and welfare checks on animals by tracking and recording the movement of personnel in an agricultural facility under the stimulation of an artificial LED lighting arrays. In this example, the mobile real time location unit is attached to a person. The mobile real time location unit emits signals to the LED lighting array in the vicinity, communicating information such as the person's ID, location, duration at that location, and position relative to each LED light. In this example, the LED lights in the presence of the real time location unit will stop pulsing and switch to a bright steady state white light. This bright white light will better illuminate the animals under said light allowing the personnel to better evaluate the health of the animals under the LED light. The LED array along with its communications capability will then record the movements of the personnel allowing for auditing of said movements through the agricultural facility for the increased benefit of the health and welfare of the animals.

Example 7—Emergency Response

In an example, the mobile real time location unit may be used to assist in an emergency response to localize or isolate people in an emergency. For example, in an active shooter situation. Each teacher and employee of a school would wear a mobile real time location unit. If a teacher pushed a button on the unit, the mobile real time location unit can send a signal that is capable of being received by other mobile real time location units in communication with the first unit. The first unit can provide a signal to notify the other mobile real time location unit and the wearer of the unit that there is a problem.

Further, for the person in the room or location of the problem, that person can hold down a button on the mobile real time location unit for an extended prior or press a specific button. The mobile real time location unit will then send another signal that indicated to the entire lighting array of the school of the issue, where the lighting array is then able to flash lights throughout the school to indicate a problem, flash lights in a pattern or turn on specific colors to direct teachers and students to safety away from the issue as well as to pulse or flash lights in the array that would be specific to the location of the issue, directing first responders to the location of the issue. The wearer may also push a button on the unit that can indicate their current state as well as the type of issue, such as health, fire, water, weather, or a safety issue. For example. a person could say I don't hear or see anything, so I am going to push the green button. Another person might hear something but not see something so they would push the yellow button. Others may see something and push the red button. The network could then make decisions on where the risks were and light lights in a room or hallway directing people on what to do. For example, show them the direction to move away from the risks or to shelter in place The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A facility comprising:
   a system for inducing a desired biological response in an organism; and
   a system for synchronous emission of modulated photons from two or more modulated LED lights;
   wherein the system for synchronous emission of modulated photons from two or more modulated LED lights comprises:
   at least one master controller;
   a master clock within said at least one master controller, wherein said at least one master controller is capable of generating a signal transmitting the time of said master clock within said signal;
   two or more LED lights, wherein each LED light comprises:
   a controller;
   an internal clock; and
   at least one photon emitter, wherein said at least one photon emitter is capable of emission of photons;
   wherein the controller is in communication with the internal clock and the at least one photon emitter and wherein the time of the internal clock synchronizes the timing of the emission of photons from said at least one photon emitter;
   wherein each LED light is capable of receiving said signal from the master controller and wherein the controller of each LED light is capable of analyzing the time of said master clock of said signal from said master controller and comparing the time of the master clock with the time of the internal clock of the LED light;
   wherein said system for inducing a desired biological response in an organism is produced from said system for synchronous emission of modulated photons from two or more modulated LED lights.

2. The facility of claim 1, wherein each LED light of said two or more LED lights further comprises:
   at least one wireless receiver or transmitter;
   a signal receiver, wherein said signal receiver is operably coupled to said wireless receiver or transmitter and wherein said signal receiver is in communication with said controller;

a signal transmitter, wherein said signal transmitter is capable of emitting a signal from each of said two or more LED lights and wherein said signal transmitter is in communication with said controller.

3. The facility of claim 2, wherein each master further comprises:
   at least one wireless receiver or transmitter;
   a signal receiver, wherein said signal receiver is operably coupled to said wireless receiver or transmitter and wherein said signal receiver is in communication with said controller;
   a signal transmitter, wherein said signal transmitter is capable of emitting a signal from said master and wherein said signal transmitter is in communication with said controller.

4. The facility of any one of claim 2, wherein the system for inducing a desired biological response in an organism is capable of illuminating at least one organism with two or more LED lights within an agriculture facility, wherein the two or more LED lights each emit a repetitive photon signal, wherein the photon signal is comprised of two or more components working in coordination, wherein the first component of the photon signal is a biological response initiation component which provides one or more photon pulses of one or more colors that initiates the stimulation of a biological response, where each of the one or more pulses has one or more frequencies and one or more intensities where said first component initiates the biological response of the organism, where the one or more photon pulses of the first component are followed by one or more pulses of a second component where the second component is a biological response reset component, with one or more pulses composed of one or more colors and one or more frequencies and intensities, and wherein the photon signal is repeated, wherein the coordination of the first and second components within said signal results in a change in the regulation of a biological response in said organism.

5. The facility of claim 4, wherein said biological response is chosen from fertility, ovulation, hunger, egg production, sexual maturity, milk production, hormone production, behavior and socialization, root, tissue or hyphal growth, vegetative growth, flower or fruiting body production, fruit, spore or seed production, stopping growth, elongation of a specific plant part, repairing an organism or destruction of the organism and interpolation of circadian inputs.

6. The facility of claim 5, wherein each LED light of said two or more LED lights further comprises:
   at least one wireless receiver or transmitter;
   a signal receiver, wherein said signal receiver is operably coupled to said wireless receiver or transmitter and wherein said signal receiver is in communication with said controller;
   a signal transmitter, wherein said signal transmitter is capable of emitting a signal from each of said two or more LED lights and wherein said signal transmitter is in communication with said controller.

7. The facility of claim 1 wherein the time of the internal clock of each LED light of said two or more LED lights is synchronized with the master clock of said one or more masters.

8. The facility of claim 7, wherein each master further comprises:
   at least one wireless receiver or transmitter;
   a signal receiver, wherein said signal receiver is operably coupled to said wireless receiver or transmitter and wherein said signal receiver is in communication with said controller;
   a signal transmitter, wherein said signal transmitter is capable of emitting a signal from said master and wherein said signal transmitter is in communication with said controller.

9. The facility of any one of claim 8, wherein the system for inducing a desired biological response in an organism is capable of illuminating at least one organism with two or more LED lights within an agriculture facility, wherein the two or more LED lights each emit a repetitive photon signal, wherein the photon signal is comprised of two or more components working in coordination, wherein the first component of the photon signal is a biological response initiation component which provides one or more photon pulses of one or more colors that initiates the stimulation of a biological response, where each of the one or more pulses has one or more frequencies and one or more intensities where said first component initiates the biological response of the organism, where the one or more photon pulses of the first component are followed by one or more pulses of a second component where the second component is a biological response reset component, with one or more pulses composed of one or more colors and one or more frequencies and intensities, and wherein the photon signal is repeated, wherein the coordination of the first and second components within said signal results in a change in the regulation of a biological response in said organism.

10. The facility of claim 9, wherein said biological response is chosen from fertility, ovulation, hunger, egg production, sexual maturity, milk production, hormone production, behavior and socialization, root, tissue or hyphal growth, vegetative growth, flower or fruiting body production, fruit, spore or seed production, stopping growth, elongation of a specific plant part, repairing an organism or destruction of the organism and interpolation of circadian inputs.

11. The facility of claim 1, wherein the system for synchronous emission of modulated photons from two or more modulated LED lights comprises:
   a mesh network comprising said two or more LED lights;
   wherein each LED light in the mesh network is capable of broadcasting and receiving clock signals from other LED lights in the system;
   wherein each of said two or more LED lights performs a convergence algorithm to align its internal clock to the other received clocks within the LED light array;
   wherein each of said two or more LED lights broadcasts its adjusted clock to other LED lights within the array, wherein over repeated cycles, the clocks of all LED lights within said LED light array align with each other;
   wherein each of said two or more LED lights comprises:
      at least one photon emitter, wherein the at least one photon emitter is capable of emission of photons;
   wherein each of said two or more LED lights are capable of generating photon emissions that are synchronized to the LED light array's converged clock.

12. The facility of claim 1, wherein the system for synchronous emission of modulated photons from two or more modulated LED lights comprises:

wherein said at least one master is capable of generating a signal, wherein said signal contains the time of said master clock within said signal and the time the signal is sent:

wherein said LED light is capable of receiving said signal;

wherein the controller of said LED light is capable of analyzing the time of said master clock and the time the signal was sent from said master; and comparing the time of said master and the time the signal was sent from said master with the time of the internal clock of the LED light;

and synchronizing the internal clock of the LED light with the master clock of said master.

13. The facility of claim 12, wherein each LED light of said two or more LED lights further comprises:
   at least one wireless receiver or transmitter;
   a signal receiver, wherein said signal receiver is operably coupled to said wireless receiver or transmitter and wherein said signal receiver is in communication with said controller;
   a signal transmitter, wherein said signal transmitter is capable of emitting a signal from each of said two or more LED lights and wherein said signal transmitter is in communication with said controller.

14. The facility of claim 13, wherein each master further comprises:
   at least one wireless receiver or transmitter;
   a signal receiver, wherein said signal receiver is operably coupled to said wireless receiver or transmitter and wherein said signal receiver is in communication with said controller;
   a signal transmitter, wherein said signal transmitter is capable of emitting a signal from said master and wherein said signal transmitter is in communication with said controller.

15. The facility of claim 14 wherein the time of the internal clock of each LED light of said two or more LED lights is synchronized with the master clock of said one or more masters.

16. The facility of claim 15, wherein the system for inducing a desired biological response in an organism is capable of illuminating at least one organism with two or more LED lights within an agriculture facility, wherein the two or more LED lights each emit a repetitive photon signal, wherein the photon signal is comprised of two or more components working in coordination, wherein the first component of the photon signal is a biological response initiation component which provides one or more photon pulses of one or more colors that initiates the stimulation of a biological response, where each of the one or more pulses has one or more frequencies and one or more intensities where said first component initiates the biological response of the organism, where the one or more photon pulses of the first component are followed by one or more pulses of a second component where the second component is a biological response reset component, with one or more pulses composed of one or more colors and one or more frequencies and intensities, and wherein the photon signal is repeated, wherein the coordination of the first and second components within said signal results in a change in the regulation of a biological response in said organism.

17. The facility of claim 16, wherein said biological response is chosen from fertility, ovulation, hunger, egg production, sexual maturity, milk production, hormone production, behavior and socialization, root, tissue or hyphal growth, vegetative growth, flower or fruiting body production, fruit, spore or seed production, stopping growth, elongation of a specific plant part, repairing an organism or destruction of the organism and interpolation of circadian inputs.

18. The facility of claim 12, further comprising at least one mobile real time location unit in communication with the system for synchronous emission of modulated photons from two or more modulated LED lights, wherein the mobile real time location unit comprises:
   mobile housing unit comprising:
   a communication unit capable of emitting a data signal and receiving a data signal, wherein said communications unit comprises:
      a signal transmitter capable of emitting an output signal; and
      a signal receiver operably coupled to a signal wireless receiver and transmitter, wherein said wireless receiver and transmitter is capable of sending and receiving an input signal directed to said two or more LED lights; and
   a power unit, wherein said power storage unit provides power for said central processing unit and said communication unit;
   wherein emitting a repetitive, passive or constant signal containing data regarding said organism from said communication unit;
   based upon the information contained in the data signal from the mobile real time location unit the emission from said two or LED lights is modified.

19. The signal of claim 18, wherein said signal is chosen from a simple tone, repetitive pulse ultra-wide band, broadband, pulse radio frequency (RF), zigbee, and ad hoc wireless.

20. The mobile real time location unit of claim 19, further comprising a controller, wherein said controller is in communication with said communication unit.

21. The mobile real time location unit of claim 20, wherein said mobile real time location unit further comprises at least one sensor, wherein said sensor is in communication with the controller and said power supply, wherein said power supply provides power to said sensor.

22. The mobile real time location unit of claim 21, wherein said at least one sensor is capable of monitoring the health of the organism, the status of the organism, or the environment around the organism.

23. A method of using a facility, method comprising:
   providing a system for inducing a desired biological response in an organism; and
   providing a system for synchronous emission of modulated photons from two or more modulated LED lights, wherein the system for synchronous emission of modulated photons from two or more modulated LED lights comprises:
   providing at least one master controller;
   providing a master clock within said at least one master controller, wherein said at least one master controller is capable of generating a signal transmitting the time of said master clock within said signal;
   providing two or more LED lights, wherein each LED light comprises:
   a controller;
   an internal clock; and
   providing at least one photon emitter, wherein said at least one photon emitter is capable of emission of photons;
   wherein the controller is in communication with the internal clock and the at least one photon emitter and wherein the time of the internal clock synchronizes the timing of the emission of photons from said at least one photon emitter;

wherein each LED light is capable of receiving said signal from the master controller and wherein the controller of each LED light is capable of analyzing the time of said master clock of said signal from said master controller and comparing the time of the master clock with the time of the internal clock of the LED light;

wherein said system for inducing a desired biological response in an organism is produced from said system for synchronous emission of modulated photons from two or more modulated LED lights.

24. The method of claim 23, wherein each LED light of said two or more LED lights further comprises:
providing at least one wireless receiver or transmitter;
providing a signal receiver, wherein said signal receiver is operably coupled to said wireless receiver or transmitter and wherein said signal receiver is in communication with said controller;
providing a signal transmitter, wherein said signal transmitter is capable of emitting a signal from each of said two or more LED lights and wherein said signal transmitter is in communication with said controller.

25. The method of claim 24, wherein each master further comprises:
providing at least one wireless receiver or transmitter;
providing a signal receiver, wherein said signal receiver is operably coupled to said wireless receiver or transmitter and wherein said signal receiver is in communication with said controller;
providing a signal transmitter, wherein said signal transmitter is capable of emitting a signal from said master and wherein said signal transmitter is in communication with said controller.

26. The method of claim 25, wherein the time of the internal clock of each LED light of said two or more LED lights is synchronized with the master clock of said one or more masters.

27. The method of claim 25 wherein the system for inducing a desired biological response in an organism is capable of illuminating at least one organism with two or more LED lights within an agriculture facility, wherein the two or more LED lights each emit a repetitive photon signal, wherein the photon signal is comprised of two or more components working in coordination, wherein the first component of the photon signal is a biological response initiation component which provides one or more photon pulses of one or more colors that initiates the stimulation of a biological response, where each of the one or more pulses has one or more frequencies and one or more intensities where said first component initiates the biological response of the organism, where the one or more photon pulses of the first component are followed by one or more pulses of a second component where the second component is a biological response reset component, with one or more pulses composed of one or more colors and one or more frequencies and intensities, and wherein the photon signal is repeated, wherein the coordination of the first and second components within said signal results in a change in the regulation of a biological response in said organism.

28. The method of claim 27, wherein said biological response is chosen from fertility, ovulation, hunger, egg production, sexual maturity, milk production, hormone production, behavior and socialization, root, tissue or hyphal growth, vegetative growth, flower or fruiting body production, fruit, spore or seed production, stopping growth, elongation of a specific plant part, repairing an organism or destruction of the organism and interpolation of circadian inputs.

* * * * *